(12) United States Patent
Kim et al.

(10) Patent No.: US 12,539,878 B2
(45) Date of Patent: Feb. 3, 2026

(54) APPARATUS AND METHOD FOR PROVIDING ALARM ACCORDING TO BEHAVIOR OF DRIVER IN DRIVING MONITORING SYSTEM

(71) Applicant: NOTA, INC., Daejeon (KR)

(72) Inventors: Sangtae Kim, Hwaseong-si (KR); Eunsik Jung, Seoul (KR); Wheemyung Shin, Seoul (KR)

(73) Assignee: NOTA, INC., Daejeon (KR)

( * ) Notice: Subject to any disclaimer, the term of this patent is extended or adjusted under 35 U.S.C. 154(b) by 0 days.

(21) Appl. No.: 18/818,185

(22) Filed: Aug. 28, 2024

(65) Prior Publication Data

US 2025/0128726 A1   Apr. 24, 2025

(51) Int. Cl.
| | |
|---|---|
| *B60W 50/14* | (2020.01) |
| *B60W 40/09* | (2012.01) |
| *G06V 10/82* | (2022.01) |
| *G06V 20/59* | (2022.01) |
| *B60W 40/08* | (2012.01) |

(52) U.S. Cl.
CPC ............ *B60W 50/14* (2013.01); *B60W 40/09* (2013.01); *G06V 10/82* (2022.01); *G06V 20/597* (2022.01); *B60W 2040/0827* (2013.01); *B60W 2050/143* (2013.01); *B60W 2420/403* (2013.01); *B60W 2540/229* (2020.02); *B60W 2556/10* (2020.02)

(58) Field of Classification Search
CPC ............... B60W 50/14; B60W 40/09; B60W 2040/0827; B60W 2050/143; B60W 2420/403; B60W 2540/229; B60W 2556/10; G06V 10/82; G06V 20/597
See application file for complete search history.

(56) References Cited

U.S. PATENT DOCUMENTS

| | | | |
|---|---|---|---|
| 10,740,634 B1 * | 8/2020 | Katsuki | G06F 18/256 |
| 11,249,544 B2 * | 2/2022 | Sicconi | G06F 3/011 |
| 11,587,461 B2 | 2/2023 | Telpaz et al. | |
| 11,597,276 B2 * | 3/2023 | Laitsaari | G07C 5/085 |

(Continued)

FOREIGN PATENT DOCUMENTS

| | | |
|---|---|---|
| JP | 2017174093 A | 9/2017 |
| KR | 10-2005-0026128 A | 3/2005 |
| KR | 102246706 B1 | 4/2021 |

*Primary Examiner* — Mohamed Barakat
(74) *Attorney, Agent, or Firm* — Seed Intellectual Property Law Group LLP

(57) ABSTRACT

Disclosed is a method for providing an alarm based on a behavior of a driver in a driver monitoring system. The method includes receiving a first image corresponding to the driver within a vehicle, generating first model output information which indicates possibility that an anomaly which compromises safety of the driver exists in the first image, from the first image, by using an artificial intelligence model. The method includes generating a first anomaly primary prediction result indicating whether the anomaly exists in the first image by comparing the first model output information with a first threshold, generating a first anomaly secondary prediction result by performing a first voting using the first anomaly primary prediction result and determining an anomaly alarm corresponding to the first image by performing a second voting using the first anomaly secondary prediction result.

20 Claims, 13 Drawing Sheets

(56) References Cited

U.S. PATENT DOCUMENTS

| | | |
|---|---|---|
| 11,645,855 B2 | 5/2023 | Nagata et al. |
| 2009/0040054 A1* | 2/2009 | Wang .................. G06V 20/597 |
| | | 340/576 |
| 2019/0356552 A1 | 11/2019 | Ricci |
| 2020/0327345 A1 | 10/2020 | Schumacher et al. |
| 2020/0371512 A1* | 11/2020 | Srinivasamurthy .... G06N 3/006 |
| 2021/0052206 A1* | 2/2021 | Kale ...................... G06N 3/088 |
| 2022/0207278 A1 | 6/2022 | Nagata et al. |
| 2022/0363267 A1* | 11/2022 | Kristinsson ........... B60W 40/09 |
| 2023/0061784 A1* | 3/2023 | Agrawal ................ G06V 20/56 |
| 2023/0196794 A1 | 6/2023 | Chung et al. |

* cited by examiner

APPARATUS AND METHOD FOR PROVIDING ALARM ACCORDING TO BEHAVIOR OF DRIVER IN DRIVING MONITORING SYSTEM

CROSS-REFERENCE TO RELATED APPLICATIONS

This application claims priority to and the benefit of Korean Patent Application No. 10-2023-0142146 filed in the Korean Intellectual Property Office on 23 Oct. 2023, and Korean Patent Application No. 10-2023-0177469 filed in the Korean Intellectual Property Office on 8 Dec. 2023, the entire contents of which are incorporated herein by reference.

TECHNICAL FIELD

The present disclosure relates to a driver monitoring system, and more particularly, to alarm optimization technology according to a driver monitoring result.

BACKGROUND ART

A driver monitoring system (DMS) is technology that detects a condition of a driver and supports safe driving. The DMS can perform a function of detecting drowsiness, distraction, whether to wear a seatbelt is worn and/or drunk driving of the driver, and warning the driver, or controlling a vehicle. The DMS is evaluated as one of the core technologies of an autonomous vehicle in order to ensure a safe operation of the vehicle, and can also contribute to protecting the safety of the driver and preventing traffic accidents.

The DMS can use various sensors such as cameras, infrared sensors, acceleration sensors, and gyroscopes to detect the condition of the driver. The camera can be used to determine the drowsiness or distraction of the driver by detecting a facial expression or eyelid movement of the driver. The infrared sensor can be used for tracking the gaze of the driver by detecting pupil movement of the driver. The acceleration sensor and the gyroscope can be used for determining the drowsiness or drunken driving by detecting a posture and movement of the driver.

As a method for enhancing the accuracy and reliability of the DMS, technology of sensors are being advanced. When a resolution and an image quality of the camera are enhanced, the facial expression and the eyelid movement of the driver can be more accurately detected. When the performance of the infrared sensor is enhanced, the pupil movement of the driver can be more accurately tracked. When the performances of the acceleration sensor and the gyroscope are enhanced, the posture and the movement of the driver can be more precisely measured.

As a factor to enhance the performance of the DMS, the development of artificial intelligence technology can be chosen. As the artificial intelligence technology is applied to the DMS, the condition of the driver can be more elaborately detected with the advancement of the sensor.

BRIEF SUMMARY

However, even if the condition of the driver is elaborately detected as the detection technology is developed, when a separated alarm related algorithm is not added to a model used in the DMS, the alarm can be generated in each small behavior of the driver, so an alarm during driving may also still interfere with driving. In addition, a sensitive driver detection algorithm can also still increase a frequency of a false alarm. When the frequency of the false alarm increases, there can be a problem in performance and reliability of a DMS product. Further, since installation locations of DMS products for aftermarket cannot be specified, there may be a problem in that it should be customized for each vehicle where a location of a front is based on the driver. Moreover, a size and an angle of a face on the camera vary depending on a driving habit and a driving behavior of the driver, so there can be a problem in that accuracy for a detection result of the DMS can be lowered. In addition, there can also be a situation in which an object (e.g., a seatbelt) to be detected is not normally detected in an image depending on various occlusion situations and illumination situations which occur during driving.

The inventors of the present disclosure have provided various embodiments that address various technical problems in the related art, including the above problems identified by the inventors.

Various embodiments of the present disclosure have been made in an effort to optimize an alarm provided by the DMS.

An exemplary embodiment of the present disclosure has been made in an effort to accurately detect the driver's condition or status by considering various situations that arise during the driving process.

The technical objects addressed by the present disclosure are not limited to those mentioned above, and other technical objects not explicitly mentioned will be clearly understood by those skilled in the art from the following description.

An exemplary embodiment of the present disclosure provides a method for providing an alarm based on a behavior of a driver in DMS (a driver monitoring system). The present disclosure comprises: receiving a first image corresponding to the driver within a vehicle, generating first model output information which indicates possibility that an anomaly which compromises safety of the driver exists in the first image, from the first image, by using an artificial intelligence model, generating a first anomaly primary prediction result indicating whether the anomaly exists in the first image by comparing the first model output information with a first threshold, generating a first anomaly secondary prediction result by performing a first voting using the first anomaly primary prediction result, and determining an anomaly alarm corresponding to the first image by performing a second voting using the first anomaly secondary prediction result. The artificial intelligence model corresponds to a deep learning model that is pre-trained to receive an image of the driver and output a possibility that a predetermined anomaly which compromises safety of the driver exists in the image of the driver.

In an exemplary embodiment, the predetermined anomaly comprises a first anomaly corresponding to an absence of a seatbelt, a second anomaly corresponding to distraction during driving, and a third anomaly corresponding to drowsiness during driving. In an exemplary embodiment, an anomaly can be identified or predetermined either through preselected user input or automatically by the computing device (100). For example, the anomaly can be predefined or predetermined as a non-seatbelt-wearing event, distortion event, drowsiness event, fire event, and/or front-carelessness event. For example, the anomaly can be updated and added if the new type of anomaly event occurs.

In an exemplary embodiment, the first anomaly primary prediction result indicates that the anomaly exists in the first image, when the first model output information is greater than or equal to the first threshold, and the first anomaly primary prediction result indicates that the anomaly does not exist in the first image, when the first model output information is less than the first threshold.

In an exemplary embodiment, the first model output information includes a quantitative value for comparison with the first threshold, and the first anomaly secondary prediction result indicates a quantitative value used as a parameter to determine the anomaly alarm corresponding to the first image.

In an exemplary embodiment, the first threshold is determined based on: at least one previous anomaly primary prediction result corresponding to at least one previous image received prior to the first image, second model output information generated by the model in response to a second image received prior to the first image, or a second anomaly primary prediction result generated by comparing the second model output information with a second threshold determined based on a third anomaly primary prediction result corresponding to a third image received prior to the second image. The second threshold is used to determine whether the anomaly exists in the second image.

In an exemplary embodiment, the first threshold is determined based on a second anomaly secondary prediction result corresponding to a second image received prior to the first image, and the second anomaly secondary prediction result is generated by performing the first voting using the second anomaly primary prediction result corresponding to the second image.

In an exemplary embodiment, the first threshold is determined based on a ratio of result values indicating a presence of the anomaly in previous anomaly primary prediction results corresponding to a selected first number of images received prior to the first image, the first threshold is set to a first value. When the ratio of result values indicating the presence of the anomaly in the previous anomaly primary prediction results is equal to or greater than a first ratio, and the first threshold is set to a second value higher than the first value, when the ratio of result values indicating the presence of the anomaly in the previous anomaly primary prediction results is less than the first ratio.

In an exemplary embodiment, the first voting generates a group anomaly prediction result representing an image group consisting of the first image and a selected second number of images received prior to the first image, to ensure an accuracy of the first model output information.

In an exemplary embodiment, the generating the first anomaly secondary prediction result comprises: determining a majority value of anomaly primary prediction results corresponding to the first image and a selected second number of images received prior to the first image, and generating the first anomaly secondary prediction result using the determined majority value. The majority value is determined as a result value that occupies a higher ratio in the anomaly primary prediction results, among a result value indicating a presence of the anomaly and a result value indicating an absence of the anomaly.

In an exemplary embodiment, the generating the first anomaly secondary prediction result comprises: determining a first current counter value and a second current counter value corresponding to the first image by changing each of a plurality of previous counter values corresponding to a second image received prior to the first image based on a result of the first voting, and generating the first anomaly secondary prediction result including the first current counter value and the second current counter value. In an exemplary embodiment, the determining the anomaly alarm corresponding to the first image comprise: determining ON or OFF state of a first anomaly alarm corresponding to the first image by comparing the first current counter value with a first counter threshold, and determining ON or OFF state of a second anomaly alarm corresponding to the first image by comparing the second current counter value with a second counter threshold.

In an exemplary embodiment, the generating the first anomaly secondary prediction result comprises: determining to increase at least one previous counter value corresponding to a second image received prior to the first image, when a result of the first voting indicating a group anomaly prediction result or a majority value of anomaly primary prediction results in a plurality of selected images indicates a presence of the anomaly; or determining to decrease the at least one previous counter value, when a result of the first voting indicating a group anomaly prediction result or a majority value of anomaly primary prediction results in a plurality of selected images indicates an absence of the anomaly.

In an exemplary embodiment, the generating the first anomaly secondary prediction result comprises: determining a current counter value corresponding to the first image by changing a previous counter value corresponding to a second image received prior to the first image, based on a result of the first voting, and generating the first anomaly secondary prediction result including the current counter value. The determining the anomaly alarm corresponding to the first image comprises: determining ON or OFF state of a third anomaly alarm corresponding to the first image by comparing the current counter value with a third counter threshold; and determining ON or OFF state of a fourth anomaly alarm corresponding to the first image by comparing the current counter value with a fourth counter threshold.

In an exemplary embodiment, the generating the first anomaly secondary prediction result comprises, determining at least one current counter value corresponding to the first image by changing at least one previous counter value corresponding to a second image received prior to the first image, based on the result of the first voting. The current counter value is set to the minimum value or maximum value, when the current counter value falls outside a range defined by a selected minimum value and maximum value.

In an exemplary embodiment, the generating the first anomaly secondary prediction result comprises, determining at least one current counter value corresponding to the first image by changing at least one previous counter value corresponding to a second image received prior to the first image, based on the result of the first voting. A unit of the change of the at least one previous counter value is determined based on a time difference between receiving time of the second image and receiving time of the first image.

In an exemplary embodiment, the second voting determines an image group consisting of a selected third number of sequential images including the first image, to ensure an accuracy of the alarm, and determines whether there is continuity of anomaly secondary prediction results corresponding to images in the image group. The selected third number of sequential images include the first image and images received prior to the first image.

In an exemplary embodiment, the determining the anomaly alarm corresponding to the first image comprises, determining to generate the anomaly alarm corresponding to the first image, when the anomaly secondary prediction results within an image group consisting of a selected third number of sequential images including the first image all indicate a presence of the anomaly. The selected third number of sequential images include the first image and images received prior to the first image.

In an exemplary embodiment, the determining the anomaly alarm corresponding to the first image comprises, determining whether to generate the anomaly alarm corresponding to the first image, based on the first anomaly secondary prediction result corresponding to the first image and previous anomaly secondary prediction results corresponding to a selected fourth number of images received prior to the first image.

In an exemplary embodiment, the first voting utilizes a previous anomaly primary prediction result corresponding to at least one previous image received prior to the first image and the first anomaly primary prediction result, and the second voting utilizes a combination of a previous anomaly secondary prediction result corresponding to the at least one previous image and the first anomaly secondary prediction result, or compares the first anomaly secondary prediction result with a counter threshold.

In an exemplary embodiment, a computer program stored in a non-transitory computer readable storage medium is disclosed. The computer program allows at least one processor to perform following operations to provide an alarm based on a behavior of a driver in DMS (a driver monitoring system) when executed by the at least one processor, and wherein the operations comprise: receiving a first image corresponding to the driver within a vehicle, generating first model output information which indicates possibility that an anomaly which compromises safety of the driver exists in the first image, from the first image, by using an artificial intelligence model, generating a first anomaly primary prediction result indicating whether the anomaly exists in the first image by comparing the first model output information with a first threshold, generating a first anomaly secondary prediction result by performing a first voting using the first anomaly primary prediction result, and determining an anomaly alarm corresponding to the first image by performing a second voting using the first anomaly secondary prediction result. The artificial intelligence model corresponds to a deep learning model that is pre-trained to receive an image of the driver and output a possibility that a predetermined anomaly which compromises safety of the driver exists in the image of the driver.

In an exemplary embodiment, a computing device comprising at least one processor and a memory is disclosed. The at least one processor: receives a first image corresponding to the driver within a vehicle, generates first model output information which indicates possibility that an anomaly which compromises safety of the driver exists in the first image, from the first image, by using an artificial intelligence model, generates a first anomaly primary prediction result indicating whether the anomaly exists in the first image by comparing the first model output information with a first threshold, generates a first anomaly secondary prediction result by performing a first voting using the first anomaly primary prediction result, and determines an anomaly alarm corresponding to the first image by performing a second voting using the first anomaly secondary prediction result. The artificial intelligence model corresponds to a deep learning model that is pre-trained to receive an image of the driver and output a possibility that a predetermined anomaly which compromises safety of the driver exists in the image of the driver.

A technique according to an exemplary embodiment of the present disclosure can optimize an alarm provided in the DMS.

A technique according to an exemplary embodiment of the present disclosure can accurately detect the driver's condition or status by considering various situations that arise during the driving process.

DETAILED DESCRIPTION

Figure 1:
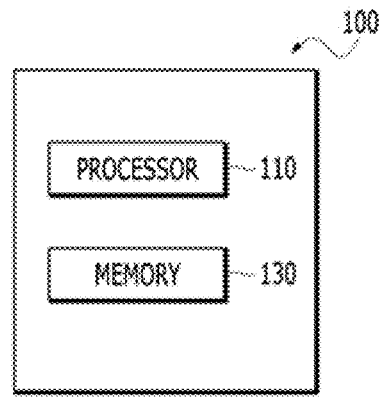
FIG. 1 schematically illustrates a block diagram of a computing device according to an exemplary embodiment of the present disclosure.

Various exemplary embodiments will now be described with reference to drawings. In this specification, various descriptions are presented to provide appreciation of the present disclosure. Prior to describing detailed contents for carrying out the present disclosure, it should be noted that configurations not directly associated with the technical gist of the present disclosure are omitted without departing from the technical gist of the present disclosure. Further, terms or words used in this specification and claims should be interpreted as meanings and concepts which match the technical spirit of the present disclosure based on a principle in which the inventor can define appropriate concepts of the terms in order to describe his/her invention by a best method.

"Module", "system", and/or "model" which are terms used in the specification refer to a computer-related entity, hardware, firmware, software, and a combination of the software and the hardware, or execution of the software, and can be used interchangeably. For example, the module may be a processing process executed on a processor, the processor, an object, an execution thread, a program, an application, and/or a computing device, but is not limited thereto. One or more modules may reside within the processor and/or a thread of execution. The module may be localized in one computer. One module may be distributed between two or more computers. Further, the modules may be executed by various computer-readable media having various data structures, which are stored therein. The modules may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" and "at least one" used in this specification designates and includes all available combinations of one or more items among enumerated related items. For example, the term "at least one of A or B" or "at least one of A and B" should be interpreted to mean "a case including only A", "a case including only B", and "a case in which A and B are combined".

It should be appreciated that the term "comprise/include" and/or "comprising/including" means presence of corresponding features and/or components. However, it should be appreciated that the term "comprises/includes" and/or "comprising/including" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

Those skilled in the art need to recognize that various exemplary components described in connection with the exemplary embodiments disclosed herein may be additionally implemented as hardware, computer software, or combinations of both sides.

The description of the presented embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure terms represented by N-th such as first, second, or third are used for distinguishing at least one entity. For example, entities expressed as first and second may be the same as each other or different from each other. Terms expressed in primary, secondary, or tertiary in the present disclosure are used to distinguish at least one entity. For example, N-th terms such as primary, second and tertiary may be used to distinguish a time order. In these examples, the larger the value of N, an entity which is temporally subsequent may be represented, and the smaller the value of N, an entity which is temporarily preceding may be represented.

The term "model" used in the present disclosure may be used as a meaning that encompasses the artificial intelligence based model, the artificial intelligence model, the computation model, the neural network, a network function, and the neural network. In an exemplary embodiment, the model may mean a model file, identification information of the model, an execution configuration of the model, a runtime of the model, and/or a framework of the model.

A driver monitoring system (DMS) in the present disclosure may represent a software entity or a hardware entity to which a vehicle technology monitoring a state of a driver is applied, or a combination thereof. The DMS may be executed by a computing device according to an exemplary embodiment of the present disclosure.

The term image used in the present disclosure may be used as a meaning that encompasses one or more frames. For example, one image may correspond to one frame. In an exemplary embodiment, the image as a still image may correspond to a frame obtained from a moving picture.

In an exemplary embodiment, the image as capture data including the driver as an object may be obtained through a camera installed in a vehicle. In an exemplary embodiment, in the DMS, as the image is analyzed and/or processed, an anomaly corresponding to the driver may be detected, and/or whether an alarm corresponding to the anomaly is generated, the type of alarm, and/or the intensity of the alarm may be determined.

An expressing of determining the alarm in the present disclosure may be used to encompass determining whether the alarm is generated, determining the type of alarm, and/or the intensity of the alarm.

Hereinafter, for convenience of description, a technique in the present disclosure will be described by using the term "image". It will be apparent to those skilled in the art that the technique of the present disclosure can be implemented through the term "frame".

The term "anomaly" used in the present disclosure may be used to express an operation, a situation, or an element that inhibits the safety of the driver in the image or frame. As an example, the anomaly may include distraction, drowsiness, no seat belt (e.g., not wearing seat belt), and/or the presence of fireworks (or fire) of the driver.

The term "voting" used in the present disclosure may mean an algorithm for correcting an anomaly prediction result in order to increase the accuracy of anomaly detection and/or the accuracy of anomaly alarm generation. In an exemplary embodiment, the voting may mean a rule-based algorithm that combines results in a plurality of images in order to determine, correct, and/or adjust an anomaly result corresponding to a current image. In an exemplary embodiment, the voting may mean a method for determining a prediction result the current image based on prediction results in previous images. In the present disclosure, the anomaly prediction result and the prediction result may be used interchangeably with each other.

In an exemplary embodiment, a plurality of factors used in the voting may correspond to a plurality of images which are temporally obtained, respectively. In an exemplary embodiment, the plurality of factors used in the voting may correspond to prediction results (e.g., prediction results obtained from the model and/or prediction results to which previous voting results are reflected) of the plurality of images which are temporally obtained, respectively. For example, a first prediction result for a first image, a second prediction result for a second image, and a third prediction result for a third image may be considered as the factors used in the voting.

The technique according to an exemplary embodiment of the present disclosure may sequentially use a plurality of votings. For example, a result of a first voting may be used in a second voting, and a result of the second voting may be used in a third voting. As a plurality of votings that use prediction results corresponding to the previous images and the current image as the factors are sequentially used, the anomaly alarm may be provided more accurately.

FIG. 1 schematically illustrates a block diagram of a computing device 100 according to an exemplary embodiment of the present disclosure.

According to the exemplary embodiment of the present disclosure, the computing device 100 may include a processor 110 and a memory 130.

A configuration of the computing device 100 illustrated in FIG. 1 is only an example illustrated through simplification. In an exemplary embodiment of the present disclosure, the computing device 100 may include other components for performing a computing configuration of the computing device 100 and only some of the disclosed components may constitute the computing device 100. As an example, when the computing device 100 includes a user terminal, an output unit (not illustrated) and an input unit (not illustrated) may be included in a scope of the computing device 100.

The computing device 100 in the present disclosure may be used as a meaning that encompasses any type of server and any type of terminal. The computing device 100 may be used interchangeably with a computing device.

In the present disclosure, the computing device 100 may mean any type of component constituting a system for implementing exemplary embodiments of the present disclosure.

In an exemplary embodiment, the computing device 100 may mean a device in which a DMS is driven.

In an exemplary embodiment, the computing device 100 may mean a device for detecting an anomaly from an image of a driver, and/or determining whether to generate an alarm corresponding to the anomaly.

In an exemplary embodiment, the computing device 100 may mean a device used for training a model for detecting the anomaly from the image of the driver.

In an exemplary embodiment, the computing device 100 may mean a device used for training a model for detecting the anomaly from the image of the driver. In an exemplary embodiment, the computing device 100 may mean a device used for inferring a model for detecting the anomaly from the image of the driver.

In an exemplary embodiment, the computing device 100 may mean a server which exists remotely from a device in a vehicle, which obtains the image of the driver.

In an exemplary embodiment, the computing device 100 obtains the image of the driver from the device in the vehicle to detect the anomaly for the image and/or determine the alarm corresponding to the anomaly in the image. For example, whether the alarm corresponding to the anomaly is generated or the intensity of the alarm may be determined.

In an exemplary embodiment, the computing device 100 may obtain an object detection result from a target image including the driver. For example, the computing device 100 may obtain a detection result related to a seatbelt, a detection result related to eye closing, a detection result related to drowsiness, and/or a detection result related to front carelessness in the target image.

In an exemplary embodiment, the processor 110 may perform an overall operation of the computing device 100. The processor 110 may be constituted by at least one core. The processor 110 may include devices for data analysis and/or processing, which include a central processing unit (CPU), a general purpose graphics processing unit (GPGPU), a tensor processing unit (TPU), and the like of the computing device 100.

The processor 110 may read a computer program stored in the memory 130 to detect the anomaly and/or determine the anomaly alarm according to an exemplary embodiment of the present disclosure.

According to an exemplary embodiment of the present disclosure, the processor 110 may also perform a computation for learning a neural network. The processor 110 may perform calculations for learning the neural network, which include processing of input data for learning in deep learning (DL), extracting a feature in the input data, calculating an error, updating a weight of the neural network using back-propagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of the plurality of computing devices may be used together to process the learning of the network function and the data classification using the network function. Further, the computer program executed in the computing device 100 according to an exemplary embodiment of the present disclosure may be a CPU, GPGPU, or TPU executable program.

Additionally, the processor 110 may generally process an overall operation of the computing device 100. For example, the processor 110 processes data, information, signals, and the like input or output through the components included in the computing device 100 or drives the application program stored in a storage unit to provide information or a function appropriate for the user.

According to an exemplary embodiment of the present disclosure, the memory 130 may store any type of information generated or determined by the processor 110 or any type of information received by the computing device 100. According to an exemplary embodiment of the present disclosure, the memory 130 may be a storage medium that stores computer software which allows the processor 110 to perform the operations according to the exemplary embodiments of the present disclosure. Therefore, the memory 130 may mean computer-readable media for storing software codes required for performing the exemplary embodiments of the present disclosure, data which become execution targets of the codes, and execution results of the codes.

According to an exemplary embodiment of the present disclosure, the memory 130 may mean any type of storage medium, and include, for example, at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the memory 130 used in the present disclosure is not limited to the examples.

In the present disclosure, the communication unit (not illustrated) may be configured regardless of communication modes such as wired and wireless modes and constituted by various communication networks including a personal area network (PAN), a wide area network (WAN), and the like. Further, the network unit 150 may operate based on known World Wide Web (WWW) and may adopt a wireless transmission technology used for short-distance communication, such as infrared data association (IrDA) or Bluetooth.

The computing device 100 in the present disclosure may include any type of user terminal and/or any type of server. Therefore, the exemplary embodiments of the present disclosure may be performed by the server and/or the user terminal.

In an exemplary embodiment, the user terminal may include any type of terminal which is capable of interacting with the server or another computing device. The user terminal may include, for example, a mobile phone, a smart phone, a laptop computer, personal digital assistants (PDA), a slate PC, a tablet PC, and an Ultrabook. In an exemplary embodiment, the user terminal may mean a device including a camera, which is installed in the vehicle.

In an exemplary embodiment, the server may include, for example, any type of computing system or computing device such as a microprocessor, a mainframe computer, a digital processor, a portable device, and a device controller.

In an exemplary embodiment, the server may include a storage unit (not illustrated) for storing data and/or information used in the present disclosure. The storage unit may be included in the server, or may be present under the management of the server. As another example, the storage unit may also be present outside the server, and implemented in a form which is capable of communicating with the server. In this case, the storage unit may be managed and controlled by another external server different from the server. As another example, the storage unit may also be present outside the server, and implemented in a form which is capable of communicating with the server. In this case, the storage unit may be managed and controlled by another external server different from the server.

Figure 2:
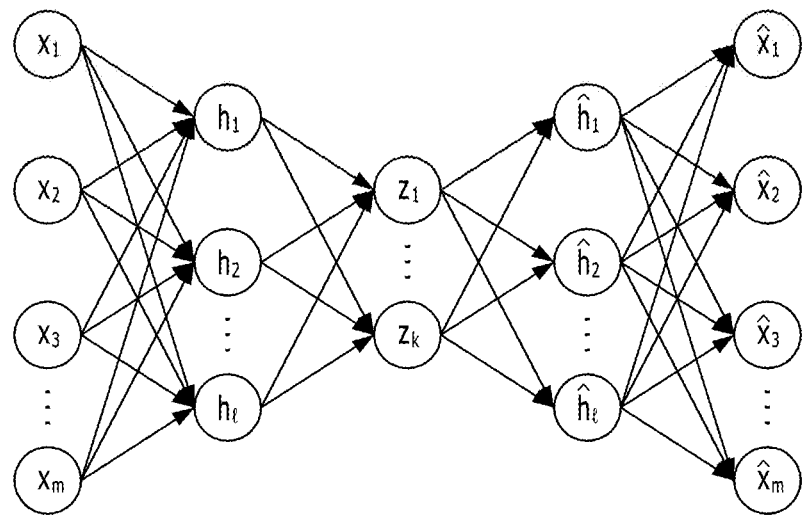
FIG. 2 illustrates an exemplary structure of an artificial intelligence model according to an exemplary embodiment of the present disclosure.

FIG. 2 illustrates an illustrative structure of an artificial intelligence model according to an exemplary embodiment of the present disclosure.

Throughout the present disclosure, the model, the artificial intelligence model, the artificial intelligence based model, the operation model, and the neural network, the network function, and the neural network may be used interchangeably.

The artificial intelligence model in the present disclosure may include models which are utilizable in various domains, such as a model for image processing such as object segmentation, object detection, and/or object classification, a model for text processing such as data prediction, text semantic inference and/or data classification, etc.

The neural network may be generally constituted by an aggregate of calculation units which are mutually connected to each other, which may be called "node". The nodes may also be called neurons. The neural network is configured to include one or more nodes. The nodes (or neurons) constituting the neural networks may be mutually connected to each other by one or more links.

The node in the artificial intelligence model may be used to mean a component that constitutes the neural network, and for example, the node in the neural network may correspond to the neuron.

In the neural network, one or more nodes connected through the link may relatively form a relationship between an input node and an output node. Concepts of the input node and the output node are relative and a predetermined node which has the relationship of the output node with respect to one node may have the relationship of the input node in the relationship with another node and vice versa. As described above, the relationship of the output node to the input node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable, and the weight may be varied by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationship in the neural network. A characteristic of the neural network may be determined according to the number of nodes, the number of links, correlations between the nodes and the links, and values of the weights granted to the respective links. For example, when the same number of nodes and links exist and two neural networks in which the weight values of the links are different from each other exist, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed from the initial input node up to the corresponding node. However, definition of the layer is predetermined for description and the order of the layer in the neural network may be defined by a method different from the aforementioned method. For example, the layers of the nodes may be defined by the distance from a final output node.

In an exemplary embodiment of the present disclosure, the set of the neurons or the nodes may be defined as the expression "layer".

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

The deep neural network (DNN) may mean a neural network including a plurality of hidden layers other than the input layer and the output layer. When the deep neural network is used, the latent structures of data may be identified. That is, photographs, text, video, voice, protein sequence structure, genetic sequence structure, peptide sequence structure, and/or potential structure of music (e.g., what objects are in the photo, what is the content and emotions of the text, what contents and emotions of the voice, etc.). The deep neural network may include convolutional neural network (CNN), recurrent neural network (RNN), auto encoder, generative adversarial networks (GAN), restricted Boltzmann machine (RBM), deep belief network (DBN), Q network, U network, Siamese network, etc. The description of the deep neural network described above is just an example and the present disclosure is not limited thereto.

The artificial intelligence model of the present disclosure may be expressed by a network structure of an arbitrary structure described above, including the input layer, the hidden layer, and the output layer.

The neural network which may be used in a clustering model in the present disclosure may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (e.g., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (e.g., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

According to an exemplary embodiment of the present disclosure, a computer readable medium or a computer program included in the computer readable medium is disclosed, which stores a data structure including the artificial intelligence model. The data structure may be stored in a storage unit (not illustrated) in the present disclosure, and executed by the processor 110 and transmitted and received by a communication unit (not illustrated).

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device may perform operations while using the resources of the computing device to a minimum. Specifically, the computing device may increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called "node". The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight may be varied by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, R-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example, and the present disclosure is not limited thereto.

Figure 3:
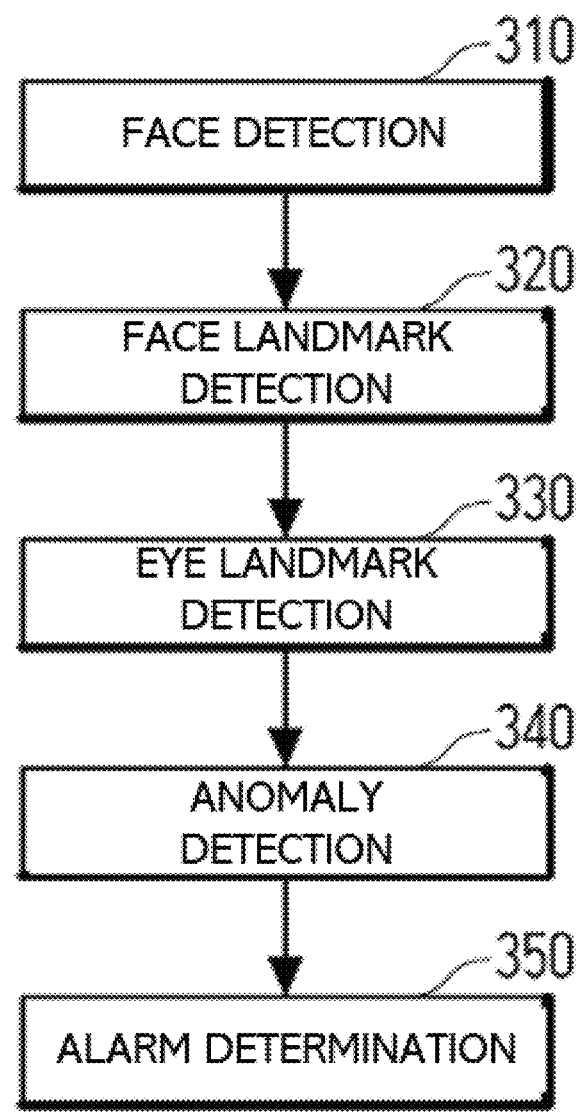
FIG. 3 exemplarily illustrates a method for detecting an anomaly in a DMS and determining an anomaly alarm according to an exemplary embodiment of the present disclosure.

FIG. 3 exemplarily illustrates a method for detecting an anomaly in a DMS and determining an anomaly alarm according to an exemplary embodiment of the present disclosure. As illustrated in FIG. 3, the computing device 100 may detect a face of a driver (310).

In an exemplary embodiment, the computing device 100 may obtain an image from a camera installed in a vehicle. For example, the image may include the driver in the vehicle.

In an exemplary embodiment, the computing device 100 may detect the face of the driver from the obtained image by using a model for face detection. For example, the model may include an object detection model and/or an object segmentation model. For example, the model may correspond to an artificial intelligence based model pre-trained to detect and/or segment a face of a person in the image.

In an exemplary embodiment, the model for the face detection may correspond to a detection model.

In an exemplary embodiment, the model for the face detection may output a result of segmenting an outline for defining the face in the image. In an exemplary embodiment, the model for the face detection may output a bounding box including the face in the image. In an additional exemplary embodiment, the model for the face detection may also be configured to jointly output an area corresponding to the face in the image, and a plurality of feature points which may identify the face in the area. In an additional exemplary embodiment, the model for the face detection may also be configured to jointly output the area corresponding to the face in the image, the plurality of feature points which may identify the face in the area, and a plurality of feature points which may identify an eye in the face.

In an exemplary embodiment, the computing device 100 may detect a face landmark on the detected face (320).

In an exemplary embodiment, the computing device 100 may obtain feature points included in the face of the driver on the face of the driver by using a model for detecting face landmark. In the present disclosure, the feature point and the landmark may be used interchangeably with each other.

In an exemplary embodiment, the model for detecting the face landmark may correspond to an artificial intelligence based model pre-trained to determine a plurality of feature points for identifying a feature (e.g., a feature of an eye, a feature of a nose, and/or a feature of a mouth) of the face on the face of the driver. In an additional exemplary embodiment, the model for detecting the face landmark may also be configured to jointly output the plurality of feature points which may identify the face in the face area, and the plurality of feature points which may identify the eye in the face.

In an exemplary embodiment, the model for detecting the face landmark may correspond to the detection model.

In an exemplary embodiment, an identity of the driver may be identified based on face landmark detection of the driver. The identification of the identity of the driver may be performed based on a comparison between a prestored face landmark of the driver and the detected face landmark of the driver.

In an exemplary embodiment, the computing device 100 may detect an eye landmark in the image (330).

As an example, the eye landmark detection may be more efficiently performed by using a face detection result. As an example, the eye landmark detection may be included in the face detection result. Based on the eye landmark detection, the computing device 100 may determine whether the driver is drowsy and/or the driver is distracted. For example, the eye landmark detection may detect a location of the eye in the face, whether the eye is closed, and/or a direction in which the eye looks.

As an example, the model for eye landmark detection may correspond to the detection model.

In an exemplary embodiment, the computing device 100 may detect an anomaly in the image (340).

In an exemplary embodiment, the computing device 100 may detect the anomaly in the image by using an eye landmark detection result. For example, the computing device 100 may determine whether a distraction (e.g., carelessness of looking forward) of the driver exists during a driving process by using the eye landmark detection result. For example, the computing device 100 may determine whether the driver is in a drowsy state during the driving process by using the eye landmark detection result.

In the present disclosure, the anomaly may be used to express an abnormal operation during the driving process. In the present disclosure, the anomaly may be used to express a situation and/or an operation which inhibits safety during the driving process. For example, the anomaly may include a first anomaly corresponding to no seatbelt, a second anomaly corresponding to distraction in a driving situation, a third anomaly corresponding to drowsiness in the driving situation, a fourth anomaly corresponding to smoking of the driver, a fifth anomaly corresponding to a fire in a vehicle, and/or a sixth anomaly corresponding to eye closing in the driving situation.

In an additional exemplary embodiment, the computing device 100 may detect a plurality of anomalies by using one model. In another exemplary embodiment, the computing device 100 may also operate to detect a plurality of anomalies by using a plurality of models (e.g., a model dedicated to specific anomaly detection).

In an additional exemplary embodiment, the computing device 100 may detect a body of the driver in the image. As an example, after the face of the driver is detected, the body of the driver may be detected in the image based on the face of the driver. As another example, the body detection of the driver may also be performed independently of the face detection of the driver. Whether the driver wear the seatbelt, whether the driver is smoking, and/or whether a hand of the driver is may be determined based on the body detection. Anomalies (e.g., no seatbelt, smoking, and/or fire in the vehicle) related to the body of the driver may be detected based on the body detection of the driver.

As an example, a model for detecting the body may correspond to the detection model.

In an additional exemplary embodiment, the computing device 100 may detect a plurality of anomalies by using one model. In another exemplary embodiment, the computing device 100 may also operate to detect a plurality of anomalies by using a plurality of models (e.g., a model dedicated to specific anomaly detection).

In an exemplary embodiment, the computing device 100 may determine whether there is an anomaly (e.g., distraction) corresponding to an input image by using a classification model using the eye detection result and/or the face detection result. As a non-limiting example, the classification model may operate to distinguish input image front or non-front. As a non-limiting example, the classification model may operate to output a quantitative value in which the input image faces the front or the non-front.

In an exemplary embodiment, the computing device 100 may determine an alarm corresponding to the anomaly by using the anomaly detection result (350).

In an exemplary embodiment, the alarm corresponding to the anomaly or the anomaly alarm may include various types of outputs for allowing the user to recognize the anomaly, such as sound, image, vibration, and/or light.

For example, when the computing device 100 determines that there is the anomaly in the image by using one or more models, the computing device 100 may determine whether to generate the alarm corresponding to the anomaly. When the anomaly detection leads directly to the anomaly alarm, there may be a problem in that an unnecessary alarm or an inaccurate alarm may be generated for the driver during the driving process. As a result, the technique according to an exemplary embodiment of the present disclosure determines whether to generate the anomaly alarm by using the anomaly detection result to provide a more optimized and more accurate alarm to the user. As an example, when there are/or a situation in which the distraction of the driver is detected, a situation in which the drowsiness of the driver is detected, and/or a situation in which the driver does not wear the seatbelt, it may be determined whether there is the anomaly.

For example, when the computing device 100 determines that there is the anomaly in the image, the computing device 100 may determine the type of alarm and/or the intensity of the alarm corresponding to the anomaly. The computing device 100 may also determine the intensity of the anomaly alarm in the image by using one or more models. For example, the computing device 100 compares a prediction result related to the anomaly with each of a plurality of thresholds to determine the intensities of a plurality of anomaly alarms or the intensity of the anomaly alarm. For example, the computing device 100 applies one or more counter concepts to the prediction results related to the anomaly to determine the intensities of the plurality of anomaly alarms or the intensity of the anomaly alarm by a method of comparing each of the counters and a threshold. As a result, the technique according to an exemplary embodiment of the present disclosure determines whether to generate the anomaly alarm by using the anomaly detection result, and/or determines the intensity of the anomaly alarm to provide the more optimized and more accurate alarm to the user. As an example, when there are/or a situation in which the distraction of the driver is detected, a situation in which the drowsiness of the driver is detected, and/or a situation in which the driver does not wear the seatbelt, it may be determined whether there is the anomaly. As such, as the type of alarm and/or the intensity of the alarm corresponding to the anomaly are/is controlled, a more intuitive and accurate alarm may be transferred to the user, so utilization of the DMS may be maximized.

Figure 4:
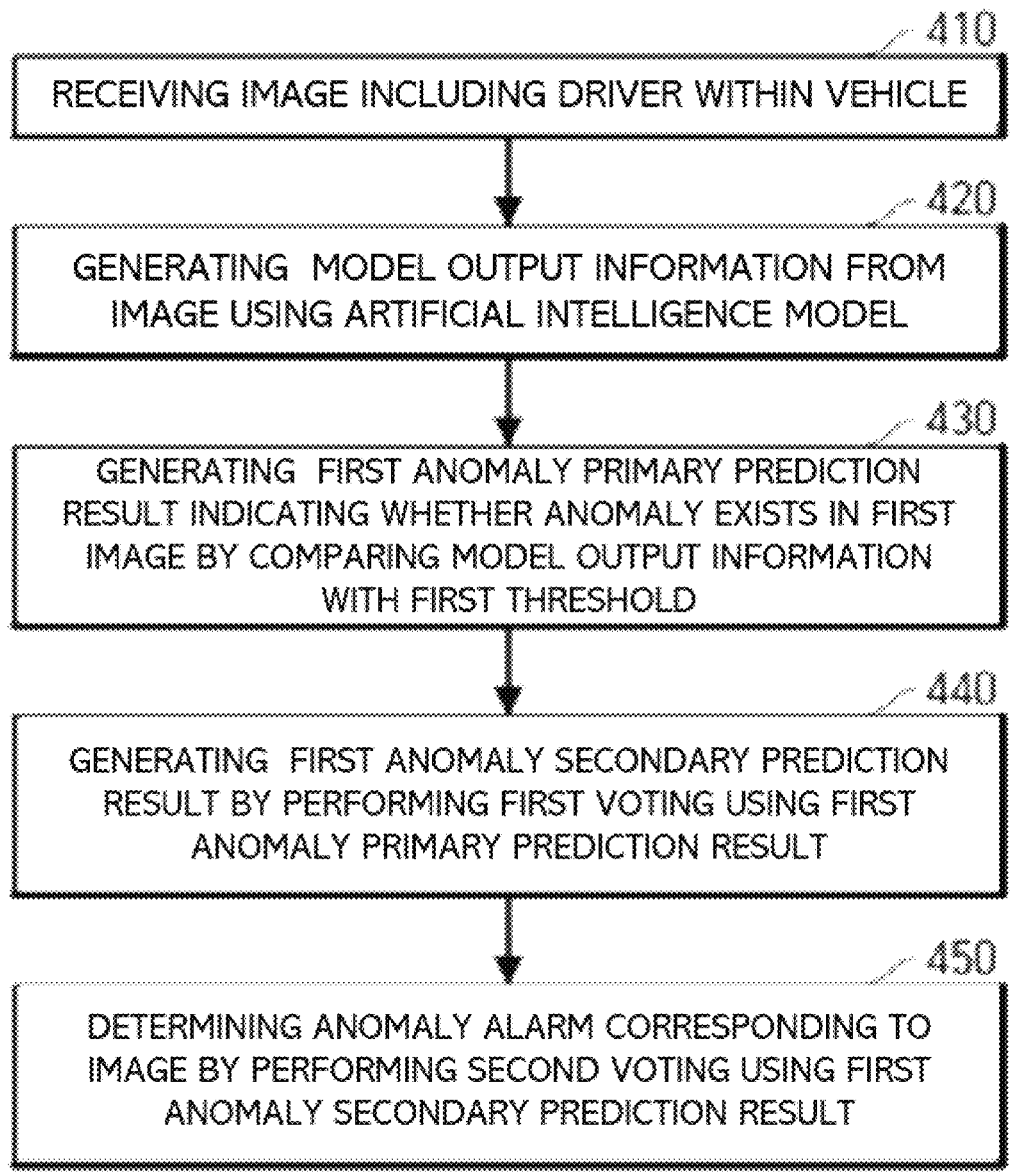
FIG. 4 exemplarily illustrates a method for determining the anomaly alarm in the DMS according to an exemplary embodiment of the present disclosure.

FIG. 4 exemplarily illustrates a method for determining whether the anomaly alarm is generated in the DMS according to an exemplary embodiment of the present disclosure.

In an exemplary embodiment, the computing device 100 may receive an image including the driver in the vehicle (410).

In an exemplary embodiment, an image (or first image) as an image including the driver may indicate a target image which becomes a target for determining the anomaly alarm.

In an exemplary embodiment, the image means an image obtained or received from the camera. In an exemplary embodiment, the image may mean an image obtained by photographing the driver by the camera installed in the vehicle. In an exemplary embodiment, the image may correspond to a target image which becomes a target for determining the alarm corresponding to no seatbelt. In an exemplary embodiment, the image may correspond to a target image which becomes a target for determining the alarm corresponding to distraction. In an exemplary embodiment, the image may correspond to a target image which becomes a target for determining the alarm corresponding to eye closing. In an exemplary embodiment, the image may correspond to a target image which becomes a target for determining the alarm corresponding to drowsiness.

The image in the present disclosure may be used as a meaning that encompasses one or more frames. For example, one image may correspond to one frame. For example, the image as a still image may correspond to a frame obtained from a moving picture. For example, the image may include a group of frames which are photographed multiple times.

In an exemplary embodiment, the image may correspond to an image or a frame photographed at a specific time. In an exemplary embodiment, the image may mean a still image or frame extracted or captured from a moving picture for the driver photographed by the camera.

In an exemplary embodiment, the computing device 100 may obtain a plurality of images or moving pictures obtained by the camera. The computing device 100 may obtain or extract a specific image (e.g., a specific frame) among the obtained images or moving pictures in order to determine the anomaly judgment or anomaly alarm. As an example, an image which becomes a target of the anomaly judgment or anomaly alarm judgment may correspond to a frame selected or determined among the plurality of frames. In such an example, the computing device 100 may extract the specific frame among the plurality of frames randomly or by the unit of a predetermined time period.

In an exemplary embodiment, the computing device 100 may generate model output information from the image by using an artificial intelligence model (420).

In an exemplary embodiment, the model may correspond to a deep learning-based model pre-trained to receive an image of the driver, and output an existence possibility of a predetermined object from the image of the driver. In such an exemplary embodiment, the model may output a possibility that the seatbelt will exist in the image and/or a wearing possibility of the seatbelt as model output information. In such an exemplary embodiment, the model may output an eye closing possibility and/or a drowsiness possibility as the model output information in the image. In such an exemplary embodiment, the model may output a distance between an upper portion and a lower portion of the eye in the image as the model output information. In such an exemplary embodiment, the model may output a front carelessness possibility and/or gaze information of the driver as the model output information in the image.

In another exemplary embodiment, the model may correspond to a deep learning-based model pre-trained to receive the image of the driver, and output a possibility that a predetermined anomaly inhibiting safety will exist in the image of the driver. The model may be pre-trained based on a training data set labeled with whether the anomaly being present in the image. The model may be pre-trained based on a training data set labeled with a possibility that the anomaly will be present in the image. The model may be pre-trained based on a training data set labeled with a location of the anomaly and/or the type of anomaly in the image.

In an exemplary embodiment, the model output information may include a value quantitatively indicating a possibility that a predetermine object(s) will be present in the image. For example, the model output information may include a detection score of the seatbelt in the image. For example, the model output information may include quantitative information related to detection of the seatbelt in the image. For example, the model output information may include an eye closing score in the image. For example, the model output information may include a score related to drowsiness in the image. For example, the model output information may include a score related to a distance between an upper portion and a lower portion of the eye in the image. For example, the model output information may include a score related to non-looking forward or distraction in the image.

In an exemplary embodiment, first model output information may include a value quantitatively indicating a possibility that the anomaly will be present in a first image. In an exemplary embodiment, the first model output information may also include a value indicating whether' that the anomaly exists in the first image. For example, the first model output information may include quantitative information related to non-detection of the seatbelt in the image. For example, the first model output information may include quantitative information related to eye closing of the driver in the image. For example, the first model output information may include quantitative information related to drowsiness of the driver in the image. For example, the first model output information may include quantitative information related to looking forward and non-looking forward of the driver or quantitative information related to distraction of the driver in the image.

In an exemplary embodiment, as the first image obtained from the camera is input into the artificial intelligence based model, the first model output information indicating a possibility that a predetermined object or a predetermined action will be present may be obtained in the first image.

In an exemplary embodiment, the model output information may mean an output of the model. For example, the model may generate model output information quantitatively indicating a presence possibility of the anomaly (e.g., no seatbelt, distraction, eye closing, and/or drowsiness) in the first image. For example, the model may generate model output information indicating whether the anomaly is present in the first image. For example, the model may generate model output information quantitatively indicating a possibility of a predetermined object or a predetermined action such as seatbelt, eye closing, drowsiness, tobacco, looking forward, and/or non-looking forward in the first image.

In an exemplary embodiment, the model output information may mean a result in which postprocessing is applied to the output of the model. In an exemplary embodiment, the model output information may mean a result of processing the output of the model. For example, the model may generate an output indicating a bounding box corresponding to the anomaly or a specific object, and/or anomaly possibility of the bounding box or a possibility to correspond to the specific object, and the computing device 100 may generate model output information indicating an anomaly possibility or whether there is the anomaly through post-processing for the output of the model or indicating a detection possibility of the specific object. For example, the model may output a result related to detection of the seatbelt in the image, and the computing device 100 may generate a result related to wearing or non-wearing of the seatbelt of the driver from the result. For example, the model may output a result corresponding to the face, and the computing device 100 may calculate a yaw value and/or a pitch value from the result corresponding to the face, and generate model output information indicating whether there is the distraction or a distraction possibility based on the calculated yaw value and pitch value. For example, when the model outputs a result of detecting an object in a first space, the computing device 100 generates a transform result by transforming the result into a transformed space to generate model output information indicating whether there is drowsiness or a drowsiness possibility.

In an exemplary embodiment, the model output information may be determined for each image (e.g., for each frame).

In an exemplary embodiment, the computing device 100 compares first model output information and a first threshold to generate a primary prediction result of a first anomaly indicating whether the anomaly exists in a first image (430).

In an exemplary embodiment, the computing device 100 may compare the first model output information and a predetermined threshold for anomaly judgment. In an exemplary embodiment, the first model output information may include a quantitative value for comparison with a threshold. In an exemplary embodiment, the threshold may indicate a variable threshold which is changeable for each of images to be compared. In an exemplary embodiment, the above-described threshold may be dynamically changed based on other information.

In an exemplary embodiment, the computing device 100 may generate or obtain the primary prediction result of the first anomaly indicating whether the anomaly exists in the first image based on the result of the comparison. For example, the primary prediction result of the first anomaly may be generated or obtained through comparison between the output of the model or the quantitative value of processing the output of the model with a threshold. The primary prediction result of the first anomaly may have a value indicating whether there is the anomaly in the corresponding image. For example, the primary prediction result of the first anomaly may have a value of 1 when there is the anomaly and a value of 0 when there is no anomaly, or vice versa according to an implementation aspect. In such an example, when the first model output information has a value of 0.7 and the threshold has a value of 0.6, the primary prediction result of the first anomaly may be set to have the value of 1 indicating that there is the anomaly. When the first model output information has a value of 0.5 and the threshold has a value of 0.6, the primary prediction result of the first anomaly may be set to have the value of 0 indicating that there is no anomaly. In an exemplary embodiment, the primary prediction result of the first anomaly may be determined for each image (e.g., for each frame). For example, the primary prediction result of the first anomaly may be set to have the value of 1 when the seatbelt is not detected, and the value of 0 when the seatbelt is detected. For example, the primary prediction result of the first anomaly may be set to have the value of 0 when the eye closing is not detected, and the value of 1 when the eye closing is detected. For example, the primary prediction result of the first anomaly may set to have the value of 0 when the drowsiness is not detected, and the value of 1 when the drowsiness is detected. For example, the primary prediction result of the first anomaly may set to have the value of 0 when the front carelessness is not detected, and the value of 1 when the front carelessness is detected. In such an example, the first model output information may be set to have a higher value as the possibility that the seatbelt will not be detected is higher. In such an example, the first model output information may be set to have a higher value as the possibility that the eye closing, the drowsiness, and/or the front carelessness will be detected is higher.

The technique according to an exemplary embodiment of the present disclosure dynamically controls the threshold to be compared with the model output information by various methods to ensure the accuracy and reliability for the output of the model.

In an exemplary embodiment, the first threshold may be determined based on at least one previous anomaly primary prediction result corresponding to at least one previous image obtained prior to the first image. In an exemplary embodiment, the first threshold to be compared with the first model output information may be determined based on second model output information generated by the model in response to a second image obtained prior to the first image. In an exemplary embodiment, the first threshold to be compared with the first model output information may be changed based on a threshold for anomaly judgment of the second image obtained immediately prior to the first image based on the previous anomaly primary prediction result or previous model output information. A current threshold corresponding to a current image may be variable between comparison between the previous image and the previous threshold. For example, when the model output information of the previous image exceeds the previous threshold, the current threshold corresponding to the current image may be determined as a low threshold among a plurality of threshold options, or decreased from the previous threshold. For example, when the model output information of the previous image does not exceed the previous threshold, the current threshold corresponding to the current image may be determined as a high threshold among the plurality of threshold options, or increased from the previous threshold.

In an additional exemplary embodiment, the first threshold to be compared with the first model output information may be determined based on comparison between anomaly primary prediction results obtained from the previous image and a specific threshold. The specific threshold may be considered as a threshold for determining another threshold. In such an exemplary embodiment, in determining the current threshold of the current image, the computing device 100 compares a ratio value of the value of 1 in a plurality of previous anomaly primary prediction results (e.g., having the value of 0 or 1) corresponding to a plurality of previous images, and a specific threshold, and compares a ratio value of the value of 0 and the specific threshold to determine what a primary prediction result exceeding the specific threshold is. The computing device 100 may determine to set the threshold to a low value among the plurality of threshold options or decrease the threshold based on the previous threshold, when the primary prediction result exceeding the specific threshold is 1. The computing device 100 may determine to set the threshold to a high value among the plurality of threshold options or increase the threshold based on the previous threshold, when the primary prediction result exceeding the specific threshold is 0. The computing device 100 may determine to maintain the threshold when the primary prediction result exceeding the specific threshold is neither 0 nor 1.

In an exemplary embodiment, a change range of the threshold may be predetermined. The threshold may be sequentially increased, or sequentially decreased, or maintained by a counter scheme based on the prediction result of the previous image(s). The increase or decrease of the threshold may be made within the change range of the threshold.

In an additional exemplary embodiment, the first threshold to be compared with the first model output information may also be determined based on an anomaly secondary prediction result of the previous image. In such an exemplary embodiment, when the anomaly secondary prediction result of the previous image is 1, the threshold of the current image may be decreased compared to the previous threshold or set to the low value among the plurality of threshold options. When the anomaly secondary prediction result of the previous image is 0, the threshold of the current image may be increased compared to the previous threshold or set to the high value among the plurality of threshold options.

In an exemplary embodiment, an expression "determined based on specific information" may include a case where the size of the threshold may be quantitatively changed according to the size of a value of the specific information and/or the type of value. The computing device 100 may obtain a plurality of images depending on the time. An anomaly primary prediction result for each of the plurality of images may be obtained. For example, a second anomaly primary prediction result corresponding to the second image obtained prior to the first image may be obtained, and the first anomaly primary prediction result corresponding to the first image may be obtained. In such an example, the first threshold used to obtain the first anomaly primary prediction result corresponding to the first image may be determined based on the second anomaly primary prediction result corresponding to the second image. For example, the first threshold may be changed according to the second anomaly primary prediction result. For example, the first threshold may be determined as a predetermined value such as 0.3 when the second anomaly primary prediction result is 1 and 0.5 when the second anomaly primary prediction result is 0.

In an exemplary embodiment, a reference value to be varied herein may be a threshold corresponding to the second image obtained immediately prior to the first image. As an example, when the second anomaly primary prediction result includes a result in which there is the anomaly, the first threshold corresponding to the first image subsequent to the second image may be set to be increased compared to a past threshold (e.g., a threshold corresponding to the second image). When the size of the threshold is increased, it may be determined that the anomaly exists in the first image only when the quantitative value of the model output information corresponding to the image should have a relatively high value. As an example, when the second anomaly primary prediction result includes a result in which there is no anomaly, the first threshold corresponding to the first image subsequent to the second image may be set to be decreased compared to the past threshold. When the size of the threshold is decreased, it may be determined that the anomaly exists in the first image even though the quantitative value of the model output information corresponding to the image is relatively low.

In an additional exemplary embodiment, the first threshold to be compared with the first model output information may be changed based on second model output information corresponding to the second image obtained prior to the first image. For example, the first threshold may have a negative correlation with the value of the model output information of the previous image. In such an example, when the model output information of the previous image is relatively large, the size of the first threshold may be set to be decreased. When the model output information of the previous image is relatively small, the size of the first threshold may be set to be increased.

In an exemplary embodiment, the first threshold may be determined based on a second anomaly primary prediction result obtained by comparing a second threshold determined based on a third anomaly primary prediction result corresponding to a third image obtained prior to the second image, and the second model output information. Here, the second threshold may be a threshold for determining whether there is the anomaly in the second image.

As such, the technique according to an exemplary embodiment of the present disclosure may dynamically control a threshold for anomaly prediction or judgment of the current image by using an anomaly related result corresponding to the previous image with respect to each of a plurality of sequential images. The accuracy and/or reliability for the output of the model may be increased through the control of the threshold.

In an exemplary embodiment, the first threshold may be determined based on a ratio of a result value indicating the existence of the anomaly in the previous anomaly primary prediction results corresponding to a predetermined first number of images obtained prior to the first image. For example, when the ratio of the result value indicating the existence of the anomaly is equal to or more than a first ratio in the previous anomaly primary prediction results (e.g., a plurality of anomaly primary prediction results), the first threshold may be set to a first value, and when the ratio of the result value indicating the existence of the anomaly is less than the first ratio in the previous anomaly primary prediction results, the first threshold may be set to a second value higher than the first value.

In an exemplary embodiment, the first threshold may be determined or changed according to which result value of a result value indicating the existence of the anomaly and a result value indicating non-existence of the anomaly among the previous anomaly primary prediction results corresponding to a first number of images predetermined, which are obtained prior to the first image is a majority value. For example, when the majority value of the previous anomaly primary prediction results is the value indicating the existence of the anomaly, the first threshold corresponding to the current image may be set to be decreased. For example, when the majority value of the previous anomaly primary prediction results is the value indicating the non-existence of the anomaly, the first threshold corresponding to the current image may be set to be increased.

In an exemplary embodiment, the model output information corresponding to each of the plurality of sequentially obtained images may be structuralized in a form of a queue. For example, one queue may be constituted by a predetermined number of units. For example, the first model output information corresponding to the first image may be allocated to a first unit included in one queue, the second model output information corresponding to the second image may be allocated to a second unit, and third model output information corresponding to a third image may be allocated to a third unit.

In an exemplary embodiment, the anomaly primary prediction results corresponding to the plurality of sequentially obtained images, respectively may be structuralized in the form of the queue. The respective value corresponding to one image may be allocated to the same location in a plurality of queues. A queue constituted by the anomaly primary prediction results and a queue constituted by the model output information may have locations corresponding to each other with respect to one image. For example, the first image obtained at a first time may be allocated to each of the same locations in a first queue constituted by the model output information and a second queue constituted by the anomaly primary prediction results.

In an exemplary embodiment, one queue may be constituted by a predetermined number of units. For example, the predetermined number of units of one queue may include data corresponding to images obtained according to the flow of the time. For example, the first anomaly primary prediction result corresponding to the first image may be allocated to the first unit included in one queue, the second anomaly primary prediction result corresponding to the second image may be allocated to the second unit, and the third anomaly primary prediction result corresponding to the third image may be allocated to the third unit. In such an example, a threshold to be compared with a model output result corresponding to a current image currently obtained may be determined based on a ratio of a result value indicating the existence of the anomaly among the first anomaly primary prediction result, the second anomaly primary prediction result, and the third anomaly primary prediction result included in one queue. For example, when both the first anomaly primary prediction result and the second anomaly primary prediction result include the result value indicating that the anomaly exists, and the third anomaly primary prediction result includes a result value indicating that there anomaly does not exist, the ratio of the result value may have a value of ($2/3 \times 100$). By comparing the ratio of the result value with a specific threshold, the threshold corresponding to the current image may be determined or changed. The ratio indicating the existence of the anomaly in the previous anomaly prediction results and the size of the threshold corresponding to the current image may have a negative correlation. In the present disclosure, an expression "the first value and the second value have the negative correlation" may indicate that when the first value increases, the second value tends to decrease. In the present disclosure, the expression "the first value and the second value have the negative correlation" may indicate that when the first value becomes relatively larger, the second value becomes relatively smaller.

In an exemplary embodiment, the computing device 100 performs a first voting by using the first anomaly primary prediction result to generate a first anomaly secondary prediction result (440).

In an exemplary embodiment, the first anomaly secondary prediction result may indicate a quantitative value used as a parameter for determining an anomaly alarm corresponding to the first image. In another exemplary embodiment, the first anomaly secondary prediction result may have a value used as a parameter for determining whether the anomaly alarm corresponding to the first image is to be generated, and indicating whether the anomaly exists.

In an additional exemplary embodiment, the first threshold used for anomaly prediction of the first image may also be determined based on a secondary anomaly secondary prediction result corresponding to the second image obtained prior to the first image.

In an exemplary embodiment, the first voting may be used for correcting the accuracy and/or reliability of the output of the model. In an exemplary embodiment, the first voting may use the anomaly primary prediction results of the previous images obtained prior to the first image and the anomaly primary prediction result of the currently obtained first image.

In an exemplary embodiment, the first voting may include a process of determining what the majority value of the anomaly primary prediction results corresponding to the sequential images is. In an exemplary embodiment, the first voting may include a process of determining a ratio of the anomaly primary prediction results corresponding to the sequential images. In an exemplary embodiment, the first voting may include a process of comparing the ratio of the anomaly primary prediction results corresponding to the sequential images and a predetermined threshold.

In an exemplary embodiment, the first voting may use values on a voting queue constituted by a plurality of units corresponding to the sequential images. The values herein are the anomaly primary prediction results corresponding to the sequential images. For example, the first anomaly primary prediction result corresponding to the first image may be allocated to the first unit included in the voting queue, the second anomaly primary prediction result corresponding to the second image may be allocated to the second unit, and the third anomaly primary prediction result corresponding to the third image may be allocated to the third unit. Here, the first image may corresponding to an image obtained at a latest time or the current image, the second image may be the image obtained prior to the first image, and the third image may be the image obtained prior to the second image.

In an exemplary embodiment, a plurality of voting queues may exist. For example, among the voting queues, a first voting queue may include model output information obtained according to the time, a second voting queue may include primary prediction results obtained according to the time, and a third voting queue may include secondary prediction results obtained according to the time.

In an exemplary embodiment, the first anomaly secondary prediction result corresponding to the first image may be determined based on what the majority value of the first anomaly primary prediction result, the second anomaly primary prediction result, and the third anomaly primary prediction result is.

In an exemplary embodiment, the first anomaly secondary prediction result corresponding to the first image may be determined based on comparison between a ratio at which the result value indicting the anomaly occupies among the first anomaly primary prediction result, the second anomaly primary prediction result, and the third anomaly primary prediction result, and a specific threshold. For example, when the first anomaly primary prediction result indicates the existence of the anomaly, the second anomaly primary prediction result indicates the existence of the anomaly, and the third anomaly primary prediction result indicates the non-existence of the anomaly, the first anomaly secondary prediction result corresponding to the first image may be set to the majority value of three anomaly primary prediction results or the value (e.g., 1) indicating the existence of the anomaly which is a representative value thereof. As a result, the first unit corresponding to the first image in the queue constituted by the anomaly secondary prediction results may have the value of 1. For example, when the first anomaly primary prediction result indicates the non-existence of the anomaly, the second anomaly primary prediction result indicates the existence of the anomaly, and the third anomaly primary prediction result indicates the non-existence of the anomaly, the first anomaly secondary prediction result corresponding to the first image may be set to the majority value of three anomaly primary prediction results or the value (e.g., 0) indicating the non-existence of the anomaly which is a representative value thereof. As a result, the first unit corresponding to the first image in the queue constituted by the anomaly secondary prediction results may have the value of 0.

In an exemplary embodiment, the anomaly secondary prediction results corresponding to the plurality of sequentially obtained images, respectively may be structuralized in a form of the voting queue. The respective value corresponding to one image may be allocated to the same location in the plurality of queues. A queue constituted by the anomaly secondary prediction results, a queue constituted by the anomaly primary prediction results, and a queue constituted by the model output information may have locations corresponding to each other with respect to one image. For example, a value related to the anomaly prediction of the first image obtained at the first time may be allocated to each of the same locations (e.g., the locations corresponding to each other) in the queue constituted by the model output information, the queue constituted by the anomaly primary prediction results, and the queue constituted by the anomaly secondary prediction results.

The first voting according to an exemplary embodiment of the present disclosure may generate a group anomaly prediction result representing an image group constituted by the first image, and a second number of images predetermined, which are obtained prior to the first image in order to ensure the accuracy of the first model output information. The group anomaly prediction result may mean a result representing the anomaly primary prediction results corresponding to a plurality of images including the first image.

In an exemplary embodiment, the computing device 100 may determine a majority value of the anomaly primary prediction results corresponding to the first image, and the second predetermined number of images obtained prior to the first image, respectively, and generate the first anomaly secondary prediction result by using the determined majority value. As an example, the majority value may be determined as a result value occupying a higher ratio between the result value indicating the existence of the anomaly and the result value indicating the non-existence of the anomaly in the anomaly primary prediction results.

As another example, the majority value may be determined by comparing the result values which exist in the anomaly primary prediction results and a predetermined second threshold. For example, when the second threshold is 45%, and a ratio of a specific result value among the anomaly primary prediction results is 50%, the anomaly secondary prediction result may be set to the specific result value.

As described above, the technique according to an exemplary embodiment of the present disclosure performs the first voting using the anomaly primary prediction result to further enhance the reliability and accuracy of the anomaly judgment result.

In an exemplary embodiment, the anomaly secondary prediction result may include a quantitative value used as a parameter for determining the anomaly alarm corresponding to the obtained image. For example, the anomaly secondary prediction result may include a counter value. For example, in a situation in which a second anomaly secondary prediction result corresponding to the second image obtained prior to the first image has a value of 2, the value of 1 may be determined to be added according to the result of the first voting corresponding to the first image. In this case, a value of 2+1=3 may be included in the first anomaly secondary prediction result corresponding to the first image. In another example, in the situation in which the second anomaly secondary prediction result corresponding to the second image obtained prior to the first image has the value of 2, the value of 1 may be determined to be decreased according to the result of the first voting corresponding to the first image. In this case, a value of 2−1=1 may be included in the first anomaly secondary prediction result corresponding to the first image.

In an exemplary embodiment, a unit of the increased or decreased counter value may be determined based on a difference between acquisition times of images. For example, when the first image is obtained after 500 ms from an acquisition time of the second image in a state in which a counter value corresponding to the second image is 0.7, and it is determined that the value is added according to the result of the first voting corresponding to the first image, the counter value corresponding to the first image may be set to 0.7+0.5=1.2.

In an exemplary embodiment, the first anomaly secondary prediction result may be compared with a predetermined counter threshold. For example, when the counter value corresponding to the first anomaly secondary prediction result is equal to or more than the predetermined counter threshold, the computing device 100 may determine to generate an alarm (e.g., turning on the alarm). For example, when the counter value corresponding to the first anomaly secondary prediction result is changed to a value less than the counter threshold in a state in which a counter value corresponding to the second anomaly secondary prediction result is equal to or more than the counter threshold, the computing device 100 may determine to turn off the alarm.

In an exemplary embodiment, the first anomaly secondary prediction result may include a plurality of counters. As the plurality of counters are included as such, a plurality of types of alarms may be generated. For example, a first counter and a second counter may be included in the first anomaly secondary prediction result. According to the result of the first voting, values corresponding to the first counter and the second counter may be independently changed. The first counter and the second counter are compared with a first counter threshold and a second counter threshold pre-allocated, respectively, and when the counter value is equal to or more than the counter threshold, alarms corresponding to the respective counters may be generated. As an example, each of the counters may have predefined ranges of a minimum value and a maximum value, and when the counter deviates from the minimum value and the maximum value according to the result of the first voting, the value of the counter may be set to have the minimum value and the maximum value.

In an exemplary embodiment, the first anomaly secondary prediction result may be configured to generate the plurality of alarms as being compared with a plurality of counter thresholds. For example, a first counter value corresponding to the first image may be compared with each of a first counter threshold and a second counter threshold. When any one of the counter thresholds is satisfied, a first alarm corresponding to the corresponding counter threshold may be generated. When the other one of the counter thresholds is satisfied, a second alarm corresponding to the corresponding counter threshold may be generated.

In an exemplary embodiment, the computing device 100 performs a second voting by using the first anomaly secondary prediction result to determine an anomaly alarm corresponding to the first image (450).

In the present disclosure, the first voting may adopt the previous anomaly primary prediction result corresponding to at least one previous image obtained prior to the first image which becomes a target of the anomaly judgment, and the first anomaly primary prediction result corresponding to the first image. The second voting may adopt the previous anomaly secondary prediction result corresponding to the at least one previous image, and the first anomaly secondary prediction result corresponding to the first image.

In an exemplary embodiment, the second voting may be performed subsequently to the first voting. In an exemplary embodiment, the second voting may adopt the result of the first voting.

In an exemplary embodiment, the second voting may judge whether anomaly judgment results of a predetermined number of images have continuity. In an exemplary embodiment, when the anomaly judgment results of a predetermined number of images have continuity as the value indicating that the anomaly exists, the second voting may determine to generate the anomaly alarm.

In an exemplary embodiment, the second voting may determine an image group constituted by a first image corresponding to a current image, and sequential images obtained prior to the first image in order to ensure the accuracy of the generation of the anomaly alarm. The second voting may determine whether anomaly secondary prediction results corresponding to the images constituting the image group have the continuity. The second voting is a process using whether the anomaly secondary prediction results have the continuity. For example, when all of the anomaly secondary prediction results in the image group constituted by the sequential images including the first image indicate the existence of the anomaly, the computing device 100 may determine to generate the anomaly alarm corresponding to the first image. For example, when some of the anomaly secondary prediction results in the image group constituted by the sequential images including the first image indicate the existence of the anomaly and some others indicate the non-existence of the anomaly, the computing device 100 may determine that the anomaly secondary prediction results have no continuity.

For example, it is assumed that a reference number for judging the continuity is 3. Under such an assumption, if any of the first anomaly secondary prediction result, the second anomaly secondary prediction result, and the third anomaly secondary prediction result corresponding to three sequential images including the first image which becomes a target of the anomaly judgment currently do not indicate the existence of the anomaly, the result value of the anomaly alarm corresponding to the first image may be set to 0 through the second voting. In such an example, the anomaly alarm will not be generated for the currently obtained first image.

In an exemplary embodiment, the second voting may include comparison between the anomaly secondary prediction result including the counter value and a counter threshold. For example, it is assumed that the counter threshold is 3. In such an example, when the anomaly secondary prediction result reaches 3, an alarm corresponding to the corresponding counter threshold may be turned on. Further, the anomaly secondary prediction result is changed from 3 to 2, the alarm may be turned off. As described above, the second voting may be performed in a form of comparing the plurality of counter values and the counter thresholds, respectively. The second voting may be performed in a form of comparing one counter value and each of the plurality of counter thresholds.

As described above, the technique according to an exemplary embodiment of the present disclosure may use one or more votings in order to generate the alarm corresponding to the anomaly. As one or more votings are used, sensitivity, accuracy, and reliability of an alarm corresponding to an anomaly situation may be all enhanced.

Figure 5:
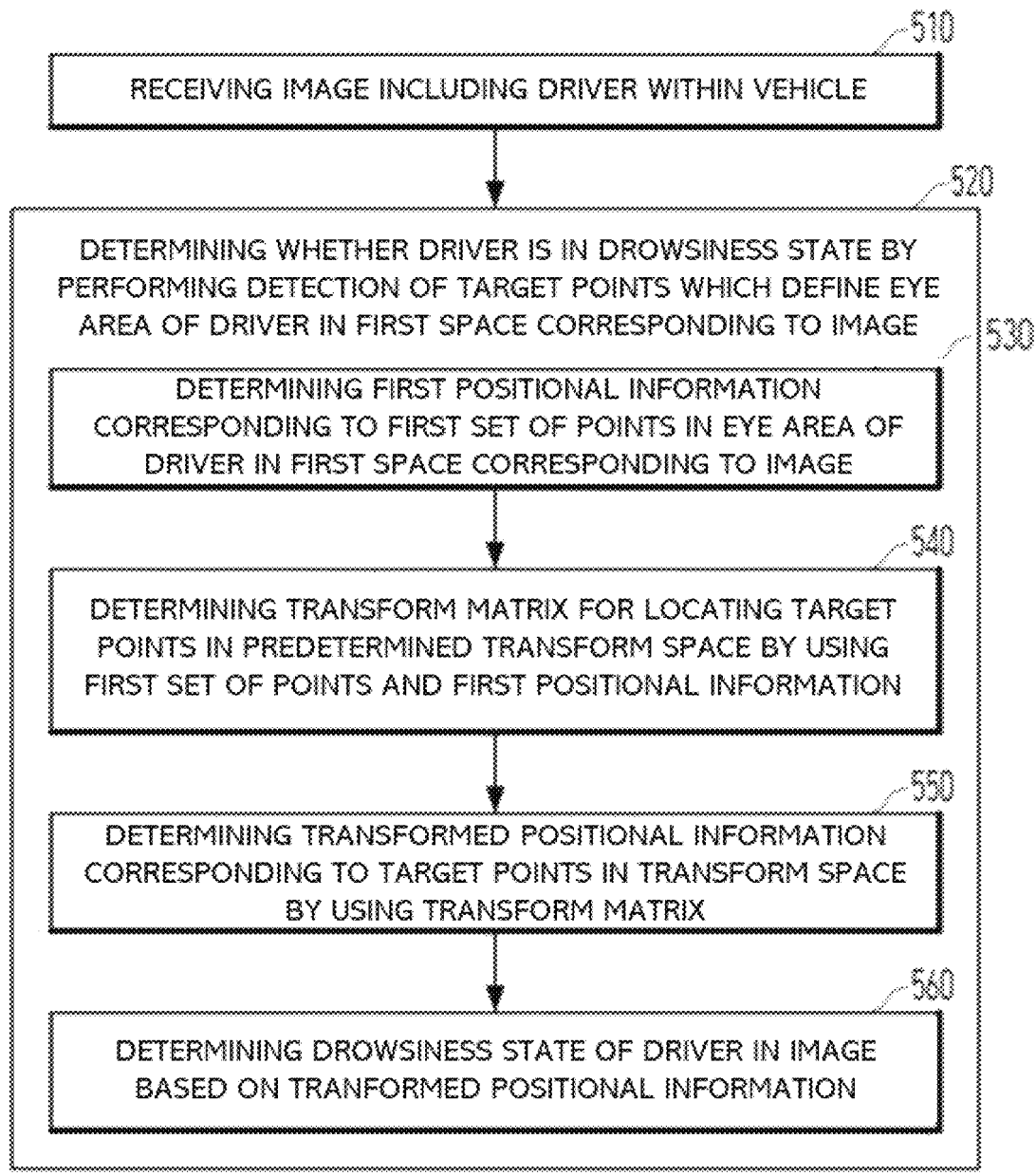
FIG. 5 exemplarily illustrates a method for determining a drowsiness state of a driver according to an exemplary embodiment of the present disclosure.

FIG. 5 exemplarily illustrates a method for determining a drowsy state of a driver according to an exemplary embodiment of the present disclosure.

In an exemplary embodiment, the computing device 100 may receive or obtain an image including a face of a driver in a vehicle (510).

In an exemplary embodiment, the image means an image received or obtained from the camera. In an exemplary embodiment, the image may mean an image received or obtained by photographing the driver by the camera installed in the vehicle.

In an exemplary embodiment, the image may correspond to an image or a frame photographed at a specific time. In an exemplary embodiment, the image may mean a still image or frame extracted or captured from a moving picture for the driver photographed by the camera.

In an exemplary embodiment, the computing device 100 may receive or obtain a plurality of images or moving pictures obtained by the camera. The computing device 100 may receive, obtain or extract a specific image (e.g., a specific frame) among the obtained or received images or moving pictures in order to judge whether there is drowsiness or provide a drowsiness alarm. As an example, an image which becomes a target of the drowsiness judgment or drowsiness alarm judgment may correspond to a frame selected or determined among the plurality of frames. In such an example, the computing device 100 may extract the specific frame among the plurality of frames randomly or by the unit of a predetermined time period.

In an exemplary embodiment, the computing device 100 performs detection of target points defining an eye area of the driver in a first space corresponding to the obtained image to determine whether the driver is in a drowsiness state (520).

In an exemplary embodiment, the first space may mean a space included in the obtained image. In an exemplary embodiment, the first space may mean a space having a coordinate system corresponding to the obtained image.

In an exemplary embodiment, the eye area may mean a bounding box including an eye of the driver in the image. In an exemplary embodiment, the eye area may mean a segmentation area defining a shape of the eye or an outline of the eye of the driver in the image. In an exemplary embodiment, the eye area may include one or more feature points or landmarks for identifying the eye of the driver in the image.

As an example, the eye area and/or the target points may be detected by a detection model.

In an exemplary embodiment, the target points are feature points included in the face of the driver, and a group of the target points may define the eye area. For example, the target points may mean feature points defining the shape of the eye or the outline of the eye of the driver. For example, the target points may be used to define a boundary line of the eye area for identifying the eye in the face. For example, when the target points are connected, the eye area of the driver may be defined.

In an exemplary embodiment, the computing device 100 may detect the target points defining the eye area by using the model. As an example, the model may correspond to an artificial intelligence based model using heatmap regression. The model which is the model detecting the target points of the eye area may use a heatmap in a regression process for the target points.

In an exemplary embodiment, the computing device 100 may judge whether the eye of the driver is closed by using a detection result for the target points of the eye area. The computing device 100 may determine whether the driver is in the drowsy state based on the judgment of whether the eye is closed. For example, when the it is determined that the driver is in the drowsy state (or an eye closing state) in the first image, and it is determined that the driver is also in the drowsy state (or the eye closing state) in a predetermined number of subsequent images subsequent to the first image, the computing device 100 may determine that the driver is also in the drowsy state (or the eye closing state). As an example, the computing device 100 may determine whether to provide the drowsiness alarm to the driver based on the determination of the driver being in the drowsy state (or the eye closing state).

In an exemplary embodiment, the computing device 100 may transform the first space corresponding to the first image for more accurate detection for the eye area and in order to more accurately perform the judgment of the eye closing. The computing device 100 may normalize the eye area based on the eye area in the transformed space, and as a result, in an exemplary embodiment of the present disclosure, since space transform is used, the eye area may be accurately detected even though various sizes of face images photographed at various angles and various distances are input.

In an exemplary embodiment, the computing device 100 may determine first positional information corresponding to a first set of points in the eye area of the driver in the first space corresponding to the image (530).

In an exemplary embodiment, the target points may be constituted the first set of points and a second set of points. The first set of points may mean points which become a reference of coordinate transform or space transform. The first set of points may mean feature points which become a reference when judging the eye area. For example, the first set of points may include a left end point and a right end point in the eye area. For example, the number of first set of points and the number of first positional information may correspond to each other. For example, when the number of first set of points is eight, eight first positional information corresponding to the first set of points may be determined. The first positional information may mean positional information (e.g., coordinate values) in the first space, which correspond to the first set of points. The second set of points may mean the remaining points other than the first set of points among the target points corresponding to the eye area or defining the eye area. For example, the second set of points may include the remaining points other than the left end point and the right end point among the target points.

In an exemplary embodiment, the computing device 100 may determine a transform matrix for locating the target points defining the eye area in the first space in a predetermined transform space by using the first set of points and the first positional information (540).

In an exemplary embodiment, the transform matrix (or a transformation matrix) may mean a matrix for performing coordinate transform from the first space to the transformed space. In an exemplary embodiment, the transform matrix may mean a matrix for locating the target points in the first space to the transformed space by using the first set of points (e.g., the left end point and the right end point) as a reference axis in the transformed space. The transform matrix may perform scaling, rotation, translation, shearing, and/or reflection in order to locate the first set of points in the transformed space.

In an additional exemplary embodiment, the first set of points may also include a first point and a second point forming a first straight line which are longest among straight lines which may be formed by connecting two points among the target points. In such an exemplary embodiment, the transform matrix may transform locations of the target points so that a center point of the first straight line is located at a center point in the transformed space.

In an exemplary embodiment, the computing device 100 may determine transformed positional information corresponding to the target points in the transformed space by using the transform matrix (550).

In an exemplary embodiment, the computing device 100 applies the transform matrix to a second set of points to locate the second set of points from the first space to the transformed space. The computing device 100 obtains second transformed positional information corresponding to the second set of points located in the transformed space to determine transformed positional information corresponding to the target points.

In an exemplary embodiment, the computing device 100 applies the transform matrix to the first set of points and the second set of points to locate the first set of points from the first space to the transformed space, and locate the second set of points from the first space to the transformed space. The computing device 100 obtains first transformed positional information corresponding to the first set of points located in the transformed space, and second transformed positional information corresponding to the second set of points located in the transformed space to determine the transformed positional information corresponding to the target points.

By the above-described scheme, the computing device 100 may determine the transform matrix by using the first set of points corresponding to the eye area, and transform the eye area from a coordinate system corresponding to the image into a normalized coordinate system by using the transform matrix. When an image including the eye area transformed to the normalized coordinate system is input into the artificial intelligence based model, the accuracy of an output (e.g., an eye area detection result and/or an eye closing judgment result) of the artificial intelligence based model may be enhanced.

In an exemplary embodiment, the computing device 100 may determine the drowsy state of the driver in the image based on the transformed positional information (560).

In an exemplary embodiment, the computing device 100 may determine whether the driver is in the drowsy state in the image by using an artificial intelligence based first model which generates output data indicating whether the eye is closed in response to input data including the target points having the transformed positional information. For example, the first model may correspond to a model pre-trained by using a training data set labeled with whether the eye is closed in a face image. For example, the first model may correspond to an artificial intelligence based model that generates the output data indicating whether the eye is closed in response to the input data including the target points having the transformed positional information.

In an exemplary embodiment, the computing device 100 may determine whether the driver is in eye closing state in the image by using the artificial intelligence based first model which generates output data indicating whether the eye is closed in response to the input data including the target points having the transformed positional information.

Additionally, the computing device 100 may obtain a heatmap corresponding to points in a first image from the first image by using an artificial intelligence based second model, and determine whether to detect the target points defining the eye area in the first image or whether the eye of the driver is closed in the first image, by using the heatmap. For example, the computing device 100 may calculate a standard deviation for values corresponding to the points in the heatmap, respectively, and determine to detect the target points in the first image or determine that the driver does not closes the eye in the first image by using the second model when the standard deviation is exceeds a predetermined threshold reference.

In an exemplary embodiment, the computing device 100 may determine a size of a transformed eye area formed by the target points in the transformed space based on the transformed positional information. The computing device 100 may determine whether the driver is in the drowsy state in an input image based on the size of the transformed eye area. For example, when the size of the eye area is smaller than a predetermined threshold size, the computing device 100 may judge that the driver closes the eye in the image. For example, when the computing device 100 judges that the driver closes the eye, the computing device 100 may determine that the driver is in the drowsy state (or the eye closing state) in the corresponding image. For example, when the computing device 100 judges that the driver closes the eye in a plurality of sequential images, the computing device 100 may determine that the driver is in the drowsy state currently.

In an additional exemplary embodiment, the computing device 100 may be input with an image including the transformed eye area, and also determine the drowsy state of the driver by using an artificial intelligence based additional model pre-trained so as to output whether the eye closing exists in the input image. The artificial intelligence based additional model may correspond to the detection model, as an example.

A result of eye closing measurement using a landmark of the eye area may vary depending on the size of the face and/or the angle of the face on the camera. The size of the eye in the image obtained by the camera and the size of an actual eye may be different from each other according to the posture and movement of the driver even though both eyes actually have the same size. As a result, as described above, a transform matrix that performs coordinate system transform to a normalized space having a predetermined size by using both end points of both eyes as a reference axis is determined, and the determined transform matrix is applied to the remaining points of the eye area to determine positional information of the eye area in the normalized space (e.g., transformed space). When a landmark of the eye area transformed to the normalized space is used, the consistency and accuracy of the eye closing measurement may be secured.

In an exemplary embodiment, the computing device 100 may determine, from an input image, the drowsy state of the driver by using a second model pre-trained to output a heatmap corresponding to points (e.g., feature points) in the image. For example, the second model may correspond to an artificial intelligence based model pre-trained to detect the eye area in the image from the image by using heatmap regression. For example, the second model which is the model detecting the target points of the eye area may use a heatmap when performing a regression algorithm for the target points. In the exemplary embodiment, the computing device 100 may detect the target points corresponding to the eye area by using the second model. The computing device 100 may determine whether to determine whether the eye is closed, whether sunglasses are worn, whether to detect the target points, whether to provide the eye closing alarm, and/or whether to perform transform to the transformed space by using the heatmap which is the output of the second model. According to an implementation aspect, the first model and the second model may be the same model, or different models.

Detailed contents of the exemplary embodiments using the heatmap will be described later in FIGS. 6, 7, and 10.

Figure 6:
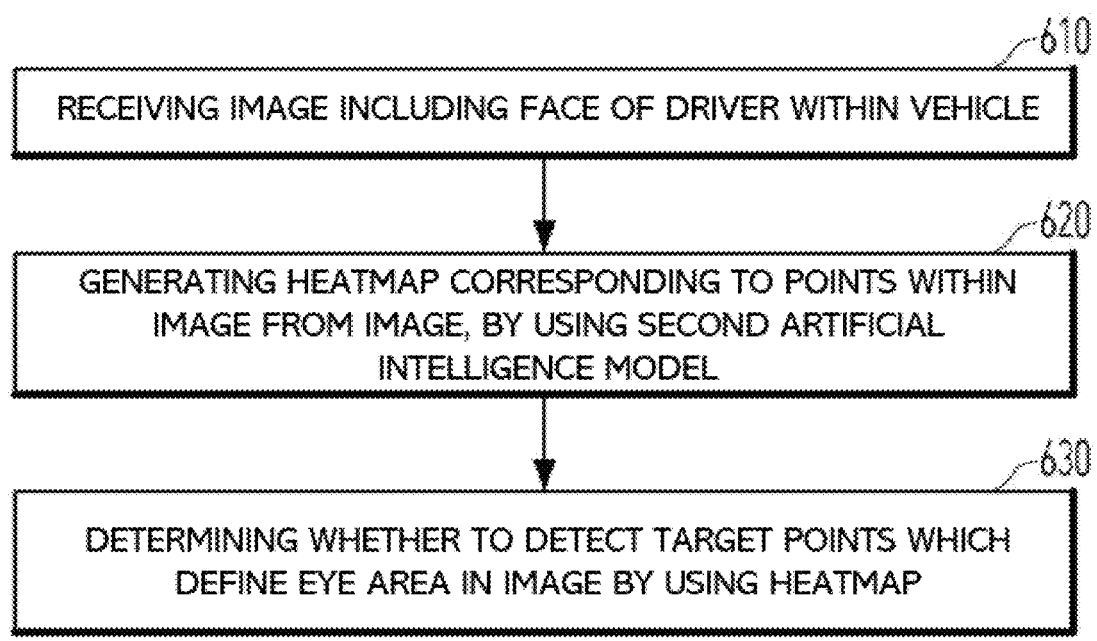
FIG. 6 exemplarily illustrates a method for using a heat map in a process of detecting an eye area in the DMS according to an exemplary embodiment of the present disclosure.

FIG. 6 exemplarily illustrates a method for using a heatmap in a process of detecting an eye area in the DMS according to an exemplary embodiment of the present disclosure.

In an exemplary embodiment, the computing device 100 may receive or obtain an image including a face of a driver in a vehicle (610).

In the present disclosure, the image including the face of the driver may include, for example, an image in which the face of the driver is represented by a bounding box, an image in which an outline of the face of the driver is segmented, an image including the face of the driver, and/or an image in which feature points of the face of the driver are represented.

In an exemplary embodiment, the computing device 100 may generate or obtain a heatmap corresponding to points in the image from the image by using an artificial intelligence based second model (620).

In an exemplary embodiment, the second model may correspond to an artificial intelligence based model pre-trained to detect the eye area in the image from the image by using heatmap regression. For example, the second model which is the model detecting the target points of the eye area may use a heatmap when performing a regression algorithm for the target points. The second model may operate to output a heatmap which means an existence probability for each of the feature points in the face in order to detect a face feature point or detect a face landmark. Feature points (e.g., target points defining the eye area) in the face may be determined based on an existence probability of each of the feature points in the face by using the heatmap. The heatmap obtained from the second model may be used to determine whether to detect the target points, and when it is determined that the target points are detected, the heatmap may be used to detect the target points.

In the exemplary embodiment, the computing device 100 may detect the target points corresponding to the eye area by using the second model. The computing device 100 may determine whether to determine whether the eye is closed, whether to detect the target points, whether the sunglasses are worn, whether to provide the eye closing alarm, and/or whether to perform transform to the transformed space by using the heatmap which is the output of the second model. For example, the output of the second model may be used as a function of a filter for determining whether to perform a process related to detection of whether the eye is closed and/or providing of the eye closing alarm.

In an exemplary embodiment, the computing device 100 may determine whether to detect the target points defining the eye area in the image by using the heatmap (630).

In an exemplary embodiment, the computing device 100 may calculate a standard deviation for values corresponding to points in the heatmap, respectively. In an exemplary embodiment, the computing device 100 may determine to detect the target points in the first image by using the second model when the standard deviation exceeds a prestored threshold reference. When it is judged that the input image is different from a learned tendency, a standard deviation of heatmap output values of the pre-trained artificial intelligence based second model have a relatively large value. As a result, the technique according to an exemplary embodiment of the present disclosure calculates the size of the standard deviation of the values in the heatmap to determine whether an area determined as the eye area by the model is the actual eye area. As an example, the case where the value of the standard deviation of the heatmap is large may indicate that there is a high possibility that occlusion will occur in the image.

For example, since the DMS using the RGB camera may not penetrate the sunglasses, for example, the sunglasses in the image may be represented in black. Since a model using the landmark of the eye area strongly tends to detect an edge, the eye area may be recognized as a boundary of the sunglasses in such a situation. As a result, when the driver wears the sunglasses, a possibility that it will be judged that there is eye closing increases. In order to prevent other objects such as sunglasses and/or glasses from being misrecognized as the eye closing such, the technique according to an exemplary embodiment of the present disclosure may use a model for landmark detection using heatmap regression. The technique according to an exemplary embodiment of the present disclosure may judge an area in which the standard deviation of the heatmap values of the model has a large value of a predetermined reference or more as an area corresponding to the sunglasses or a similar object. The technique according to an exemplary embodiment of the present disclosure may judge that the area in which the standard deviation of the heatmap values of the model has the large value of the predetermined reference or more is not the eye area.

Figure 7:
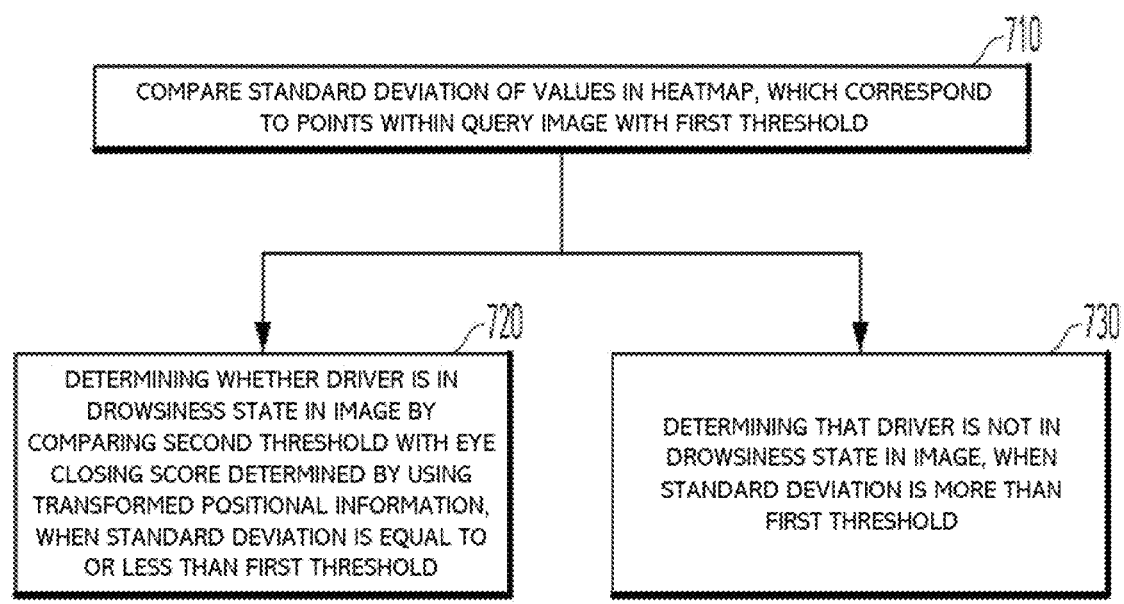
FIG. 7 exemplarily illustrates a method for determining the drowsiness state of the driver by using the heat map in the DMS according to an exemplary embodiment of the present disclosure.

FIG. 7 exemplarily illustrates a method for determining the drowsy state of the driver by using the heatmap in the DMS according to an exemplary embodiment of the present disclosure.

In an exemplary embodiment, the heatmap obtained from the model may perform a filter function in the process for judging whether the driver is in the drowsy state.

In an exemplary embodiment, the computing device 100 may compare a standard deviation of values in the heatmap, which correspond to points in the image, and a first threshold (710). The first threshold herein may mean a reference value to be compared with the standard deviation. The computing device 100 may judge an area in which the standard deviation has a large value of a predetermined reference or more as a corresponding area other than the eye area. The computing device 100 may calculate a standard deviation of a heatmap corresponding to the area judged as the eye area by the model, and judge whether the calculated standard deviation exceeds the first threshold.

In an exemplary embodiment, the computing device 100 compares an eye closing score determined by using transformed positional information and a second threshold to determine whether the driver is in the drowsy state in the image when the standard deviation is equal to or less than the first threshold (720).

In an exemplary embodiment, the computing device 100 may detect the eye area and calculate the eye closing score corresponding to the eye area, by using an output (e.g., a heatmap) of a model (e.g., a model outputting the heatmap) when the standard deviation is equal to or less than the first threshold. As another example, the computing device 100 may calculate the eye closing score by using points corresponding to the eye area obtained from the model. For example, the computing device 100 may judge whether the driver closes the eye based on the eye closing score. Based on the judgment, it may be determined whether the driver is in the drowsy state.

For example, the computing device 100 may detect the eye area in the image through the model. The computing device 100 uses a heatmap corresponding to the eye area obtained in the process of detecting the eye area to judge whether the detected eye area is the actual eye area. A process of judging whether the detected eye area is the actual eye area may be performed by calculating the standard deviation for the values of the heatmap corresponding to the eye area.

For example, in an exemplary embodiment, the computing device 100 may determine the transform matrix, and transform the detected eye area to the normalized space by using the transform matrix when the standard deviation is equal to or less than the first threshold. When the standard deviation for the values of the heatmap is equal to or less than the first threshold, the computing device 100 may detect the eye area by using the scheme illustrated in FIG. 5, and locate the target points corresponding to the eye area in the transformed space, and calculate the eye closing score corresponding to the input image by using the transformed positional information. The computing device 100 may determine whether the driver is in the drowsy state in the image by using the eye closing score. For example, the eye closing score is a value quantitatively indicating a level of eye closing. The eye closing score may be determined by calculating the size of the eye area through a rule based algorithm by using positional information (e.g., transformed positional information) of the points corresponding to the eye area. As another example, the eye closing score may also be calculated by using the artificial intelligence based model (the above-described model or a separate model).

In an exemplary embodiment, the computing device 100 may determine to generate the drowsiness alarm when determining that the driver is in the drowsy state.

In an exemplary embodiment, the computing device 100 may determine that the driver is not in the drowsy state in the image when the standard deviation exceeds the first threshold (730).

In an exemplary embodiment, the computing device 100 may determine that there is another object other than the eye area in the image when the standard deviation exceeds the first threshold.

In an exemplary embodiment, the computing device 100 may determine that there is no eye closing in the image when the standard deviation exceeds the first threshold.

In an exemplary embodiment, the computing device 100 may determine that the detected eye area is not the actual eye area when the standard deviation exceeds the first threshold.

In an exemplary embodiment, the computing device 100 may determine that the driver is not in the drowsy state in the image without calculating the eye closing score when the standard deviation exceeds the first threshold.

For example, the computing device 100 may determine that there is the sunglasses in the image when the standard deviation exceeds the first threshold.

For example, the computing device 100 may determine that the detected eye area corresponds to the sunglasses when the standard deviation exceeds the first threshold.

For example, the computing device 100 may determine not to perform detection of the target points or transform of the target points when the standard deviation exceeds the first threshold.

For example, the computing device 100 may determine not to provide the eye closing alarm when the standard deviation exceeds the first threshold.

For example, the computing device 100 may determine not to transform the target points corresponding to the eye area to the transformed space when the standard deviation exceeds the first threshold.

Figure 8:
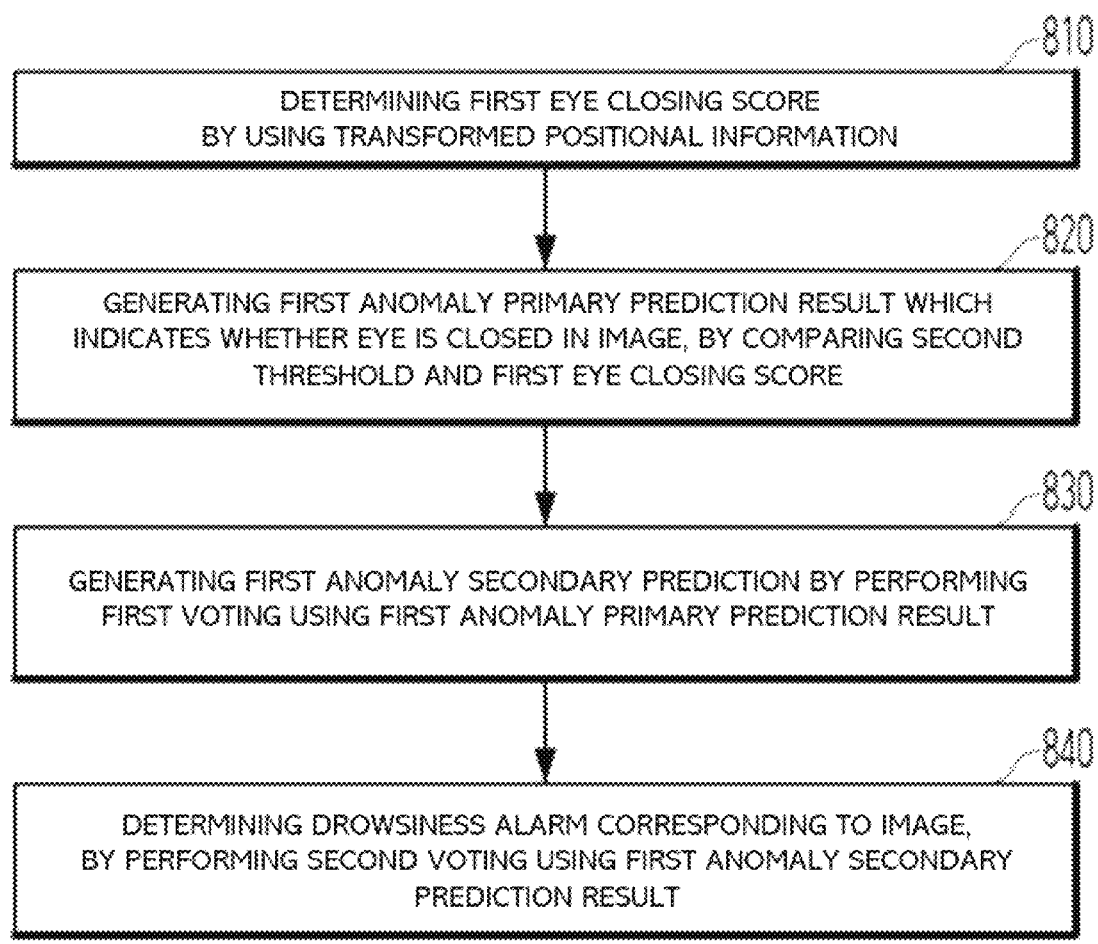
FIG. 8 exemplarily illustrates a method for determining a drowsiness alarm of the driver according to an exemplary embodiment of the present disclosure.

FIG. 8 exemplarily illustrates a method for determining whether the drowsiness alarm of the driver is generated according to an exemplary embodiment of the present disclosure.

Contents duplicated with the descriptions described above in FIG. 8 in the description are omitted in order to prevent the duplication of the description, and will be replaced with the description described above in FIG. 4. As an example, the schemes related to the first voting and the second voting in FIG. 4 may correspond to the schemes related to the first voting and the second voting in FIG. 8.

The technique according to an exemplary embodiment of the present disclosure may judge whether the driver closes the eye and/or the driver is drowsy from the image of the driver, and determine whether to generate the alarm according to the judged result. The accuracy and reliability of the alarm provided to the driver by the DMS may be secured through the technique according to an exemplary embodiment of the present disclosure.

The technique according to an exemplary embodiment of the present disclosure may use a threshold and/or voting in the process of judging whether the driver closes the eye and/or the driver is drowsy from the image of the driver. It may be possible that the DMS more accurately judges whether the driver is drowsy through the technique according to an exemplary embodiment of the present disclosure.

In an exemplary embodiment, the computing device 100 may determine whether the driver is in the drowsy state in the first image based on at least one the standard deviation of the values in the heatmap corresponding to the points in the first image to be judged, and the eye closing score determined by using the transformed positional information of the first image.

In an exemplary embodiment, the computing device 100 may determine or obtain a first eye closing score by using the transformed positional information (810).

In an exemplary embodiment, the computing device 100 may primarily judge the drowsy state or the eye closing state of the driver by using the standard deviation of the heatmap.

In an exemplary embodiment, the computing device 100 may compare a standard deviation of values in the heatmap, which correspond to points in an input first image, and a first threshold (e.g., a threshold which becomes a reference of the size of the standard deviation). The computing device 100 may primarily judge the eye closing state or the drowsy state of the driver based on the comparison between the first threshold and the standard deviation. For example, the computing device 100 may determine that the driver does not close the eye in the first image when the standard deviation exceeds the first threshold. Additionally, the computing device 100 may determine that the driver is not in the drowsy state when the standard deviation exceeds the first threshold.

In an exemplary embodiment, when the standard deviation is equal to or less than the first threshold, the computing device 100 compares an eye closing score determined by using the transformed positional information or untransformed positional information, and a second threshold (e.g., a threshold which becomes a reference for judging whether the eye is closed) to determine whether the driver is in the drowsy state or the eye closing state in the first image. The eye closing score may be obtained by determining the size of the eye area by using the points corresponding to the eye area.

In an exemplary embodiment, the second threshold may be determined based on at least one previous result corresponding to at least one previous image obtained prior to the first image. The second threshold may be varied based on at least one previous result corresponding to at least one previous image obtained prior to the first image. The second threshold may be varied based on a threshold of an immediately previous image obtained immediately prior to the first image based on at least one previous result corresponding to at least one previous image obtained prior to the first image. A previous drowsiness result may indicate a judgment result or a prediction result of the eye closing state or the drowsy state of the driver for the image obtained prior to the first image. For example, when a ratio of a result value indicating the existence of eye closing or drowsiness among previous results corresponding to previous images obtained prior to the first image (e.g., sequentially obtained previous images) is equal to or more than a first ratio, the second threshold may be set to a first value, and when the ratio of the result value indicating the existence of the eye closing or drowsiness among the previous results corresponding to the previous images obtained prior to the first image is less than the first ratio, the second threshold may be set to a second value higher than the first value. In such an example, it is assumed that in a situation in which a second image, a third image, and a fourth image are obtained prior to the first image, a result indicating that the eye closing or drowsiness exists is derived from the second image, a result indicating that the eye closing or drowsiness does not exist is derived from the third image, and a result indicating that the eye closing or drowsiness exists is derived from the fourth image. Under the assumption, a threshold for judging an eye closing result or a drowsiness result of the first image may be set to have a value lower than a threshold for determining a result of the second image (e.g., an image obtained immediately prior to the first image) according to a result (e.g., a ratio of 66.6%) indicating that the eye closing or drowsiness exists among previous results of the second image, the third image, and the fourth image.

In an exemplary embodiment, the computing device 100 compares a first eye closing score and a second threshold to generate or obtain a first anomaly primary prediction result indicating whether the eye is closed in the image (820).

In an exemplary embodiment, the first anomaly primary prediction result may correspond to the first anomaly primary prediction result in FIG. 4. The first anomaly primary prediction result may be determined based on comparison between the eye closing score obtained from the model or the eye closing score obtained by the rule based algorithm, and a threshold. When the drowsiness exists in the image or when it is judged that the driver closes the eye in the image, the first anomaly primary prediction result may have the value of 0, and when the drowsiness does not exist in the image or when it is judged that the driver does not close the eye in the image, the first anomaly primary prediction result may have the value of 0.

In an exemplary embodiment, an anomaly primary prediction result in FIG. 8 may correspond to an eye closing primary prediction result.

In an exemplary embodiment, the first anomaly primary prediction result may also be determined by using a standard deviation of values in a heatmap corresponding to points in an image. By comparing the standard deviation with a specific threshold, a primary prediction result indicating whether the eye is closed may be determined. When the standard deviation exceeds the specific threshold, the computing device 100 may determine the primary prediction result as an eye opening state in the image regardless of the eye closing score. That is, when the standard deviation is large enough to exceed the specific threshold, the case may be judged as other exceptional situations including a situation of wearing the sunglasses, etc. As a result, the computing device 100 may judge that the eye is opened for the corresponding image or not judge whether the eye is closed according to an implementation aspect.

In an exemplary embodiment, the computing device 100 performs a first voting by using the first anomaly primary prediction result to generate or obtain a first anomaly secondary prediction result (830).

In an exemplary embodiment, the computing device 100 performs the first voting by using the first anomaly primary prediction result to determine a drowsiness alarm corresponding to an input first image. A first anomaly secondary prediction result may indicate whether the drowsy state of the driver exists in the image. The first anomaly secondary prediction result may indicate whether the drowsiness alarm corresponding to the image is generated. The first anomaly secondary prediction result may be used as a factor for determining the type of drowsiness alarm corresponding to the image. The first anomaly secondary prediction result may be used as a factor for determining the intensity of the drowsiness alarm corresponding to the image. The first anomaly secondary prediction result may be used as a factor for determining the generation of the drowsiness alarm corresponding to the image.

In an exemplary embodiment, an anomaly secondary prediction result in FIG. 8 may correspond to an eye closing secondary prediction result.

In an exemplary embodiment, the first voting may determine which result between the first anomaly primary prediction result of the first image which becomes a target of anomaly judgment and anomaly primary prediction results of previous images a majority value is, and generate a first anomaly secondary prediction result corresponding to the first image by using the determined majority value.

In an exemplary embodiment, the first voting may generate a group anomaly prediction result representing an image group constituted by the first image, and a first number of sequential images predetermined, which are obtained prior to the first image. In an exemplary embodiment, the first voting may be used to generate a first anomaly secondary prediction result indicating whether the drowsiness exists in the first image by using the group anomaly prediction result. The group anomaly prediction result herein may include a result value representing the group between a result value indicting the existence of the drowsiness or eye closing and a result value of non-existence of the drowsiness or eye closing.

In an exemplary embodiment, the first voting may include a result value representing a group of specific images between a result value indicating the eye closing state and a result value indicating the eye opening state. For example, when a proportion of an image having a result indicating eye closing among a plurality of images is high, it may be determined that a prediction result representing the corresponding group (e.g., a prediction result of each of images included in the corresponding set) is the eye closing state.

In an additional exemplary embodiment, a value of the eye closing score may also be additionally reflected to the result value representing the group.

In an exemplary embodiment, it is assumed that anomaly primary prediction results exist which correspond to five images (also including the first image), and the images have values of 0, 0, 1, 1, and 0, respectively. Under the assumption, 0 may indicate the eye closing state and 1 may indicate the eye opening state. Under the assumption, the group anomaly prediction result may have the value of 0. As a result, the first anomaly secondary prediction result corresponding to the first image may have the value of 0.

In an exemplary embodiment, an eye closing secondary prediction result or an anomaly secondary prediction result may be expressed as a value of a counter. The value of the counter may be determined by using the result of the first voting. According to the result of the first voting, it may be determined whether the value of the counter is to be added, is decreased, or maintained. It may be determined whether the value of the counter is to be added, is decreased, or maintained based on the first voting, and a threshold range of the counter value. The threshold range of the counter value may define a maximum value at which the counter value is not increased any longer, but maintained or decreased, and define a minimum value at which the counter value is not decreased any longer, but maintained or increased. The computing device 100 may generate one or more current counter values corresponding to the current image by a scheme of increasing or decreasing one or more previous counter values corresponding to an image obtained prior to the current image based on the result of the first voting, and obtain an eye closing secondary prediction result including one or more current counter values.

In an exemplary embodiment, a unit of the increase or decrease of the counter may be set in various types. For example, a predetermined fixation value may be used of the unit of the increase or decrease. For example, the unit of the increase or decrease of the counter may be determined based on a difference value between acquisition times of the previous image and the current image. In such an example, when the difference between the acquisition time of the previous image and the acquisition time of the current image is 15 ms, and when the primary prediction result includes the existence of the eye closing, a counter value of a target image may be increased compared to the counter value of the previous image by a value of 15 or 0.15.

In an exemplary embodiment, the computing device 100 performs a second voting by using the first anomaly secondary prediction result to determine the drowsiness alarm corresponding to the image (840).

In an exemplary embodiment, the computing device 100 performs the second voting by using the first anomaly secondary prediction result to determine whether to generate the drowsiness alarm corresponding to the first image or whether the drowsiness of the driver exists in the first image. In an exemplary embodiment, the computing device 100 performs the second voting by using the first anomaly secondary prediction result to determine the intensity or the type of the drowsiness alarm corresponding to the first image.

In an exemplary embodiment, the second voting may determine whether anomaly secondary prediction results have continuity in an image group constituted by a first image which becomes a target of anomaly judgment and a second number of sequential images predetermined, which are obtained prior to the first image. The second voting may determine whether to generate an alarm corresponding to the first image or whether the drowsiness of the user exists in the first image based on whether the anomaly secondary prediction results have the continuity.

In an exemplary embodiment, the second voting may include comparing the counter value and the threshold. The second voting may be used to determine on or off of one or more drowsiness alarms corresponding to the image by comparing one or more current counter values and one or more predetermined counter thresholds. For example, when the current counter value reaches a specific threshold, the drowsiness alarm is set to ON, and when the current counter value is less than the specific threshold, the drowsiness alarm may be set to OFF. Based on comparison between a plurality of respective counter values and a plurality of respective thresholds, when a specific counter value exceeds a specific threshold, the type or the intensity of alarm may be determined according to a combination of the specific counter value and the specific threshold. In an exemplary embodiment, a level at which the counter value exceeds an alarm threshold and the intensity of the alarm may have a correlation. According to the level at which the counter value exceeds the alarm threshold, the intensity of the alarm may be determined differently. An excess value by which the counter value exceeds the alarm threshold and the intensity of the alarm may have a positive correlation. In the exemplary embodiment, as the level at which the counter value exceeds the alarm threshold increases, the intensity of the alarm may also increase. The intensity of the alarm herein may indicate the size of an alarm image, an alarm sound, alarm light, and/or alarm vibration.

In an exemplary embodiment, the second voting may adopt a plurality of alarm thresholds. As an example, the plurality of alarm thresholds may have different alarm intensities and/or alarm types. As another example, some of the plurality of alarm thresholds may have the same alarm intensity and/or alarm type. The second voting compares each of the plurality of alarm thresholds and a counter corresponding to a specific image to determine the type of alarm, the intensity of the alarm, and/or whether the alarm is generated. As an example, a first alarm when the counter exceeds one alarm threshold among the plurality of alarm thresholds may have a lower intensity than a second alarm when the counter exceeds two or more alarm thresholds.

In an exemplary embodiment, a plurality of counters may be allocated to a target image. The second voting compares each of the plurality of counters and the alarm threshold to determine whether the alarm is generated for each of the plurality of counters. The types or intensities of the alarm for the respective counters may be the same as each other or different from each other. As an example, a first alarm when one counter exceeds the alarm threshold may have a lower intensity than a second alarm when the plurality of counters exceeds the alarm threshold.

In an exemplary embodiment, the second voting compares the plurality of respective counters and the plurality of respective alarms to determine whether the alarm is generated, the type of alarm, and/or the intensity of the alarm.

As described above, the technique according to an exemplary embodiment of the present disclosure may use one or more votings in order to generate the alarm corresponding to the drowsiness, and/or in order to determine the drowsy state. As one or more votings are used, sensitivity, accuracy, and reliability of an alarm corresponding to a drowsiness situation may be all enhanced. As one or more votings are used, sensitivity, accuracy, and reliability of drowsiness judgment may be all enhanced.

Figure 9:
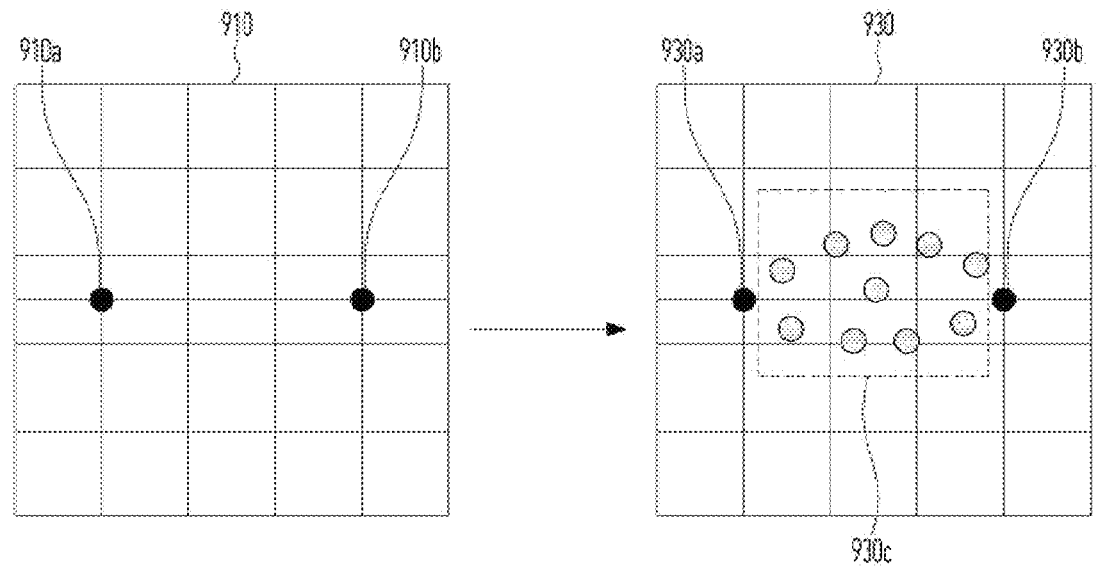
FIG. 9 exemplarily illustrates a space transform method according to an exemplary embodiment of the present disclosure.

FIG. 9 exemplarily illustrates a space transform method according to an exemplary embodiment of the present disclosure.

As an example, the space transform method illustrated in FIG. 9 may be used in the process of determining the drowsy state of the driver in FIG. 5.

As illustrated in FIG. 9, in an image 910 for judging the drowsy state, a first set of points 910*a* and 910*b* may be determined. The image 910 may correspond to a first space 910. The image 910 may correspond to a bounding box 910 cropped with respect to an eye area in an image obtained by a camera. The image 910 may represent a space 910 corresponding to an eye area or a face area in the image obtained by the camera. The image 910 may include a plurality of points (e.g., target points) defining the eye area. The image 910 may have a first coordinate system for describing the first space 910.

In an exemplary embodiment, the computing device 100 may determine the first set of points 910*a* and 910*b* on the first coordinate system and/or first positional information 910*a* and 910*b* of the first set of points. The computing device 100 may determine the first set of points 910*a* and 910*b* for determining the transform matrix among the detected target points. As an example, the first set of points 910*a* and 910*b* may correspond to both end points of both eyes detected. The computing device 100 may determine the transform matrix for locating the first set of points 910*a* and 910*b* in a transformed space 930 by using the first set of points 910*a* and 910*b*.

In an exemplary embodiment, when the transform matrix is determined, transformed positional information 930*a* and 930*b* in the transformed space 930 of the first set of points 910*a* and 910*b* may be determined.

In an exemplary embodiment, the computing device 100 may determine transformed positional information 930*c* of a second set of points other than the first set of points among the target points in the transformed space 930. The transformed positional information 930*c* of the second set of points may be determined by using the transformed positional information 930*a* and 930*b* of the first set of points as a reference axis. The transformed positional information 930*c* of the second set of points may be obtained by applying a transform matrix for the second set of points in the first space 910. When the transformed positional information 930*a* and 930*b* of the first set of points and the transformed positional information 930*c* of the second set of points are aggregated, positional information corresponding to the target points may be generated.

In an exemplary embodiment, the computing device 100 transforms a normalized space (e.g., transformed space) to the target points corresponding to the eye area to more accurately calculate an eye closing score for the eye area.

Figure 10:
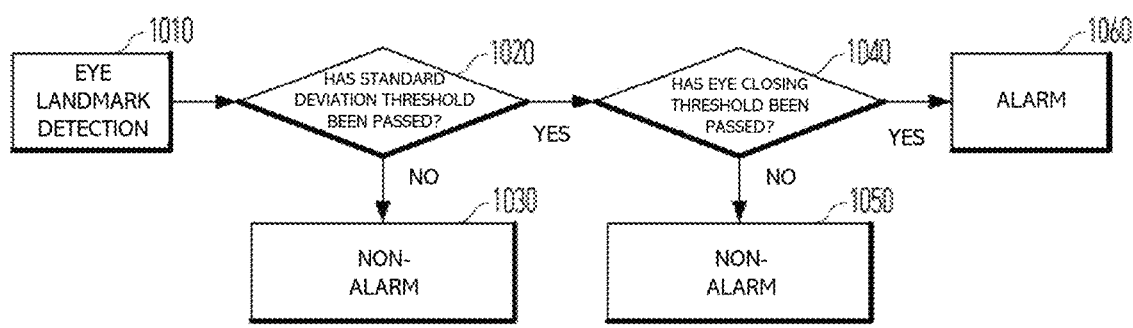
FIG. 10 exemplarily illustrates a method for determining a drowsiness alarm of the driver according to an exemplary embodiment of the present disclosure.

FIG. 10 exemplarily illustrates a method for determining whether the drowsiness alarm of the driver is generated according to an exemplary embodiment of the present disclosure.

In an exemplary embodiment, the computing device 100 may detect an eye landmark in an obtained image (1010).

For example, the eye landmark may correspond to one or more feature points corresponding to the eye area in the image. For example, the eye landmark may be generated based on information obtained from a model that outputs the feature points corresponding to the eye area in the input image by using heatmap regression. In an additional exemplary embodiment, whether to perform detection of the eye landmark may be determined based on a size of a standard deviation of the heatmap which is the output of the model.

In an exemplary embodiment, the computing device 100 may calculate a standard deviation for values in the heatmap included in a result of eye landmark detection 1010. For example, the computing device 100 may calculate the standard deviation for the values included in the heatmap by using the heatmap provided in the process of the eye landmark detection 1010. For example, the computing device 100 may determine the standard deviation for the values included in the heatmap by using the heatmap included in the output of the model or obtained from the output of the model in the process of the eye landmark detection 1010. The standard deviation of the heatmap being larger may represent that there is a high possibility that a different object from the eye area used in the process of training the model will exist or there is a high possibility that the eye landmark will not be the eye area. The standard deviation of the heatmap being smaller may represent that there is a low possibility that the different object from the eye area used in the process of training the model will exist or there is a high possibility that the eye landmark will be the eye area.

It may be determined whether the calculated standard deviation passes through a standard deviation threshold (or a standard deviation threshold reference) (1020).

For example, when the standard deviation is larger than a value which belongs to the threshold reference, it may be defined that the standard deviation does not pass through the standard deviation threshold reference. For example, when the standard deviation is equal to or smaller than the value which belongs to the threshold reference, it may be defined that the standard deviation passes through the standard deviation threshold reference.

For example, a value of a standard deviation included in an analysis result of the standard deviation of the heatmap is larger, which may indicate that there is high probability that occlusion will occur in the image.

In an exemplary embodiment, when it is determined that the calculated standard deviation does not pass through the standard deviation threshold reference, the computing device 100 may determine not to generate an eye closing alarm corresponding to the corresponding image (1030).

In an exemplary embodiment, when it is determined that the calculated standard deviation passes through the standard deviation threshold reference, the computing device 100 may perform an additional process for judging whether the eye closing alarm corresponding to the corresponding image is generated.

In an exemplary embodiment, when it is determined that the calculated standard deviation passes through the standard deviation threshold reference, the computing device 100 may determine the corresponding image as an image which is in an eye opening state.

In an exemplary embodiment, when it is determined that the standard deviation passes through the standard deviation threshold reference, the computing device 100 may calculate an eye closing score, and determine whether the eye closing score passes through an eye closing threshold reference (1040).

The eye closing score may be calculated based on a result according to the eye landmark detection 1010. For example, the eye closing score may be calculated based on a size of an eye and/or a distance between upper and lower portions of the eye area in the result of the eye landmark detection 1010. For example, the eye closing score may be output by a model for the eye landmark detection 1010. For example, the eye closing score may be calculated based on a result of transforming the result of the eye landmark detection 1010 to a normalized space (e.g., transformed space). The eye closing threshold reference may be defined as a reference value quantitatively indicating a level of eye closing, for example. When the eye closing score does not pass through the eye closing threshold reference (e.g., when a quantitative intensity of the eye closing is lower than the threshold reference), it may be judged that the eye is opened. When the eye closing score passes through the eye closing threshold reference (e.g., when the quantitative intensity of the eye closing is equal to or higher than the threshold reference), it may be judged that the eye is closed.

In an exemplary embodiment, as a value of a distance measurement result of the eye in the normalized space is smaller, it may be determined that an eye closing possibility is higher. According to an implementation aspect, the computing device 100 may set the eye closing score to be higher as the value of the distance measurement result of the eye is smaller.

In an exemplary embodiment, when it is determined that the eye closing score does not pass through the eye closing threshold reference, the computing device 100 may determine not to generate an eye closing alarm (1050).

In an exemplary embodiment, when it is determined that the eye closing score does not pass through the eye closing threshold reference, the computing device 100 may determine that the eye closing does not exist in the corresponding image.

In an exemplary embodiment, when it is determined that the eye closing score does not pass through the eye closing threshold reference, the computing device 100 may determine that the anomaly corresponding to the drowsiness does not exist.

In an exemplary embodiment, when it is determined that the eye closing score passes through the eye closing threshold reference, the computing device 100 may determine to generate the eye closing alarm (1060).

In an exemplary embodiment, when it is determined that the eye closing score passes through the eye closing threshold reference, the computing device 100 may determine that the anomaly corresponding to the eye closing exists.

In an exemplary embodiment, when it is determined that the eye closing score passes through the eye closing threshold reference, the computing device 100 may determine that the anomaly corresponding to the drowsiness exists.

As described above, the technique according to an exemplary embodiment of the present disclosure may provide an accurate judgment result for whether eye closing or drowsiness exists by using the heatmap which is the output of the model for detecting the eye landmark. The technique according to an exemplary embodiment of the present disclosure may additionally use the heatmap used for detecting the eye landmark to judge whether there is an anomaly object such as the sunglasses. The technique according to an exemplary embodiment of the present disclosure determines not to generate an alarm for a case where the standard deviation reference of the heatmap is not satisfied to enhance the accuracy of the alarm.

Figure 11:
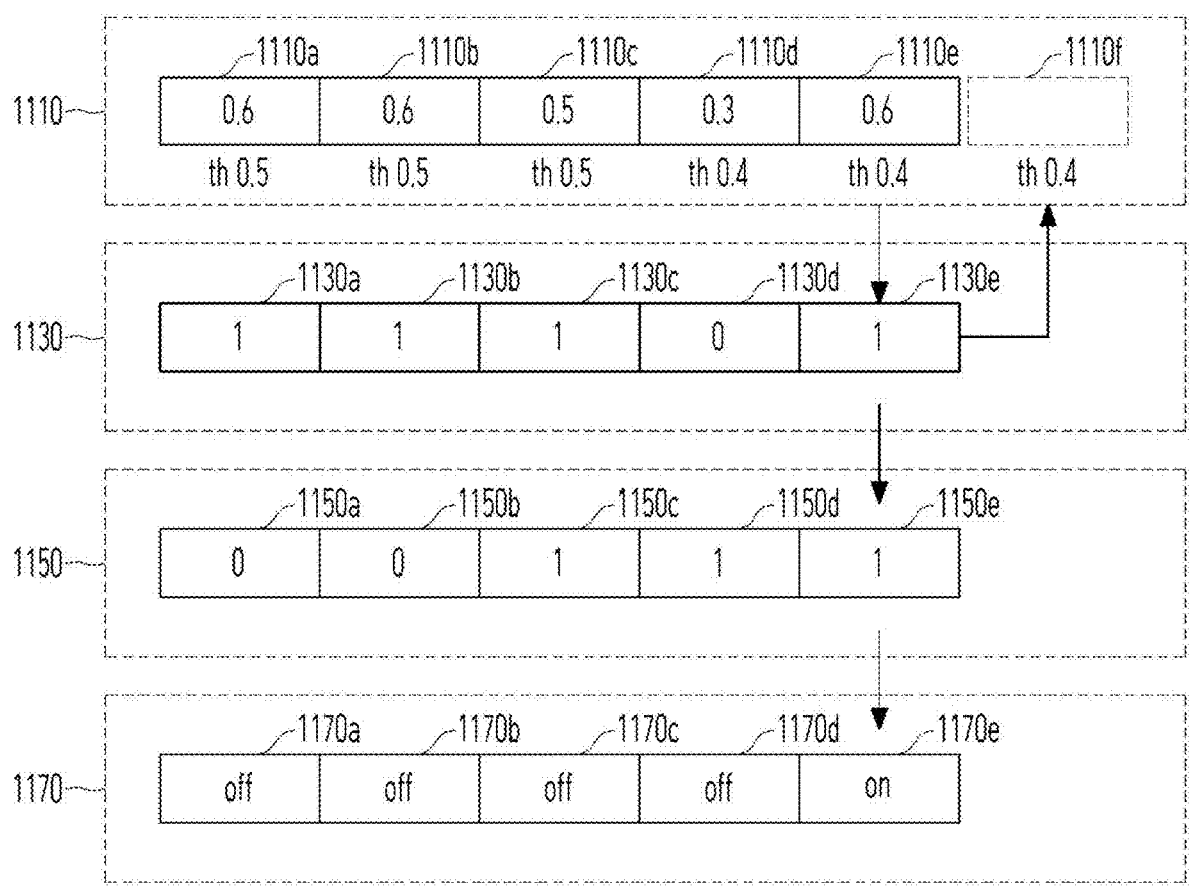
FIG. 11 exemplarily illustrates a methodology for generating an anomaly alarm according to an exemplary embodiment of the present disclosure.

FIG. 11 exemplarily illustrates a methodology for generating an anomaly alarm according to an exemplary embodiment of the present disclosure.

Examples illustrated in FIG. 11 will be replaced with the previous description in order to prevent duplication with the description of the above-described examples.

As illustrated in FIG. 11, a voting technique according to an exemplary embodiment of the present disclosure may determine an anomaly alarm or determine whether to generate the anomaly alarm from a detection result of a detection model by using a plurality of queues. In the present disclosure, the queue may be used interchangeably with a voting queue.

In an exemplary embodiment, the voting queue may include a first queue 1110, a second queue 1130, a third queue 1150, and a fourth queue 1170. The first queue 1110, second queue 1130, third queue 1150, and fourth queue 1170 may be used to determine the anomaly alarm according to an exemplary embodiment of the present disclosure. In FIG. 11, four queues are illustrated, but it will be apparent to those skilled in the art that various numbers of queues may be used according to various implementation aspects such as adding a new voting or deleting an existing voting.

In an exemplary embodiment, an X-axis direction (e.g., horizontal direction) of the first queue 1110, second queue 1130, third queue 1150, and fourth queue 1170 is a direction for expressing temporally obtained images. The first queue 1110, second queue 1130, third queue 1150, and fourth queue 1170 are configured to be close to a current time toward a right direction, and close to a past time toward a left direction. The first queue 1110, second queue 1130, third queue 1150, and fourth queue 1170 include a plurality of units. In FIG. 11, it is illustrated that the first queue 1110, second queue 1130, third queue 1150, and fourth queue 1170 include five units corresponding to each other. It will be apparent to those skilled in the art that one queue may include various numbers of units according to an implementation aspect.

In an exemplary embodiment, a plurality of units in the queue may correspond to the obtained images, respectively. In the first queue 1110, second queue 1130, third queue 1150, and fourth queue 1170, first units 1110*a*, 1130*a*, 1150*a*, and 1170*a* may include a result corresponding to a first image at a first time, second units 1110*b*, 1130*b*, 1150*b*, and 1170*b* may include a result corresponding to a second image at a second time, third units 1110*c*, 1130*c*, 1150*c*, and 1170*c* may include a result corresponding to a third image at a third time, fourth units 1110*d*, 1130*d*, 1150*d*, and 1170*d* may include a result corresponding to a fourth image at a fourth time, and fifth units 1110*e*, 1130*e*, 1150*e*, and 1170*e* may include a result corresponding to a fifth image at a fifth time. Here, the first time is a time before the second time, the second time is a time before the third time, the third time is a time before the fourth time, the fifth time is a time before the fourth time.

In an exemplary embodiment, corresponding units in the first queue 1110, second queue 1130, third queue 1150, and fourth queue 1170 may include a judgment result for the same image obtained at the same time. For example, the first image obtained at the first time may be processed in the order of the first unit 1110*a* of the first queue 1110, the first unit 1130*a* of the second queue 1130, the first unit 1150*a* of the third queue 1150, and the first unit 1170*a* of the fourth queue 1170. According to a result of the processing, the fourth queue 1170 corresponding to a last queue may include a result of ON or OFF of the anomaly alarm corresponding to each image.

In an exemplary embodiment, the first queue 1110 may include the first unit 1110*a*, a second unit 1110*b*, a third unit 1110*c*, a fourth unit 1110*d*, and a fifth unit 1110*e*. For example, the fifth unit 1110*e* may include a judgment result corresponding to a current (or latest) input image. In an exemplary embodiment, the first queue 1110 is a queue representing the output of the model or a queue representing a result of postprocessing the output of the model. For example, the first queue 1110 may include model output information of each of a plurality of images. For example, the first queue 1110 is a queue representing a detection result of the detection model. The first unit 1110a may include first model output information corresponding to the first image at the first time, the second unit 1110b may include second model output information corresponding to the second image at the second time, the third unit 1110c may include third model output information corresponding to the third image at the third time, the fourth unit 1110d may include fourth model output information corresponding to the fourth image at the fourth time, and the fifth unit 1110e may include fifth model output information corresponding to the fifth image at the fifth time. Here, the first time may be a most past time, and subsequent times may be expressed from the first time toward the fifth time. Further, sixth model output information corresponding to a sixth image obtained at a sixth time which is a future time will be allocated to a sixth unit 1110f. In an exemplary embodiment, the first queue 1110 may be set to include a predetermined number of units by a scheme of removing a most past unit as a new unit is input. For example, when the sixth model output information is allocated to the sixth unit 1110f, the first unit 1110a will be removed from the queue.

In an exemplary embodiment, the second queue 1130 may include the first unit 1130a, a second unit 1130b, a third unit 1130c, a fourth unit 1130d, and a fifth unit 1130e. Values included in the units 1130a, 1130b, 1130c, 1130d, and 1130e of the second queue 1130, respectively may be determined based on comparison between information included in a unit corresponding to the first queue 1110 and a threshold allocated to the unit corresponding to the first queue 1110. The values included in the units 1130a, 1130b, 1130c, 1130d, and 1130e of the second queue 1130, respectively may include an anomaly primary prediction result.

In an exemplary embodiment, the second queue 1130 may include an anomaly primary prediction result determined based on comparison between the model output information and the threshold. The first unit 1130a may include a first anomaly primary prediction result corresponding to the first image at the first time, the second unit 1130b may include a second anomaly primary prediction result corresponding to the second image at the second time, the third unit 1130c may include a third anomaly primary prediction result corresponding to the third image at the third time, the fourth unit 1130d may include a fourth anomaly primary prediction result corresponding to the fourth image at the fourth time, and the fifth unit 1130e may include a fifth anomaly primary prediction result corresponding to the fifth image at the fifth time.

An expression "the threshold is variable" may be used to encompass both an exemplary embodiment in which the threshold is set to one value among a plurality of (e.g., two) threshold options and an exemplary embodiment in which the threshold is increased, decreased, or maintained to be the same based on a previous threshold.

In an exemplary embodiment, a threshold allocated to a current unit of the first queue 1110 may be variable based on a value included in a previous unit in another queue. For example, the threshold allocated to the current unit of the first queue 1110 may be determined based on a first anomaly primary prediction result of a previous unit of the first queue 1110. For example, in FIG. 11, when the model output information exceeds the threshold, the anomaly primary prediction result may have the value of 1, and when the model output information does not exceed the threshold, the anomaly primary prediction result may have the value of 0. The first anomaly primary prediction result may be determined by comparison between first model output information of 0.6 and a threshold of 0.5, and may have the value of 1. The second anomaly primary prediction result may be determined by comparison between second model output information of 0.6 and the threshold of 0.5, and may have the value of 1. The third anomaly primary prediction result may be determined by comparison between third model output information of 0.6 and the threshold of 0.5, and may have the value of 1. The fourth anomaly primary prediction result may be determined by comparison between fourth model output information of 0.3 and a threshold of 0.4, and may have the value of 0. The fifth anomaly primary prediction result may be determined by comparison between fifth model output information of 0.6 and a threshold of 0.4, and may have the value of 1. As illustrated in FIG. 11, a value of a specific unit of the first queue 1110 is equal to or larger than a threshold allocated to the specific unit of the first queue 1110, a value included in the specific unit of the second queue 1130 is determined as 1. A value of a specific unit of the first queue 1110 is smaller than the threshold allocated to the specific unit of the first queue 1110, the value included in the specific unit of the second queue 1130 is determined as 0. For example, a threshold allocated to a current unit (e.g., an N-th unit) of the first queue 1110 may be variable according to a value included in a previous unit (e.g., an N-1-th unit) of a current unit of the second queue 1130. In such an example, when the value of the second unit 1130b of the second queue 1130 is set to 1, a threshold allocated to the third unit 1110c of the first queue 110 is subtracted from 0.5 which is the threshold of the second unit 1110b which is the previous unit by 0.1 to be determined as 0.4. In another exemplary embodiment, when the value of the second unit 1130b of the second queue 1130 is set to 0, a threshold allocated to the third unit 1110c of the first queue 110 is maintained to be the same as 0.5 which is the threshold of the second unit 1110b which is the previous unit or added with 0.1 to be determined as 0.6. N in this specification may mean a natural number.

In an exemplary embodiment, the threshold corresponding to each of the units of the first queue 1110 may be set to one of a first value and a second value. In the exemplary embodiment, the threshold corresponding to the current unit of the first queue 1110 may be set to one of the first value and the second value by using a result value(s) corresponding to a previous unit(s). In the exemplary embodiment, when the result value(s) corresponding to the previous unit(s) indicates the existence of the anomaly, the threshold corresponding to the current unit of the first queue 1110 may be set to a smaller value between the first value and the second value. In the exemplary embodiment, when the result value(s) corresponding to the previous unit(s) indicates the non-existence of the anomaly, the threshold corresponding to the current unit of the first queue 1110 may be set to a larger value between the first value and the second value.

In an exemplary embodiment, a current threshold corresponding to the current unit may be maintained or changed based on a previous threshold corresponding to the previous unit(s). In an example in which the threshold is changed, for example, when it is determined that an anomaly prediction result corresponding to the previous unit(s) indicates the existence of the anomaly, the current threshold may be set to have a descending tendency. Here, the descending tendency may include maintaining the current threshold to be the same as the previous threshold or setting the current threshold to be lower than the previous threshold. The case where the current threshold is set to be lower may mean that a possibility that the current image will be judged to be anomaly increases. In the example in which the threshold is changed, for example, when it is determined that the anomaly prediction result corresponding to the previous unit(s) indicates the non-existence of the anomaly, the current threshold may be set to have an ascending tendency. Here, the ascending tendency may include maintaining the current threshold to be the same as the previous threshold or setting the current threshold to be higher than the previous threshold. The case where the current threshold is set to be higher may mean that the possibility that the current image will be judged to be anomaly decreases. As described above, the technique according to an exemplary embodiment of the present disclosure determines the anomaly prediction result of the current image to have a similar (corresponding) tendency to the anomaly prediction result of the previous image to enhance the accuracy of the anomaly judgment.

In an exemplary embodiment, the threshold allocated to the current unit of the first queue 1110 may be determined based on values included in a plurality of previous units of the second queue 1130. In an exemplary embodiment, the threshold allocated to the specific unit of the first queue 1110 may be variable according to values of previous units of other queue(s) other than the first queue 1110. For example, based on comparison between a ratio value or an average value obtained from the values of the previous units of the second queue 1130 or a specific threshold, the threshold allocated to the current unit of the first queue 1110 may be determined. The specific threshold herein as a threshold for determining the threshold allocated to the current unit may mean a threshold of a ratio format such as 30%, 40%, 50%, and 80%. For example, the threshold of the second unit 1110b of the first queue 1110 may be determined based on values of the first unit 1130a of the second queue 1130 and a previous unit(s) of the first unit 1130a. When it is determined that a ratio of the value of 1 among the values of the first unit 1130a and the previous unit(s) of the first unit 1130a (e.g., a ratio determined as the anomaly) of the second queue 1130 does not exceed the specific threshold, the threshold of the second unit 1110b of the first queue 1110 may be maintained to be 0.5. The threshold of the third unit 1110c of the first queue 1110 may be determined based on values of the first unit 1130a and the second unit 1130b of the second queue 1130. Alternatively, the threshold of the third unit 1110c of the first queue 1110 may be determined based on values of the first unit 1130a, the second unit 1130b, and the previous unit(s) of the first unit 1130a of the second queue 1130. For example, when it is determined that a ratio of the value of 1 among the values of the first unit 1130a and the previous unit(s) of the first unit 1130a (e.g., a ratio determined as the anomaly) of the second queue 1130 exceeds the specific threshold, the threshold of the third unit 1110c of the first queue 1110 may be set to 0.4. As another example, the threshold allocated to the fifth unit 1110e of the first queue 1110 may be determined based on comparison between a value indicating the anomaly among the values of the previous units 1130a, 1130b, 1130c, and 1130d of the second queue 1130 and a predetermined threshold. For example, when it is determined that a ratio of a result value (e.g., the value of 1) indicating that the anomaly exists among the values of the previous units 1130a, 1130b, 1130c, and 1130d of the second queue 1130 is equal to or more than 40%, the threshold allocated to the fifth unit 1110e of the first queue 1110 may be set to 0.4. For example, when it is determined that a ratio of the result value (e.g., the value of 1) indicating that the anomaly exists among the values of the previous units 1130a, 1130b, 1130c, and 1130d of the second queue 1130 is less than 40%, the threshold allocated to the fifth unit 1110e of the first queue 1110 may be set to 0.5.

In an exemplary embodiment, the threshold allocated to the current unit (e.g., the N-th unit) of the first queue 1110 may be variable according to values included in previous units (e.g., an N-1-th unit, an N-2-th unit, an N-3-th unit, and an N-4-th unit) of the current unit of the second queue 1130. In such an example, the threshold allocated to the fifth unit 1110e of the first queue 1110 may be determined based on a majority value or a representative value of the values of the previous units 1130a, 1130b, 1130c, and 1130d of the second queue 1130. The majority value or the representative value may be determined as a value having a highest proportion among values included in a predetermined number of units. For example, among the values of 1 or 0 included in five sequential units, the majority value and the representative value may be determined. In such an example, since four units have the value of 1 and one unit has the value of 0 among the units 1130a, 1130b, 1130c, and 1130d of the second queue 1130, a majority value or a representative value of five units of the second queue 1130 may be determined as 1. When the majority value or representative value of the values of the previous units 1130a, 1130b, 1130c, and 1130d of the second queue 1130 is 1, the threshold allocated to the fifth unit 1110e of the first queue 1110 may be set to 0.4. In such an example, when the majority value or representative value of the values of the previous units 1130a, 1130b, 1130c, and 1130d of the second queue 1130 is 0, the threshold allocated to the fifth unit 1110e of the first queue 1110 may be set to 0.5. As illustrated in FIG. 11, the threshold to be allocated to the sixth unit 1110f of the first queue 1110 may be determined based on the majority value, the representative value, or the ratio of the values of the previous units 1130a, 1130b, 1130c, and 1130d of the second queue 1130.

In this specification, for convenience of description, the corresponding contents are omitted, but it will be apparent to those skilled in the art that as a new unit is added in the queue, the values of the previous unit of the first unit 1110a of the first queue 1110 may also be considered according to characteristics of a queue excluded from the most past unit.

In an exemplary embodiment, the threshold allocated to the current unit of the first queue 1110 may also be determined based on a value included in at least one previous unit of the third queue 1150. The threshold allocated to the fifth unit 1110e of the first queue 1110 may be determined based on a value of a previous unit (e.g., the fourth unit 1150d) of the third queue 1150. For example, when the value of the fourth unit 1150d of the third queue 1150 is 1, the threshold of the fifth unit 1110e of the first queue 1110 may be determined as 0.4. Alternatively, the threshold may be maintained to be the same as the previous threshold, or the threshold may be decreased compared to the previous threshold. For example, when the value of the first unit 1150a of the third queue 1150 is 0, the threshold of the second unit 1110b of the first queue 1110 may be determined as 0.5. Alternatively, the threshold may be maintained to be the same as the previous threshold or the threshold may be increased compared to the previous threshold.

In an exemplary embodiment, the values of the units 1150a, 1150b, 1150c, 1150d, and 1150e of the third queue 1150 may be determined based on the result of the first voting using the values of the units 1130a, 1130b, 1130c, 1130d, and 1130e included in the second queue 1130. The value included in the unit of the third queue 1150 may be determined based on the majority value, the representative value, or the ratio of the anomaly primary prediction results. For example, the fifth unit 1150e of the third queue 1150 may be determined based on the representative value and the majority value of the values of the units 1130a, 1130b, 1130c, 1130d, and 1130e of the second queue 1130. In such an example, the fifth unit 1150e of the third queue 1150 may be set to 1 which is the majority value or representative value of the units 1130a, 1130b, 1130c, 1130d, and 1130e of the second queue 1130. The number of units for determining the majority value or the representative value may be set to various numbers such as three or four in addition to five. As another example, the fifth unit 1150e of the third queue 1150 may also be determined based on comparison between a ratio of units having the value of 1 among the values of the units 1130a, 1130b, 1130c, 1130d, and 1130e of the second queue 1130 and a threshold ratio.

In an exemplary embodiment, the fourth queue 1170 may correspond to a queue for generating the alarm. In an exemplary embodiment, values of the units 1170a, 1170b, 1170c, 1170d, and 1170e of the fourth queue 1170 may be determined based on a second voting using the values of the units of the third queue 1150. The fourth queue 1170 may determine whether the alarm is generated by considering the continuity of the values of the units of the third queue 1150 through the second voting. For example, a reference of the continuity of the values of the units is assumed as 3. Under the assumption, since any of the first unit 1150a of the third queue 1150 and two previous units does not have the value of 1, the first unit 1170a of the fourth queue 1170 may be set to 0 (e.g., alarm off). Since any of the second unit 1150b of the third queue 1150 and two previous units (1150a and the previous unit) does not have the value of 1, the second unit 1170b of the fourth queue 1170 may be set to 0 (e.g., alarm off). Since any of the third unit 1150c of the third queue 1150 and two previous units 1150a and 1150b does not have the value of 1, the third unit 1170c of the fourth queue 1170 may be set to 0 (e.g., alarm off). Since any of the fourth unit 1150d of the third queue 1150 and two previous units 1150b and 1150c does not have the value of 1, the fourth unit 1170d of the fourth queue 1170 may be set to 0 (e.g., alarm off). Since all of the fifth unit 1150e of the third queue 1150 and two previous units 1150c and 1150d have the value of 1, the fifth unit 1170e of the fourth queue 1170 may be set to 1 (e.g., alarm on).

As described above, the technique according to an exemplary embodiment of the present disclosure may use a plurality of queues in order to judge whether the anomaly exists or generate the alarm corresponding to the anomaly. A value included in a specific queue or a threshold allocated to the specific queue may be determined by using values included in another queue (e.g., previous queue) among the plurality of queues.

Figure 12:
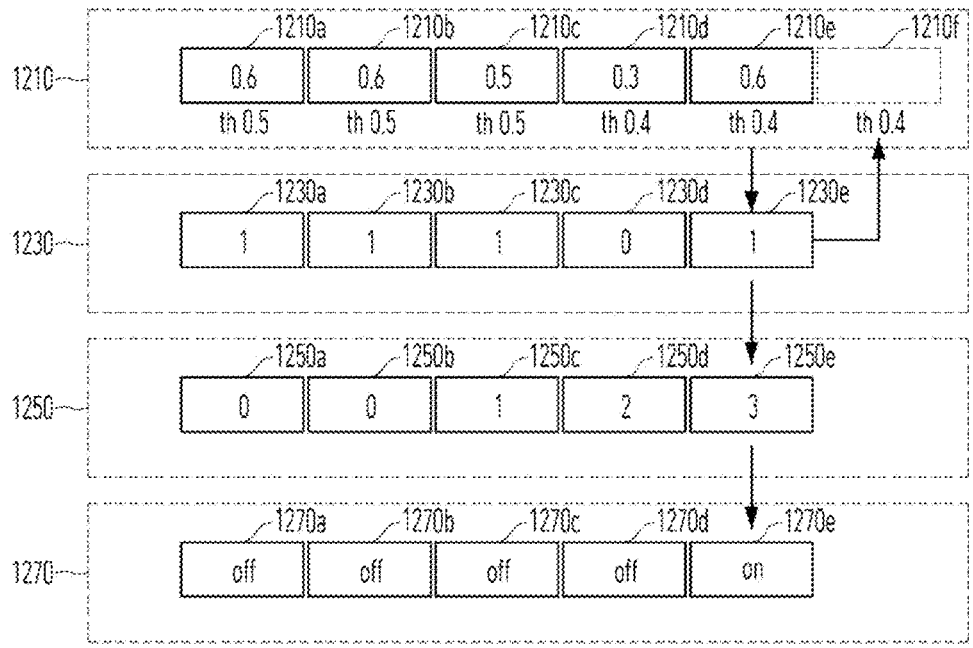
FIG. 12 exemplarily illustrates a methodology for generating the anomaly alarm according to an exemplary embodiment of the present disclosure.

FIG. 12 exemplarily illustrates a methodology for determining the anomaly alarm according to an exemplary embodiment of the present disclosure.

The above-described examples among the examples illustrated in FIG. 12 will be replaced with the above-described description in order to prevent duplication of the description.

A first queue 1210, and units 1210a, 1210b, 1210c, 1210d, 1210e, and 1210f included in the first queue in FIG. 12 may correspond to the first queue 1110, and the units 1110a, 1110b, 1110c, 1110d, 1110e, and 1110f included in the first queue in FIG. 11, respectively.

A second queue 1230, and units 1230a, 1230b, 1230c, 1230d, and 1230e included in the second queue in FIG. 12 may correspond to the second queue 1130, and the units 11130a, 1130b, 1130c, 1130d, and 1130e included in the second queue in FIG. 11, respectively.

A third queue 1250 in FIG. 12 may include a first unit 1250a, a second unit 1250b, a third unit 1250c, a fourth unit 1250d, and a fifth unit 1250e. In an exemplary embodiment, values of the units 1250a, 1250b, 1250c, 1250d, and 1250e of the third queue 1250 may be determined based on the result of the first voting using the values of the units 1230a, 1230b, 1230c, 1230d, and 1230e included in the second unit 1230. The value included in the unit of the third queue 1250 may be determined based on the majority value, the representative value, or the ratio of the anomaly primary prediction results.

FIG. 12 exemplarily illustrates an exemplary embodiment in which the secondary anomaly prediction result is generated by a scheme of using the counter or the counter value as the first voting is performed. An example of FIG. 12 illustrates an exemplary embodiment in which the counter value is increased as the majority value or representative value becomes 1 according to the result of the first voting, and the counter value is maintained as the majority value or the representative value becomes 0 according to the result of the first voting. However, an exemplary embodiment in which the counter value is decreased as the majority value or representative value becomes 0 may also be included in the scope of the present disclosure according to an implementation aspect.

In an exemplary embodiment, as the first voting using the plurality of units including the first unit 1230a of the second queue 1230 is performed, the second unit 1250b of the third queue 1250 may have the value of 0. According to a result of performing the first voting using the plurality of units including the first unit 1230a and the second unit 1230b of the second queue 1230, the third unit 1250c of the third queue 1250 may have the value of 1 as the value of 1 which is the counter value is added. According to a result of performing the first voting using the plurality of units including the first unit 1230a, the second unit 1230b, and the third unit 1230c of the second queue 1230, the fourth unit 1250d of the third queue 1250 may have the value of 2 as the value of 1 which is the counter value is added. According to a result of performing the first voting using the plurality of units including the first unit 1230a, the second unit 1230b, the third unit 1230c, and the fourth unit 1230d of the second queue 1230, the fifth unit 1250e of the third queue 1250 may have the value of 3 as the value of 1 which is the counter value is added. When the anomaly secondary prediction result is generated as such, the counter value may not be added when the result of the first voting is 0 and the counter value may be added when the result of the first voting is 1.

In an exemplary embodiment, the fourth queue 1270 may correspond to a queue for generating the alarm. In an exemplary embodiment, values of the units 1270a, 1270b, 1270c, 1270d, and 1270e of the fourth queue 1270 may be determined based on a second voting using the values of the units of the third queue 1250.

In an exemplary embodiment, the second voting may include comparing values (e.g., counter values) of the respective units of the third queue 1250 and one or more thresholds. For example, when the values of the units of the third queue 1250 are equal to or more than the threshold, the second voting may determine to generate the alarm (ON) for the unit corresponding to the fourth queue 1270. For example, when the values of the units of the third queue 1250 are less than the threshold, the second voting may determine not to generate the alarm (OFF) for the unit corresponding to the fourth queue 1270. In the example of FIG. 12, since the threshold is set to 3, the computing device 100 may determine to generate the anomaly alarm for the fifth unit 1270e of the fourth queue 1270 corresponding to the fifth unit 1250e of the third queue 1250 having the value of 3.

In an exemplary embodiment, the counter value may have a predetermined range. When the counter value reaches a boundary value of the predetermined range, the computing device 100 may maintain or change the counter value by a different scheme from a case where the counter value does not reach the boundary value. For example, a situation is assumed in which the counter value may have a range of 0 to 5, and the threshold is 3. Under the assumption, the threshold of 3 may be compared with each of the units of the third queue 1250. When the first unit of the third queue 1250 has the value of 3, the computing device 100 may set a corresponding first unit of the fourth queue 1270 to be ON. When the second unit which is a next unit of the third queue 1250 has the value of 4, the computing device 100 may set a corresponding unit of the fourth queue 1270 to be ON. When the third unit which is the next unit of the third queue 1250 has the value of 5, the computing device 100 may set a corresponding third unit of the fourth queue 1270 to be ON. In such a situation, when it is determined that the value of 1 is added to the fourth unit which is the next unit of the third queue 1250 through the first voting, the computing device 100 may set the fourth unit of the third queue 1250 to 5 (e.g., 1 is not added). As another example, when the value of 0 is determined as the majority value or representative value through the first voting with respect to the fourth unit which is the next unit of the third queue 1250 in the same situation, the computing device 100 may set the fourth unit of the third queue 1250 to 4 (e.g., 1 is subtracted). As described above, in the state in which the anomaly secondary prediction result reaches the threshold range, the counter value is not increased any longer, and the counter value may be decreased or the counter value may be maintained. In such a situation, when the counter value is changed from 3 to 2 as the counter value is decreased, the computing device 100 may determine to turn off the anomaly alarm. As described above, the technique according to an exemplary embodiment of the present disclosure may set the threshold range of the counter value, and maintain or increase the counter value when the counter value reaches a minimum value in the threshold range. The technique according to an exemplary embodiment of the present disclosure may set the threshold range of the counter value, and maintain or decrease the counter value when the counter value reaches a maximum value in the threshold range. The technique according to an exemplary embodiment of the present disclosure may set the threshold range of the counter value, and replace the counter value with the minimum value or the maximum value when the counter value deviates from the minimum value or the maximum value in the threshold range.

In an exemplary embodiment, the type of alarm or the intensity of the alarm may be set differently according to a difference between the counter value and the threshold. When the counter value is 4 and the threshold is 3, the alarm may be set to a first type or a first intensity. When the counter value is 5 and the threshold is 3, the alarm may be set to a second type or a second intensity. Here, the second intensity may have a larger value than the first intensity. Here, the second type of alarm may be an alarm different from the first type of alarm. In such an example, the second type of alarm may transfer a more intuitive and stronger message to the user than the first type of alarm.

In an exemplary embodiment, the technique according to an exemplary embodiment of the present disclosure may use one counter or a plurality of counters. Further, a plurality of thresholds to be compared with the counter may be used. Further, the plurality of counters and the plurality of thresholds may be used.

An example of using one counter may be described as follows. In a situation in which one counter for N alarms exists, the counter may be increased or decreased by 1, or maintained according to the secondary anomaly prediction result (prediction value). A start value and/or a threshold range (mini value and max value) of the counter may be set, and N thresholds between the min value and the max value for generating the alarm may be set. Here, N is the natural number. The counter is compared with each of N thresholds, and when the counter is equal to or more than a specific threshold, the alarm may be generated, and in a complex condition (when the counter is equal to or more than the plurality of thresholds), an alarm corresponding to a high threshold may be generated. For example, a situation is assumed in which the threshold range of the counter is min=0 and max=6, and the first threshold=3 and the second threshold=5. In such a situation, when the anomaly secondary prediction result is 1 in a specific image, the counter has the value of 1, and the alarm is not generated. When the anomaly secondary prediction result is 1 in a subsequent image, the counter has the value of 2, and the alarm is not generated. When the anomaly secondary prediction result is 1 in the subsequent image, the counter may have the value of 3, and the first alarm corresponding to the first threshold may be generated. When the anomaly secondary prediction result is 1 in the subsequent image, the counter may have the value of 4, and the first alarm corresponding to the first threshold may be generated. When the anomaly secondary prediction result is 1 in the subsequent image, the counter may have the value of 5, and the second alarm corresponding to the second threshold may be generated. When the anomaly secondary prediction result is 1 in the subsequent image, the counter may have the value of 5 as it is, and the second alarm corresponding to the second threshold may be generated. When the anomaly secondary prediction result is 0 in the subsequent image, the counter may have the value of 4, and the first alarm corresponding to the first threshold may be generated. When the anomaly secondary prediction result is 0 in the subsequent image, the counter may have the value of 3, and the first alarm corresponding to the first threshold may be generated. When the anomaly secondary prediction result is 0 in the subsequent image, the counter may have the value of 32, and the alarm may be turned off.

An example of using the plurality of counters may be described as follows. In a situation in which M counters for N alarms exists, each of the counters may be increased or decreased by 1, or maintained according to the secondary anomaly prediction result (prediction value). Here, each of N and M corresponds to the natural number. A start value and/or a threshold range (mini value and max value) of each of the counters may be set, and each of M thresholds between the min value and the max value for generating the alarm may be set. N counters are compared with M thresholds, respectively, and when a specific counter is equal to or more than a specific threshold, the alarm may be generated. For example, the threshold range of the first counter is min=0 and max=4, and the first threshold having the value of 3 may be allocated to the first counter. Further, the threshold range of the second counter is min=0 and max=6, and the second threshold having the value of 5 may be allocated to the second counter. In such an example situation, when the anomaly secondary prediction result is 0 in a specific image, both the first counter and the second counter may have the value of 0, and the alarm is not generated. When the anomaly secondary prediction result is 1 in a subsequent image, both the first counter and the second counter may have the value of 1, and the alarm is not generated. When the anomaly secondary prediction result is 1 in the subsequent image, both the first counter and the second counter may have the value of 2, and the alarm is not generated. When the anomaly secondary prediction result is 1 in the subsequent image, both the first counter and the second counter may have the value of 3, and since the first counter is determined to be equal to or more than the first threshold, the first alarm or a primary alarm may be generated. When the anomaly secondary prediction result is 1 in the subsequent image, both the first counter and the second counter may have the value of 4, and since the first counter is determined to be equal to or more than the first threshold, the first alarm or the primary alarm may be continued. When the anomaly secondary prediction result is 1 in the subsequent image, the first counter may be maintained to the value of 4 which is the maximum value, and the second counter may have the value of 5, and the first counter may be determined to be equal to or more than the first threshold, and the second counter may be determined to be equal to or more than the second threshold. In this case, the second alarm or a secondary alarm may be generated. When the anomaly secondary prediction result is 0 in the subsequent image, the first counter may be decreased to the value of 3, and the second counter may be decreased to the value of 4, and since the first counter is determined to be equal to or more than the first threshold, the first alarm or the primary alarm may be generated. When the anomaly secondary prediction result is 0 in the subsequent image, the first counter may be decreased to the value of 2, and the second counter may be decreased to the value of 3, and as a result, the alarm may be turned off.

Figure 13:
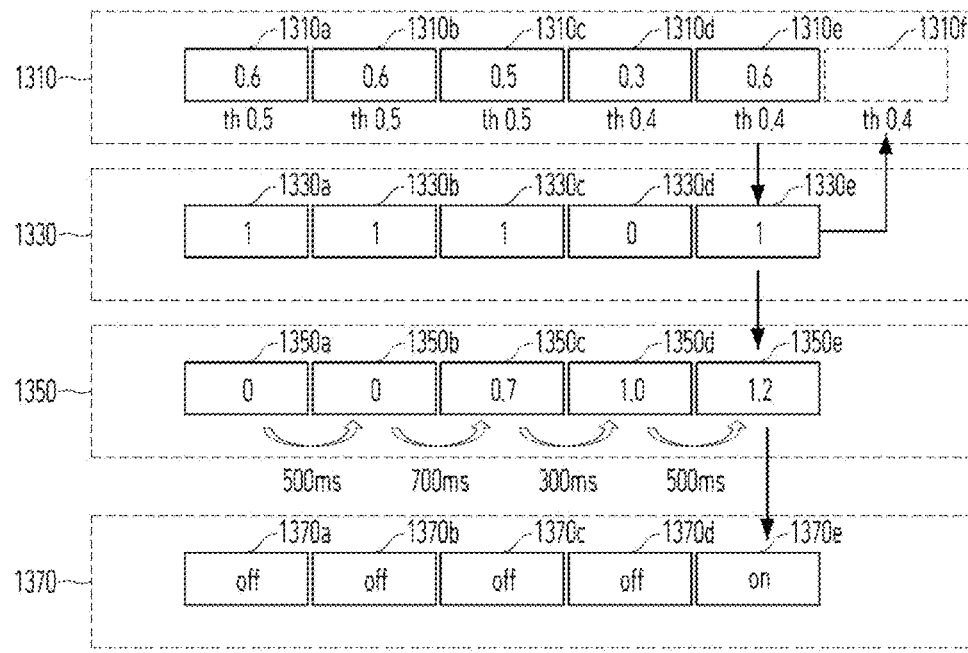
FIG. 13 exemplarily illustrates a methodology for generating an anomaly alarm according to an exemplary embodiment of the present disclosure.

A first queue 1310, and units 1310*a*, 1310*b*, 1310*c*, 1310*d*, 1310*e*, and 1310*f* included in the first queue in FIG. 13 may correspond to the first queue 1110, and the units 1110*a*, 1110*b*, 1110*c*, 1110*d*, 1110*e*, and 1110*f* included in the first queue in FIG. 11, respectively.

A second queue 1330, and units 1330*a*, 1330*b*, 1330*c*, 1330*d*, and 1330*e* included in the second queue in FIG. 13 may correspond to the second queue 1130, and the units 1130*a*, 1130*b*, 1130*c*, 1130*d*, and 1130*e* included in the second queue in FIG. 11, respectively.

In an exemplary embodiment, values of the units 1350*a*, 1350*b*, 1350*c*, 1350*d*, and 1350*e* of the third queue 1350 may be determined based on the result of the first voting using the values of the units 1330*a*, 1330*b*, 1330*c*, 1330*d*, and 1330*e* included in the second queue 1330. The value included in the unit of the third queue 1350 may be determined based on the majority value, the representative value, or the ratio of the anomaly primary prediction results.

A third queue 1350, and a first unit 1350*a*, a second unit 1350*b*, a third unit 1350*c*, a fourth unit 1350*d*, and a fifth unit 1350*e* included in the third queue 1350 in FIG. 13 may correspond to the first unit 1150*a*, the second unit 1150*b*, the third unit 1150*c*, the fourth unit 1150*d*, and the fifth unit 1150*e* of the third queue 1150, respectively. That is, FIG. 13 illustrates voting queues to which the counter is applied. FIG. 13 exemplarily illustrates a scheme in which the unit of the increase or decrease of the counter value is not 1. FIG. 13 illustrates an exemplary embodiment in which a difference value between acquisition times of images is used as the unit of the increase or decrease of the counter value.

In an exemplary embodiment, a difference between an acquisition time of a first image corresponding to the first unit 1350*a* of the third queue 1350 and an acquisition time of a second image corresponding to the second unit 1350*b* may be determined as 500 ms. As a result, the unit of the increase or decrease of the counter value between the first unit 1350*a* and the second unit 1350*b* may be set to 500 ms. A difference between an acquisition time of a second image corresponding to the second unit 1350*b* of the third queue 1350 and an acquisition time of a third image corresponding to the third unit 1350*c* may be determined as 700 ms. As a result, the unit of the increase or decrease of the counter value between the second unit 1350*b* and the third unit 1350*c* may be set to 700 ms. A difference between an acquisition time of a third image corresponding to the third unit 1350*c* of the third queue 1350 and an acquisition time of a fourth image corresponding to the fourth unit 1350*d* may be determined as 300 ms. As a result, the unit of the increase or decrease of the counter value between the third unit 1350*c* and the fourth unit 1350*d* may be set to 300 ms. A difference between an acquisition time of a fourth image corresponding to the fourth unit 1350*d* of the third queue 1350 and an acquisition time of a fifth image corresponding to the fifth unit 1350*e* may be determined as 500 ms. As a result, the unit of the increase or decrease of the counter value between the fourth unit 1350*d* and the fifth unit 1350*e* may be set to 500 ms.

In an exemplary embodiment, the fourth queue 1370 may correspond to a queue for generating the alarm. In an exemplary embodiment, values of the units 1370*a*, 1370*b*, 1370*c*, 1370*d*, and 1370*e* of the fourth queue 1370 may be determined based on a second voting using the values of the units of the third queue 1350.

As described above, the technique according to an exemplary embodiment of the present disclosure may use a plurality of queues and a plurality of votings in order to generate the anomaly alarm and/or in order to determine the type and the intensity of anomaly alarm. Furthermore, the technique according to an exemplary embodiment of the present disclosure may determine a user-friendly and more accurate alarm by using one or more counters and one or more thresholds.

FIG. 13 exemplarily illustrates an exemplary embodiment in which the threshold is 1.1. As a result, the anomaly alarm may be determined to be ON with respect to the fifth unit 1370*e* of the fourth queue 1370.

Figure 14:
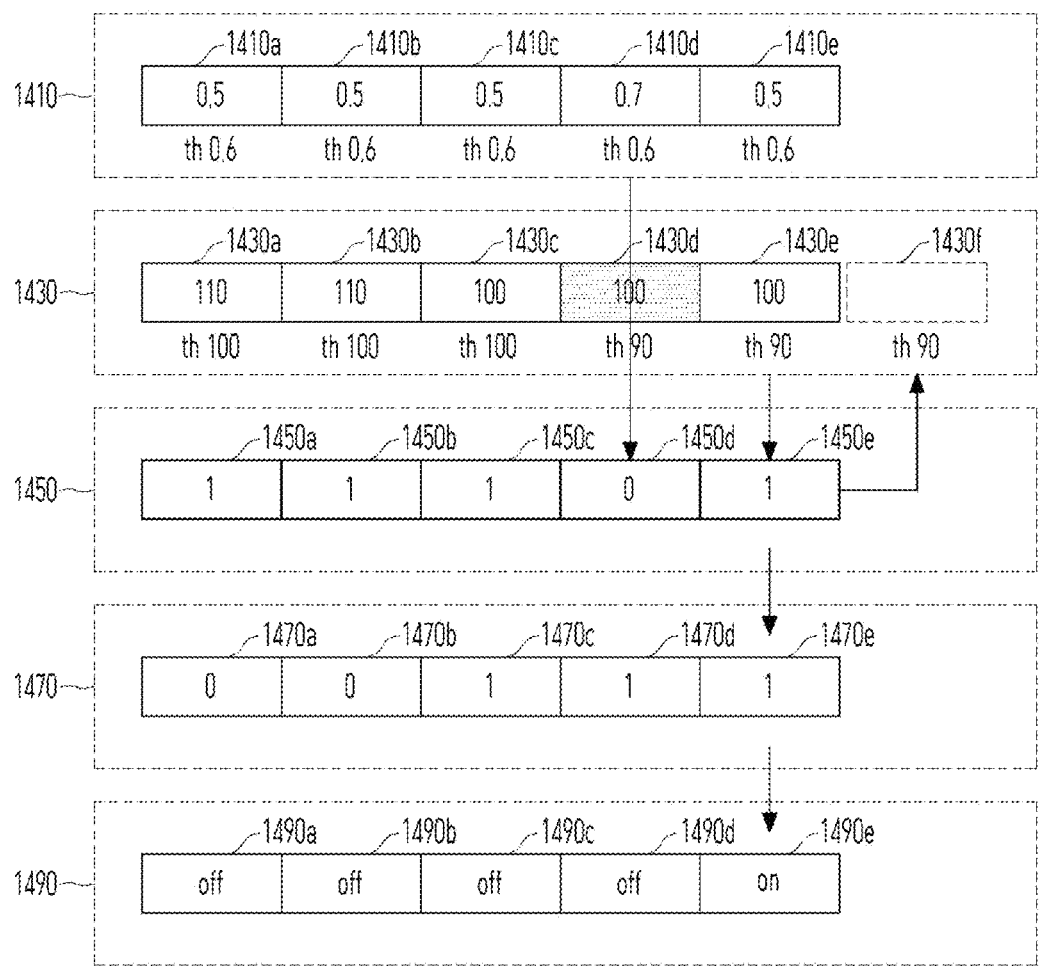
FIG. 14 exemplarily illustrates a method for generating an eye closing alarm or a drowsiness alarm according to an exemplary embodiment of the present disclosure.

FIG. 14 exemplarily illustrates a method for determining the eye closing alarm according to an exemplary embodiment of the present disclosure.

The above-described examples among the examples illustrated in FIG. 14 will be replaced with the above-described contents in order to prevent duplication of the description.

In an exemplary embodiment, an X-axis direction (e.g., horizontal direction) of the first queue 1410, second queue 1430, third queue 1450, fourth queue 1470, and fifth queue 1490 is a direction for expressing temporally obtained images. The images herein may include images which become targets for judging whether the eye is closed or whether the drowsiness exists. Each of the first queue 1410, the second queue 1430, the third queue 1450, the fourth queue 1470, and the fifth queue 1490 includes a plurality of units. Each of the units of the first queue 1410, the second queue 1430, the third queue 1450, the fourth queue 1470, and the fifth queue 1490 may indicate a subsequent time toward the right from the left. In FIG. 14, it is illustrated that the first queue 1410, second queue 1430, third queue 1450, fourth queue 1470, and fifth queue 1490 include five units corresponding to each other.

In the first queue 1410, second queue 1430, third queue 1450, fourth queue 1470, and fifth queue 1490, units corresponding to each other may include a processing result for the same image. In the example of FIG. 14, first units 1410a, 1430a, 1450a, 1470a, and 1490a may include a result corresponding to a first image at a first time, second units 1410b, 1430b, 1450b, 1470b, and 1490b may include a result corresponding to a second image at a second time, third units 1410c, 1430c, 1450c, 1470c, and 1490c may include a result corresponding to a third image at a third time, fourth units 1410d, 1430d, 1450d, 1470d, and 1490d may include a result corresponding to a fourth image at a fourth time, and fifth units 1410e, 1430e, 1450e, 1470e, and 1490e may include a result corresponding to a fifth image at a fifth time.

As described above, corresponding units in each of the first queue 1410, second queue 1430, third queue 1450, fourth queue 1470, and fifth queue 1490 may include a judgment result for images obtained at the same time.

In an exemplary embodiment, the first queue 1410 may include a plurality of units including a value of a standard deviation of a heatmap corresponding to an input image. The heatmap may be obtained from a model (e.g., a detection model) for detecting the eye area or detecting the target points in the eye area. For example, as the size of the standard deviation of the heatmap corresponding to the input image becomes larger, the size of the value included in the unit the first queue 1410 may become larger. For example, the value of the standard deviation of the heatmap may indicate the quantitative value, and the case where the value is large may indicate that there is a high possibility that occlusion will exist in the image. For example, since the standard deviation of the heatmap of the first unit 1410a is 0.5, and the threshold allocated to the first unit 1410a is 0.6, it may be determined the first image included in the first unit 1410a passes through a reference related to the standard deviation. For example, it may be determined that a standard deviation of a heatmap of the fourth image corresponding to the fourth unit 1410d is larger than the threshold corresponding to the fourth unit 1410d. As a result, the computing device 100 may set the value of the fourth unit 1450d of the third queue 1450 to 0 without performing analysis or processing in the second queue 1430 for the fourth image. The computing device 100 may determine that the "eye opening state" exists for the fourth image. In the example of FIG. 14, when the standard deviation (e.g., the value of 0.7) of the heatmap exceeds the threshold reference (e.g., the value of 0.6), the computing device 100 may judge that the occlusion exists in the fourth image corresponding to the fourth unit, determine that the driver in the eye opening state, or judges that occlusion of a threshold or more exists. The example of the occlusion may include the sunglasses. For example, when it judged that the occlusion exists in the fourth image or it is judged that the occlusion of the threshold or more exists, the computing device 100 may determine not to calculate the eye closing score with respect to the fourth image. For example, when it judged that the occlusion exists in the fourth image or it is judged that the occlusion of the threshold or more exists, the computing device 100 may determine not to detect the target points corresponding to the eye area with respect to the fourth image. For example, when it judged that the occlusion exists in the fourth image or it is judged that the occlusion of the threshold or more exists, the computing device 100 may determine not to generate the drowsiness alarm with respect to the fourth image. For example, when it judged that the occlusion exists in the fourth image or it is judged that the occlusion of the threshold or more exists, the computing device 100 may determine that the driver does not close the eye with respect to the fourth image. When the standard deviation exceeds the threshold, the computing device 100 may determine an eye closing primary prediction result as the eye opening state in the image regardless of the eye closing score determined by using the transformed positional information.

In an exemplary embodiment, thresholds (thresholds to be compared with the standard deviation of the heatmap) for the units 1410a, 1410b, 1410c, 1410d, and 1410e of the first queue 1410, respectively may be set to a predetermined fixation value. In an exemplary embodiment, the thresholds (thresholds to be compared with the standard deviation of the heatmap) for the units 1410a, 1410b, 1410c, 1410d, and 1410e of the first queue 1410, respectively may also be set to have the same value or different values with respect to the units, respectively.

In an exemplary embodiment, the second queue 1430 may include a plurality of units 1430a, 1430b, 1430c, 1430d, and 1430e including values related to the eye closing score. The eye closing score may be determined based on, for example, a distance measurement result of the eye in the transformed space. As a non-limiting example, the distance measurement result of the eye may indicate a value according to a distance between an upper boundary and a lower boundary of the eye area. As an example, the distance measurement result of the eye and the eye closing score may have a negative correlation with each other. In such an example, as a value of the distance measurement result of the eye is larger, the eye closing score may become smaller. As the value of the eye closing score herein is larger, a possibility of eye closing may be higher.

In an exemplary embodiment, a corresponding threshold may be set in each of the plurality of units 1430a, 1430b, 1430c, 1430d, and 1430e of the second queue 1430. For example, the threshold corresponding to each of the plurality of units 1430a, 1430b, 1430c, 1430d, and 1430e may be variably determined based on eye closing scores of one or more previous units of the corresponding unit. For example, the threshold corresponding to each of the plurality of units 1430a, 1430b, 1430c, 1430d, and 1430e may be variable according to a value included in a previous unit of the corresponding unit. For example, the threshold corresponding to each of the plurality of units 1430a, 1430b, 1430c, 1430d, and 1430e may be determined based on eye closing primary prediction results of one or more previous units of the corresponding unit. For example, the threshold corresponding to each of the plurality of units 1430a, 1430b, 1430c, 1430d, and 1430e may be determined based on eye closing secondary prediction results of one or more previous units of the corresponding unit. A determination scheme of the threshold corresponding to each of the units 1430a, 1430b, 1430c, 1430d, and 1430e in the second queue 1430 may correspond to the determination scheme of the threshold for determining the anomaly primary prediction result.

The eye closing score in FIG. 14 may correspond to the model output information, the eye closing primary prediction result may correspond to the anomaly primary prediction result, and the eye closing secondary prediction result may correspond to the anomaly secondary prediction result.

In an exemplary embodiment, the third queue 1450 may include the eye closing primary prediction result determined based on comparison between the eye closing score of the image and the threshold. The first unit 1450a may include a first eye closing primary prediction result corresponding to the first image at the first time, the second unit 1450*b* may include a second eye closing primary prediction result corresponding to the second image at the second time, the third unit 1450*c* may include a third eye closing primary prediction result corresponding to the third image at the third time, the fourth unit 1450*d* may include a fourth eye closing primary prediction result corresponding to the fourth image at the fourth time, and the fifth unit 1450*e* may include a fifth eye closing primary prediction result corresponding to the fifth image at the fifth time.

In FIG. 14, the first eye closing primary prediction result corresponding to the first image may be determined by comparison between a first eye closing score having a value of 110 and a threshold having a value of 100. The first eye closing primary prediction result may have the value of 1 because the first eye closing score exceeds a corresponding threshold. The second eye closing primary prediction result corresponding to the second image may be determined by comparison between a second eye closing score having the value of 110 and the threshold having the value of 100. The second eye closing primary prediction result may have the value of 1 because the second eye closing score exceeds a corresponding threshold. The third eye closing primary prediction result corresponding to the third image may be determined by comparison between a third eye closing score having the value of 100 and a threshold having a value of 90. The third eye closing primary prediction result may have the value of 1 because the third eye closing score exceeds a corresponding threshold. The fourth eye closing primary prediction result corresponding to the fourth image may be set to the value of 0 because a standard deviation value of the heatmap in the fourth unit 1410*d* of the first queue 1410 exceeds a threshold. The fifth eye closing primary prediction result corresponding to the fifth image may be determined by comparison between a fifth eye closing score having the value of 100 and the threshold having the value of 90. The fifth eye closing primary prediction result may have the value of 1 because the fifth eye closing score exceeds a corresponding threshold.

In an exemplary embodiment, values of the units 1470*a*, 1470*b*, 1470*c*, 1470*d*, and 1470*e* of the fourth queue 1470 may be determined based on a first voting using the values of the units 1450*a*, 1450*b*, 1450*c*, 1450*d*, and 1450*e* included in the third queue 1450. The units 1470*a*, 1470*b*, 1470*c*, 1470*d*, and 1470*e* of the fourth queue 1470 may include the eye closing secondary prediction result. The eye closing secondary prediction result may correspond to the anomaly secondary prediction result. The value included in the unit of the fourth queue 1470 may be determined based on the majority value, the representative value, or the ratio of the eye closing primary prediction results. For example, the fifth unit 1470*e* of the fourth queue 1470 may be determined based on a processing result including a previous unit of the fifth image corresponding to the fifth unit 1470*e*, and the fifth image. For example, the fifth unit 1470*e* of the fourth queue 1470 may be determined based on the representative value, the ratio value, or the majority value of the values of the units 1450*a*, 1450*b*, 1450*c*, 1450*d*, and 1450*e* of the third queue 1450. For example, the fifth unit 1470*e* of the fourth queue 1470 may be determined based on comparison between a ratio of units having the value of 1 among the values of the units 1450*a*, 1450*b*, 1450*c*, 1450*d*, and 1450*e* of the third queue 1450 and a threshold ratio.

In an exemplary embodiment, the fifth queue 1490 may correspond to a queue for generating the alarm. In an exemplary embodiment, the fifth queue 1490 may determine the alarm by using the eye closing secondary prediction result(s).

In an exemplary embodiment, values of the units 1490*a*, 1490*b*, 1490*c*, 1490*d*, and 1490*e* of the fifth queue 1490 may be determined based on a second voting using the values of the units of the fourth queue 1470. The fifth queue 1490 may include a result of the second voting for determining whether the alarm is generated by considering the continuity of the values of the units of the fourth queue 1470. For example, a reference of the continuity of the values of the units is assumed as 3. Under the assumption, since any of the first unit 1470*a* of the fourth queue 1470 and two previous units does not have the value of 1, the first unit 1490*a* of the fifth queue 1490 may be set to 0 (e.g., alarm off). Since any of the second unit 1470*b* of the fourth queue 1470 and two previous units (1470*a* and the previous unit) does not have the value of 1, the second unit 1490*b* of the fifth queue 1490 may be set to 0 (e.g., alarm off). Since any of the third unit 1470*c* of the fourth queue 1470 and two previous units 1470*a* and 1470*b* does not have the value of 1, the third unit 1490*c* of the fifth queue 1490 may be set to 0 (e.g., alarm off). Since any of the fourth unit 1470*d* of the fourth queue 1470 and two previous units 1470*b* and 1470*c* does not have the value of 1, the fourth unit 1490*d* of the fifth queue 1490 may be set to 0 (e.g., alarm off). Since all of the fifth unit 1470*e* of the fourth queue 1470 and two previous units 1470*c* and 1470*d* have the value of 1, the fifth unit 1490*e* of the fifth queue 1490 may be set to 1 (e.g., alarm on).

As described above, the technique according to an exemplary embodiment of the present disclosure may use a plurality of queues in order to judge whether the eye closing or the drowsiness exists or generate the alarm corresponding to the eye closing or the drowsiness. The technique according to an exemplary embodiment of the present disclosure may provide an accurate alarm according to the eye closing by using the plurality of queues and one or more votings. A value included in a specific queue or a threshold allocated to the specific queue may be determined by using values included in another queue (e.g., previous queue) among the plurality of queues. As a result, the accuracy of judging whether the eye closing or the drowsiness exists, and the accuracy of the alarm generation may be secured.

Figure 15:
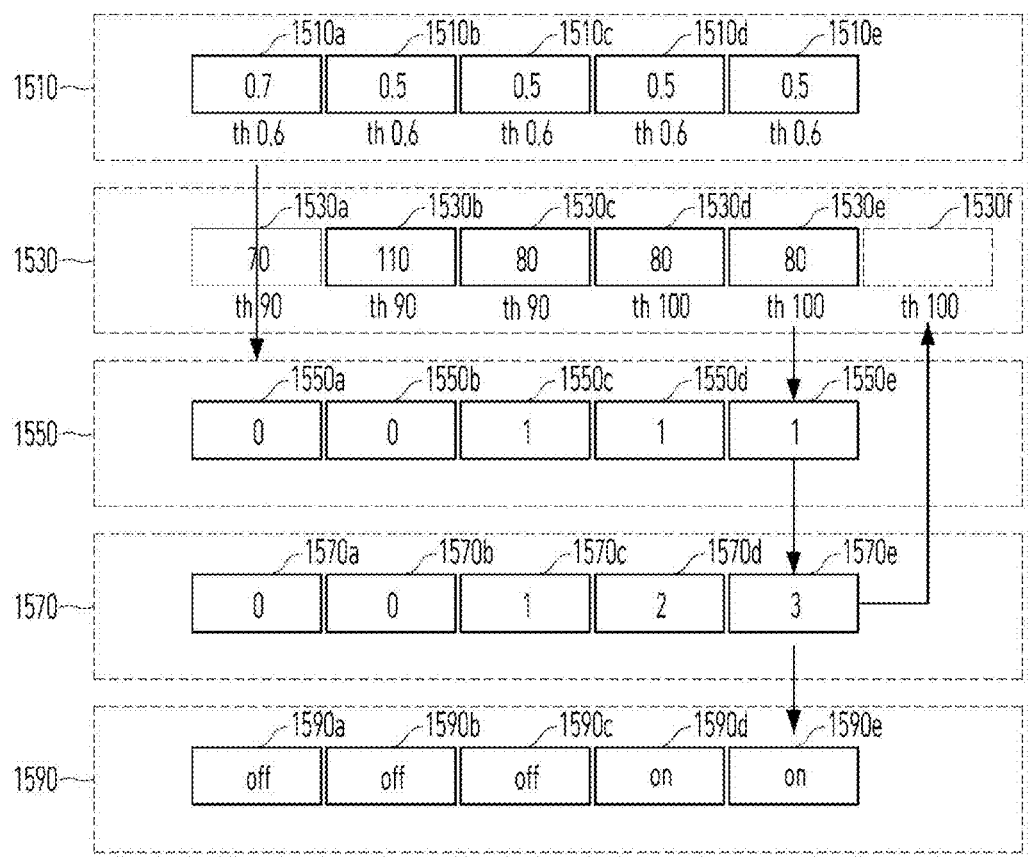
FIG. 15 exemplarily illustrates a method for generating an eye closing alarm or a drowsiness alarm according to an exemplary embodiment of the present disclosure.

FIG. 15 exemplarily illustrates a method for generating an eye closing alarm or a drowsiness alarm according to an exemplary embodiment of the present disclosure.

The above-described examples among the examples illustrated in FIG. 15 will be replaced with the above-described contents in order to prevent duplication of the description.

In an exemplary embodiment, a first queue 1510, a second queue 1530, a third queue 1550, a fourth queue 1570, and a fifth queue 1590 may correspond to the first queue 1410, the second queue 1430, the third queue 1450, the fourth queue 1470, and the fifth queue 1490 in FIG. 14, respectively.

In the first queue 1510, second queue 1530, third queue 1550, fourth queue 1570, and fifth queue 1590, units corresponding to each other may include a processing result for the same image.

In the example of FIG. 15, first units 1510*a*, 1530*a*, 1550*a*, 1570*a*, and 1590*a* may include a result corresponding to a first image at a first time, second units 1510*b*, 1530*b*, 1550*b*, 1570*b*, and 1590*b* may include a result corresponding to a second image at a second time, third units 1510*c*, 1530*c*, 1550*c*, 1570*c*, and 1590*c* may include a result corresponding to a third image at a third time, fourth units 1510*d*, 1530*d*, 1550*d*, 1570*d*, and 1590*d* may include a result corresponding to a fourth image at a fourth time, and fifth units 1510e, 1530e, 1550e, 1570e, and 1590e may include a result corresponding to a fifth image at a fifth time.

In an exemplary embodiment, the first queue 1510 may include a plurality of units including a value of a standard deviation of a heatmap corresponding to an input image. The heatmap may be obtained from a model (e.g., a detection model) for detecting the eye area or detecting the target points in the eye area. For example, as the size of the standard deviation of the heatmap corresponding to the input image becomes larger, the size of the value included in the unit the first queue 1510 may become larger. For example, the value of the standard deviation of the heatmap may indicate the quantitative value, and the case where the value is large may indicate that there is a high possibility that occlusion will exist in the image. For example, since the standard deviation of the heatmap of the first unit 1510a is 0.7, and the threshold allocated to the first unit 1510a is 0.6, it may be determined the first image included in the first unit 1510a deviates from a reference related to the standard deviation. As a result, the computing device 100 may process the value of the first unit 1550a of the third queue 1550 to 0 without performing analysis or processing in the second queue 1530 for the first image. As a result, the first image may be determined as the eye opening state in the first unit 1550a of the third queue 1550. The computing device 100 may judge that the occlusion exists in the first image corresponding to the first unit 1510a, determine that the driver is in the eye opening state, or judge that an occlusion of a threshold or more exists. The example of the occlusion may include the sunglasses. As an example, the computing device 100 may determine not to detect the target points corresponding to the eye area with respect to the first image. As another example, the computing device 100 may determine not to generate the drowsiness alarm with respect to the first image. As another example, the computing device 100 may determine that the driver does not close the eye with respect to the first image. When the standard deviation exceeds the threshold, the computing device 100 may determine an eye closing primary prediction result as the eye opening state in the image regardless of the eye closing score determined by using the transformed positional information. When the standard deviation exceeds the threshold, the computing device 100 may determine an eye closing primary prediction result as the eye opening state in the image regardless of the distance measurement result of the eye determined by using the transformed positional information.

In an exemplary embodiment, in respect to other units 1550b, 1550c, 1550d, and 1550e of the first queue 1510, since the value of the standard deviation is less than the threshold or equal to or less than the threshold, data processing in the second queue 1530 indicating the distance measurement result of the eye may be followed with respect to images corresponding to other units 1550b, 1550c, 1550d, and 1550e.

In an exemplary embodiment, thresholds (thresholds to be compared with the standard deviation of the heatmap) for the units 1510a, 1510b, 1510c, 1510d, and 1510e of the first queue 1510, respectively may be set to a predetermined fixation value. In an exemplary embodiment, the thresholds (thresholds to be compared with the standard deviation of the heatmap) for the units 1510a, 1510b, 1510c, 1510d, and 1510e of the first queue 1510, respectively may also be set to have the same value or different values with respect to the units, respectively.

In an exemplary embodiment, the second queue 1530 may include a plurality of units 1530a, 1530b, 1530c, 1530d, and 1530e including values related to the distance measurement result of the eye. The distance measurement result of the eye may indicate a distance measurement result of the eye in the transformed space (e.g., normalized space), for example. As a non-limiting example, the distance measurement result of the eye may indicate a value according to a distance between an upper boundary and a lower boundary of the eye area. As an example, the distance measurement result of the eye and the eye closing score may have a negative correlation with each other. In such an example, as a value of the distance measurement result of the eye is larger, the eye closing score may become smaller. As the distance measurement result of the eye herein is smaller, a possibility of eye closing may be higher. As the value of the eye closing score herein is larger, the possibility of eye closing may be higher.

In an exemplary embodiment, a corresponding threshold may be set in each of the plurality of units 1530a, 1530b, 1530c, 1530d, and 1530e of the second queue 1530. For example, the threshold corresponding to each of the plurality of units 1530a, 1530b, 1530c, 1530d, and 1530e may be variably determined based on distance measurement results of the eye of one or more previous units of the corresponding unit. For example, the threshold corresponding to each of the plurality of units 1530a, 1530b, 1530c, 1530d, and 1530e may be variable according to a value included in a previous unit of the corresponding unit. For example, the threshold corresponding to each of the plurality of units 1530a, 1530b, 1530c, 1530d, and 1530e may be determined based on eye closing primary prediction results of one or more previous units of the corresponding unit. For example, the threshold corresponding to each of the plurality of units 1530a, 1530b, 1530c, 1530d, and 1530e may be determined based on eye closing secondary prediction results of one or more previous units of the corresponding unit. A determination scheme of the threshold corresponding to each of the units 1530a, 1530b, 1530c, 1530d, and 1530e in the second queue 1530 may correspond to the determination scheme of the threshold for determining the anomaly primary prediction result.

The distance measurement result of the eye in FIG. 15 may conceptually correspond to the model output information. However, when the distance measurement result of the eye is smaller than the threshold, the distance measurement result of the eye may be a different part from the model output information in that the eye closing (e.g., the value of 1) may be allocated to the eye closing primary prediction result. The eye closing primary prediction result in FIG. 15 may correspond to the anomaly primary prediction result, and the eye closing secondary prediction result may correspond to the anomaly secondary prediction result.

The units 1550a, 1550b, 1550c, 1550d, and 1550e of the third queue 1550 in FIG. 15 may include a primary eye closing prediction result indicating whether the eye is closed. When the eye closing primary prediction result is 0, it may be considered that the driver is in the eye opening state, and when the eye closing primary prediction result is 1, it may be considered that the driver is in the eye closing state. When the value of the second queue 1530 is less than a threshold, the eye closing primary prediction result may have the value of 1. When the value of the second queue 1530 is equal to or more than the threshold, the eye closing primary prediction result may have the value of 0.

The values of the units 1570a, 1570b, 1570c, 1570d, and 1570e of the fourth queue 1570 in FIG. 15 may be determined based on a first voting using the eye closing primary prediction result. The first voting may generate an eye closing secondary prediction result by using a majority value, a representative value, or a ratio value of the eye closing primary prediction results.

The units 1570a, 1570b, 1570c, 1570d, and 1570e of the fourth queue 1570 may include the eye closing secondary prediction result used as the parameter for determining the eye closing alarm or the drowsiness alarm. When the eye closing secondary prediction result is 0, it may be considered that the driver is in the eye opening state, and when the eye closing secondary prediction result is 1, it may be considered that the driver is in the eye closing state. A concept of a counter in which the value of the eye closing secondary prediction result is maintained or increased when a result of a primary voting is 1, and the value of the eye closing secondary prediction result is maintained or deceased when the result of the primary voting is 0 may be applied to an exemplary embodiment of the present disclosure. When the value of the eye closing secondary prediction result deviates from a predetermined maximum value or minimum value, the eye closing secondary prediction result may be replaced with the maximum value or the minimum value. In the example in FIG. 15, the maximum value of the eye closing secondary prediction result may be set to 3 and the minimum value may be set to 0.

The units 1590a, 1590b, 1590c, 1590d, and 1590e of the fifth queue 1590 in FIG. 15 may have values for determining whether the alarm is generated, the type of alarm, or the intensity of the alarm. The values included in the units 1590a, 1590b, 1590c, 1590d, and 1590e of the fifth queue 1590 may be determined based on a second voting that performs comparison between the corresponding units of the fourth queue 1570 and one or more thresholds. As an example, the second voting may perform comparison between the eye closing secondary prediction result to which the concept of the counter is applied and the threshold. As another example, the second voting may include determining whether the eye closing secondary prediction result has the continuity.

In the example of FIG. 15, the threshold used in the second voting may be exemplified as 2. Accordingly, since a value (2) of the fourth unit 1570d of the fourth queue 1570 is equal to or more than a threshold (2), a value of the fourth unit 1590d of the fifth queue 1590 may be determined as ON. At a time when a value of a unit after the fifth unit 1570e becomes 0 and the counter value becomes 2, the alarm may be turned off. As another example, at a time when the value of the unit after the fifth unit 1570e becomes 0 and the counter value becomes 2, the alarm may be maintained to be ON and at a time when the value of the subsequent unit becomes 0 and the counter value becomes 1, the alarm may be turned off.

As described above, the plurality of counters and/or the plurality of alarm thresholds may also be applied in FIG. 15, and as a result, alarms of various conditions may be set.

Figure 16:
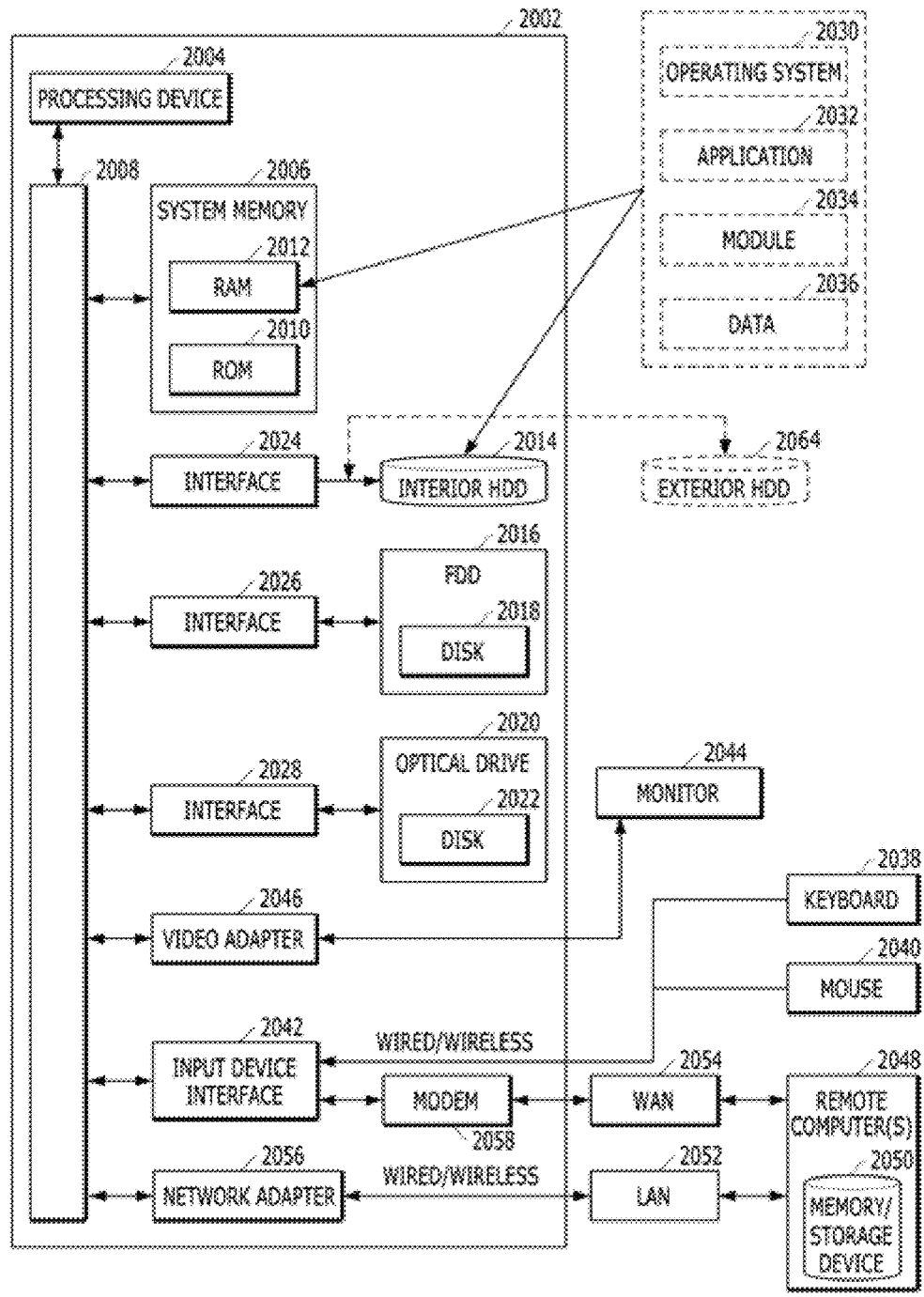
FIG. 16 is a schematic view of a computing environment according to an exemplary embodiment of the present disclosure.

FIG. 16 is a schematic view of a computing environment of the computing device 100 according to an exemplary embodiment of the present disclosure.

In the present disclosure, the computing device, the computer, the system, the component, the module, or the unit includes a routine, a procedure, a program, a component, and a data structure that perform a specific task or implement a specific abstract data type. Further, it will be well appreciated by those skilled in the art that the methods presented by the present disclosure can be implemented by other computer system configurations including a personal computer, a handheld computing device, microprocessor-based or programmable home appliances, and others (the respective devices may operate in connection with one or more associated devices) as well as a single-processor or multi-processor computing device, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computing device generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 2000 that implements various aspects of the present disclosure including a computer 2002 is shown and the computer 2002 includes a processing device 2004, a system memory 2006, and a system bus 2008. The computer 200 in the present disclosure may be used intercompatibly with the computer device 100. The system bus 2008 connects system components including the system memory 2006 (not limited thereto) to the processing device 2004. The processing device 2004 may be a predetermined processor among various commercial processors. A dual processor and other multi-processor architectures may also be used as the processing device 2004.

The system bus 2008 may be any one of several types of bus structures which may be additionally interconnected to a local bus using any one of a memory bus, a peripheral device bus, and various commercial bus architectures. The system memory 2006 includes a read only memory (ROM) 2010 and a random access memory (RAM) 2012. A basic input/output system (BIOS) is stored in the non-volatile memories 2010 including the ROM, the EPROM, the EEPROM, and the like and the BIOS includes a basic routine that assists in transmitting information among components in the computer 2002 at a time such as in-starting. The RAM 2012 may also include a high-speed RAM including a static RAM for caching data, and the like.

The computer 2002 also includes an internal hard disk drive (HDD) 2014 (for example, EIDE and SATA), an external hard disk (for example, USB, Thunderbolt, eSATA) 2064, a magnetic floppy disk drive (FDD) 2016 (for example, for reading from or writing in a mobile diskette 2018), SSD and an optical disk drive 2020 (for example, for reading a CD-ROM disk 2022 or reading from or writing in other high-capacity optical media such as the DVD). The hard disk drive 2014 and 2064, the magnetic disk drive 2016, and the optical disk drive 2020 may be connected to the system bus 2008 by a hard disk drive interface 2024, a magnetic disk drive interface 2026, and an optical drive interface 2028, respectively. An interface 2024 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 2002, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 2030, one or more application programs 2032, other program module 2034, and program data 2036 may be stored in the drive and the RAM 2012. All or some of the operating system, the application, the module, and/or the data may also be cached in the RAM 2012. It will be well appreciated that the present disclosure may be implemented in operating systems which are commercially usable or a combination of the operating systems.

A user may input instructions and information in the computer 2002 through one or more wired/wireless input devices, for example, pointing devices such as a keyboard 2038 and a mouse 2040. Other input devices (not illustrated) may include a microphone, an IR remote controller, a joystick, a game pad, a stylus pen, a touch screen, and others. These and other input devices are often connected to the processing device 2004 through an input device interface 2042 connected to the system bus 2008, but may be connected by other interfaces including a parallel port, an IEEE 1394 serial port, a game port, a USB port, an IR interface, and others.

A monitor 2044 or other types of display devices are also connected to the system bus 2008 through interfaces such as a video adapter 2046, and the like. In addition to the monitor 2044, the computer generally includes a speaker, a printer, and other peripheral output devices (not illustrated).

The computer 2002 may operate in a networked environment by using a logical connection to one or more remote computers including remote computer(s) 2048 through wired and/or wireless communication. The remote computer(s) 2048 may be a workstation, a server computer, a router, a personal computer, a portable computer, a micro-processor based entertainment apparatus, a peer device, or other general network nodes and generally includes multiple components or all of the components described with respect to the computer 2002, but only a memory storage device 2050 is illustrated for brief description. The illustrated logical connection includes a wired/wireless connection to a local area network (LAN) 2052 and/or a larger network, for example, a wide area network (WAN) 2054. The LAN and WAN networking environments are general environments in offices and companies and facilitate an enterprise-wide computer network such as Intranet, and all of them may be connected to a worldwide computer network, for example, the Internet.

When the computer 2002 is used in the LAN networking environment, the computer 2002 is connected to a local network 2052 through a wired and/or wireless communication network interface or an adapter 2056. The adapter 2056 may facilitate the wired or wireless communication to the LAN 2052 and the LAN 2052 also includes a wireless access point installed therein in order to communicate with the wireless adapter 2056. When the computer 2002 is used in the WAN networking environment, the computer 2002 may include a modem 2058, is connected to a communication server on the WAN 2054, or has other means that configure communication through the WAN 2054 such as the Internet, etc. The modem 2058 which may be an internal or external and wired or wireless device is connected to the system bus 2008 through the serial port interface 2042. In the networked environment, the program modules described with respect to the computer 2002 or some thereof may be stored in the remote memory/storage device 2050. It will be well known that an illustrated network connection is exemplary and other means configuring a communication link among computers may be used.

The computer 2002 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Method claims provide elements of various steps in a sample order, but the method claims are not limited to the presented specific order or hierarchical structure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing an alarm based on a behavior of a driver in a driver monitoring system, performed by a computing device, comprising:
   receiving a first image corresponding to a driver within a vehicle;
   generating first model output information which indicates possibility that an anomaly which compromises safety of the driver exists in the first image, from the first image, by using an artificial intelligence model;
   generating a first anomaly primary prediction result indicating whether the anomaly exists in the first image by comparing the first model output information with a first threshold;
   generating a first anomaly secondary prediction result by performing a first voting using the first anomaly primary prediction result; and
   determining an anomaly alarm corresponding to the first image by performing a second voting using the first anomaly secondary prediction result, and
   wherein the artificial intelligence model corresponds to a deep learning model that is pre-trained to receive an image of the driver and output a possibility that a predetermined anomaly which compromises safety of the driver exists in the image of the driver.

2. The method of claim 1, wherein the predetermined anomaly comprises a first anomaly corresponding to an absence of a seatbelt, a second anomaly corresponding to distraction during driving, and a third anomaly corresponding to drowsiness during driving.

3. The method of claim 1, wherein the first anomaly primary prediction result indicates that the anomaly exists in the first image, when the first model output information is greater than or equal to the first threshold, and
   wherein the first anomaly primary prediction result indicates that the anomaly does not exist in the first image, when the first model output information is less than the first threshold.

4. The method of claim 1, wherein the first model output information includes a quantitative value for comparison with the first threshold, and the first anomaly secondary prediction result indicates a quantitative value used as a parameter to determine the anomaly alarm corresponding to the first image.

5. The method of claim 1, wherein the first threshold is determined based on:
   at least one previous anomaly primary prediction result corresponding to at least one previous image received prior to the first image,
   second model output information generated by the model in response to a second image received prior to the first image, or
   a second anomaly primary prediction result generated by comparing the second model output information with a second threshold determined based on a third anomaly primary prediction result corresponding to a third image received prior to the second image, and
   wherein the second threshold is used to determine whether the anomaly exists in the second image.

6. The method of claim 1, wherein the first threshold is determined based on a second anomaly secondary prediction result corresponding to a second image received prior to the first image, and the second anomaly secondary prediction result is generated by performing the first voting using the second anomaly primary prediction result corresponding to the second image.

7. The method of claim 1, wherein the first threshold is determined based on a ratio of result values indicating a presence of the anomaly in previous anomaly primary prediction results corresponding to a selected first number of images received prior to the first image,
   wherein the first threshold is set to a first value when the ratio of result values indicating the presence of the anomaly in the previous anomaly primary prediction results is equal to or greater than a first ratio, and
   wherein the first threshold is set to a second value higher than the first value, when the ratio of result values indicating the presence of the anomaly in the previous anomaly primary prediction results is less than the first ratio.

8. The method of claim 1, wherein the first voting generates a group anomaly prediction result representing an image group consisting of the first image and a selected second number of images received prior to the first image, to ensure an accuracy of the first model output information.

9. The method of claim 1, wherein the generating the first anomaly secondary prediction result comprises:
   determining a majority value of anomaly primary prediction results corresponding to the first image and a selected second number of images received prior to the first image, and
   generating the first anomaly secondary prediction result using the determined majority value, and
   wherein the majority value is determined as a result value that occupies a higher ratio in the anomaly primary prediction results, among a result value indicating a presence of the anomaly and a result value indicating an absence of the anomaly.

10. The method of claim 1, wherein the generating the first anomaly secondary prediction result comprises:
    determining a first current counter value and a second current counter value corresponding to the first image by changing each of a plurality of previous counter values corresponding to a second image received prior to the first image based on a result of the first voting; and
    generating the first anomaly secondary prediction result including the first current counter value and the second current counter value, and
    wherein the determining the anomaly alarm corresponding to the first image comprise:
        determining ON or OFF state of a first anomaly alarm corresponding to the first image by comparing the first current counter value with a first counter threshold; and
        determining ON or OFF state of a second anomaly alarm corresponding to the first image by comparing the second current counter value with a second counter threshold.

11. The method of claim 1, wherein the generating the first anomaly secondary prediction result comprises:
    determining to increase at least one previous counter value corresponding to a second image received prior to the first image, when a result of the first voting indicating a group anomaly prediction result or a majority value of anomaly primary prediction results in a plurality of selected images indicates a presence of the anomaly; or determining to decrease the at least one previous counter value, when a result of the first voting indicating a group anomaly prediction result or a majority value of anomaly primary prediction results in a plurality of selected images indicates an absence of the anomaly.

12. The method of claim 1, wherein the generating the first anomaly secondary prediction result comprises:
   determining a current counter value corresponding to the first image by changing a previous counter value corresponding to a second image received prior to the first image, based on a result of the first voting; and
   generating the first anomaly secondary prediction result including the current counter value, and
   wherein the determining the anomaly alarm corresponding to the first image comprises:
      determining ON or OFF state of a third anomaly alarm corresponding to the first image by comparing the current counter value with a third counter threshold; and
      determining ON or OFF state of a fourth anomaly alarm corresponding to the first image by comparing the current counter value with a fourth counter threshold.

13. The method of claim 1, wherein the generating the first anomaly secondary prediction result comprises,
   determining at least one current counter value corresponding to the first image by changing at least one previous counter value corresponding to a second image received prior to the first image, based on the result of the first voting, and
   wherein the current counter value is set to the minimum value or maximum value, when the current counter value falls outside a range defined by a selected minimum value and maximum value.

14. The method of claim 1, wherein the generating the first anomaly secondary prediction result comprises,
   determining at least one current counter value corresponding to the first image by changing at least one previous counter value corresponding to a second image received prior to the first image, based on the result of the first voting, and
   wherein a unit of the change of the at least one previous counter value is determined based on a time difference between receiving time of the second image and receiving time of the first image.

15. The method of claim 1, wherein the second voting determines an image group consisting of a selected third number of sequential images including the first image, to ensure an accuracy of the alarm, and determines whether there is continuity of anomaly secondary prediction results corresponding to images in the image group, and
   wherein the selected third number of sequential images include the first image and images received prior to the first image.

16. The method of claim 1, wherein the determining the anomaly alarm corresponding to the first image comprises,
   determining to generate the anomaly alarm corresponding to the first image, when the anomaly secondary prediction results within an image group consisting of a selected third number of sequential images including the first image all indicate a presence of the anomaly, and
   wherein the selected third number of sequential images include the first image and images received prior to the first image.

17. The method of claim 1, wherein the determining the anomaly alarm corresponding to the first image comprises,
   determining whether to generate the anomaly alarm corresponding to the first image, based on the first anomaly secondary prediction result corresponding to the first image and previous anomaly secondary prediction results corresponding to a selected fourth number of images received prior to the first image.

18. The method of claim 1, wherein the first voting utilizes a previous anomaly primary prediction result corresponding to at least one previous image received prior to the first image and the first anomaly primary prediction result, and
   wherein the second voting utilizes a combination of a previous anomaly secondary prediction result corresponding to the at least one previous image and the first anomaly secondary prediction result, or compares the first anomaly secondary prediction result with a counter threshold.

19. A computer program stored in a non-transitory computer readable storage medium, wherein the computer program allows at least one processor to perform following operations to provide an alarm based on a behavior of a driver in a driver monitoring system when executed by the at least one processor, and wherein the operations comprise:
   receiving a first image corresponding to the driver within a vehicle;
   generating first model output information which indicates possibility that an anomaly which compromises safety of the driver exists in the first image, from the first image, by using an artificial intelligence model;
   generating a first anomaly primary prediction result indicating whether the anomaly exists in the first image by comparing the first model output information with a first threshold;
   generating a first anomaly secondary prediction result by performing a first voting using the first anomaly primary prediction result; and
   determining an anomaly alarm corresponding to the first image by performing a second voting using the first anomaly secondary prediction result, and
   wherein the artificial intelligence model corresponds to a deep learning model that is pre-trained to receive an image of the driver and output a possibility that a predetermined anomaly which compromises safety of the driver exists in the image of the driver.

20. A computing device, comprising:
   at least one processor; and
   a memory,
   wherein the at least one processor is configured to:
      receive a first image corresponding to the driver within a vehicle;
      generate first model output information which indicates possibility that an anomaly which compromises safety of the driver exists in the first image, from the first image, by using an artificial intelligence model;
      generate a first anomaly primary prediction result indicating whether the anomaly exists in the first image by comparing the first model output information with a first threshold;
      generate a first anomaly secondary prediction result by performing a first voting using the first anomaly primary prediction result; and
      determine an anomaly alarm corresponding to the first image by performing a second voting using the first anomaly secondary prediction result, and
      wherein the artificial intelligence model corresponds to a deep learning model that is pre-trained to receive an image of the driver and output a possibility that a predetermined anomaly which compromises safety of the driver exists in the image of the driver.

* * * * *